US009047120B2

(12) United States Patent
Maruyama

(10) Patent No.: US 9,047,120 B2
(45) Date of Patent: Jun. 2, 2015

(54) VIRTUAL QUEUE PROCESSING CIRCUIT AND TASK PROCESSOR

(75) Inventor: Naotaka Maruyama, Kanagawa (JP)

(73) Assignee: KERNELON SILICON INC., Kanagawa, Fujisawa-Shi (JP)

( * ) Notice: Subject to any disclaimer, the term of this patent is extended or adjusted under 35 U.S.C. 154(b) by 0 days.

(21) Appl. No.: 13/334,042

(22) Filed: Dec. 21, 2011

(65) Prior Publication Data

US 2012/0096472 A1    Apr. 19, 2012

Related U.S. Application Data

(63) Continuation of application No. 12/281,990, filed as application No. PCT/JP2007/000874 on Aug. 10, 2007.

(51) Int. Cl.
 *G06F 9/48* (2006.01)
 *G06F 5/10* (2006.01)

(52) U.S. Cl.
 CPC ............... *G06F 9/4843* (2013.01); *G06F 5/10* (2013.01)

(58) Field of Classification Search
 None
 See application file for complete search history.

(56) References Cited

U.S. PATENT DOCUMENTS

| 4,497,023 | A | 1/1985 | Funaki et al. |
| 5,410,722 | A | 4/1995 | Comaby |
| 6,128,672 | A * | 10/2000 | Lindsley ............... 710/19 |
| 6,154,826 | A | 11/2000 | Wulf et al. |
| 2004/0098722 | A1 | 5/2004 | Moorer |
| 2011/0252428 | A1 | 10/2011 | Maruyama |

FOREIGN PATENT DOCUMENTS

| JP | 11-234302 | 8/1999 |
| JP | 11-272480 | 10/1999 |
| JP | 2000-010803 | 1/2000 |
| JP | 2000-276362 | 10/2000 |
| JP | 2001-075820 | 3/2001 |

OTHER PUBLICATIONS

Mori, Hisannao et al., "Hardware Implementation of a Real-Time Operating System for Embedded Control Systems," Aug. 2005.
Written Opinion of the International Searching Authority for Japanese PCT Application No. PCT/JP2007/000874 mailed Sep. 11, 2007.
U.S. Appl. No. 12/281,990, Office Action mailed Nov. 8, 2011.
U.S. Appl. No. 12/281,990, Final Office Action mailed Mar. 13, 2013.
U.S. Appl. No. 12/281,990, Final Office Action mailed Feb. 21, 2014.
U.S. Appl. No. 12/281,990, Office Action mailed Jul. 11, 2013.
U.S. Appl. No. 12/281,990, Office Action mailed Jun. 4, 2014.

* cited by examiner

*Primary Examiner* — Idriss N Alrobaye
*Assistant Examiner* — Dayton Lewis-Taylor
(74) *Attorney, Agent, or Firm* — Muncy, Geissler, Olds & Lowe, P.C.

(57) ABSTRACT

A queue control circuit controls the placement and retrieval of a plurality of tasks in a plurality of types of virtual queues. State registers are associated with respective tasks. Each of the state registers stores a task priority order, a queue ID of a virtual queue, and the order of placement in the virtual queue. Upon receipt of a normal placement command ENQ_TL, the queue control circuit establishes, in the state register for the placed task, QID of the virtual queue as the destination of placement and an order value indicating the end of the queue. When a reverse placement command ENQ_TP is received, QID of the destination virtual queue and an order value indicating the start of the queue are established. When a retrieval command DEQ is received, QID is cleared in the destination virtual queue.

16 Claims, 37 Drawing Sheets

FIG.22

| EID | QUEUE ORDER REGISTER | QUEUE IDENTIFICATION REGISTER | TASK PRIORITY ORDER REGISTER |
|---|---|---|---|
| E0 | 0 | Q0 | 0 |
| E1 | 0 | Q1 | 0 |
| E2 | 1 | Q0 | 1 |
| E3 | 2 | Q0 | 0 |
| E4 | 0 | Non | 0 |
| E5 | 0 | Non | 0 |
| E6 | 0 | Non | 0 |
| E7 | 0 | Non | 0 |

FIG.24

| EID | QUEUE ORDER REGISTER | QUEUE IDENTIFICATION REGISTER | TASK PRIORITY ORDER REGISTER |
|---|---|---|---|
| E0 | 0 | Q0 | 0 |
| E1 | 1 | Q1 | 0 |
| E2 | 1 | Q0 | 1 |
| E3 | 2 | Q0 | 0 |
| E4 | 0 | Q1 | 0 |
| E5 | 0 | Non | 0 |
| E6 | 0 | Non | 0 |
| E7 | 0 | Non | 0 |

FIG.26

| EID | QUEUE ORDER REGISTER | QUEUE IDENTIFICATION REGISTER | TASK PRIORITY ORDER REGISTER |
|---|---|---|---|
| E0 | <u>1</u> | Q0 | 0 |
| E1 | 1 | Q1 | 0 |
| E2 | <u>2</u> | Q0 | 1 |
| E3 | <u>3</u> | Q0 | 0 |
| E4 | 0 | Q1 | 0 |
| E5 | 0 | <u>Q0</u> | <u>1</u> |
| E6 | 0 | Non | 0 |
| E7 | 0 | Non | 0 |

FIG.30

| EID | QUEUE ORDER REGISTER | QUEUE IDENTIFICATION REGISTER | TASK PRIORITY ORDER REGISTER |
|---|---|---|---|
| E0 | 1 | Q0 | 0 |
| E1 | 1 | Q1 | 0 |
| E2 | 2 | Q0 | 1 |
| E3 | 3 | Q0 | 0 |
| E4 | 0 | Q1 | 0 |
| E5 | 0 | Q0 | 1 |
| E6 | <u>4</u> | <u>Q0</u> | <u>1</u> |
| E7 | 0 | Non | 0 |

FIG.34

| EID | QUEUE ORDER REGISTER | QUEUE IDENTIFICATION REGISTER | TASK PRIORITY ORDER REGISTER |
|---|---|---|---|
| E0 | 1 | Q0 | 0 |
| E1 | 1 | Q1 | 0 |
| E2 | 2 | Q0 | 1 |
| E3 | 0 | Non | 0 |
| E4 | 0 | Q1 | 0 |
| E5 | 0 | Q0 | 1 |
| E6 | 3 | Q0 | 1 |
| E7 | 0 | Non | 0 | they # VIRTUAL QUEUE PROCESSING CIRCUIT AND TASK PROCESSOR

CROSS-REFERENCE TO RELATED APPLICATIONS

The present application is a continuation and claims priority to patent application Ser. No. 12/281,990 which was filed Sep. 7, 2008 which is the national phase of Patent Cooperation Treaty application number PCT/JP2007/000874 filed Aug. 10, 2007, the disclosures of which are incorporated herein by reference.

BACKGROUND OF THE INVENTION

1. Technical Field

The present invention relates to a queue processing technology.

2. Description of the Related Art

Queue is a standard algorithm commonly used in creating a computer program. Therefore, processing queues faster can easily contribute to increase in the speed of processing a computer program.

SUMMARY OF THE INVENTION

It is sometimes desirable to operate a first-in first-out (FIFO) queue in the last-in first-out (LIFO) mode. Alternatively, it may be desirable to operate a queue, which is basically an LIFO queue, in the FIFO mode. The speed of processing a computer program and productivity in developing one can be improved by implementing a special queue algorithm (hereinafter, referred to as dual-entry queue algorithm) compatible also with LIFO in hardware. The dual-entry queue algorithm is considered to be particularly useful in implementing OS-based task scheduling in hardware logic.

A general purpose of the present invention is to provide a technology for implementing the dual-entry queue algorithm compatible with both FIFO and LIFO in hardware. One embodiment of the present invention relates to a virtual queue processing circuit.

The circuit may include a queue control circuit operative to control placement or retrieval of a plurality of elements in a plurality of types of virtual queues; a plurality of queue registers provided in association with the respective elements and operative to store the virtual queues in which the elements are placed and order values indicating the order of placement, in association with each other.

Upon receipt of a normal placement command, the queue control circuit indicates, in the queue register for the associated element, that the element is placed at the end of the virtual queue. Upon receipt of a reverse placement command, the queue control circuit indicates, in the queue register for the associated element, that the element is placed at the start of the virtual queue. Upon receipt of a retrieval command, the queue control circuit indicates, in the queue register for the associated element, that the element is retrieved at the start of the virtual queue. The queue control circuit manages the plurality of types of virtual queues based upon configuration information in the queue registers.

Another aspect of the present invention relates to a task control device. The device may include a processing register; an execution control circuit operative to load data from a memory into the processing register and to execute a task according to the data in the processing register; a plurality of state registers operative to store state data for respective tasks; a task switching circuit operative to perform task switching; and a task selecting circuit operative to select a task according to a predetermined condition for selection.

Each of the state registers stores a virtual queue associated with the state of execution of tasks and the order of placement in the virtual queue, in association with each other. The task switching circuit controls task switching by controlling the placement and retrieval of tasks in the plurality of virtual queues.

When a first task executes a system call instruction, the task selecting circuit selects a second task located at the start of the virtual queue associated with the READY state as the next task to be executed.

The task switching circuit clears the setting for a virtual queue in the stare register for the second task, and establishes, in the state register for the first task, the virtual queue associated with a new state of execution and the order of placement therein The task switching circuit switches tasks by saving associated data in the processing register in a predetermined storage area, and loading data formerly saved in the storage area for the second task into the processing register.

Optional combinations of the aforementioned constituting elements and implementations of the invention in the form of methods, apparatuses, systems, and computer programs may also be practiced as additional modes of the present invention. According to the present invention, an algorithm compatible with both FIFO and LIFO can be implemented in hardware logic.

BRIEF DESCRIPTION OF THE DRAWINGS

FIG. 22 shows the data structure in the state registers mapping the state of FIG. 21;

FIG. 24 shows the data structure in the state registers mapping the state of FIG. 23;

FIG. 26 shows the data structure in the state registers mapping the state of FIG. 25;

FIG. 30 shows the data structure in the state registers mapping the state of FIG. 29;

FIG. 34 shows the data structure in the state registers mapping the state of FIG. 33;

DETAILED DESCRIPTION

Figure 1:
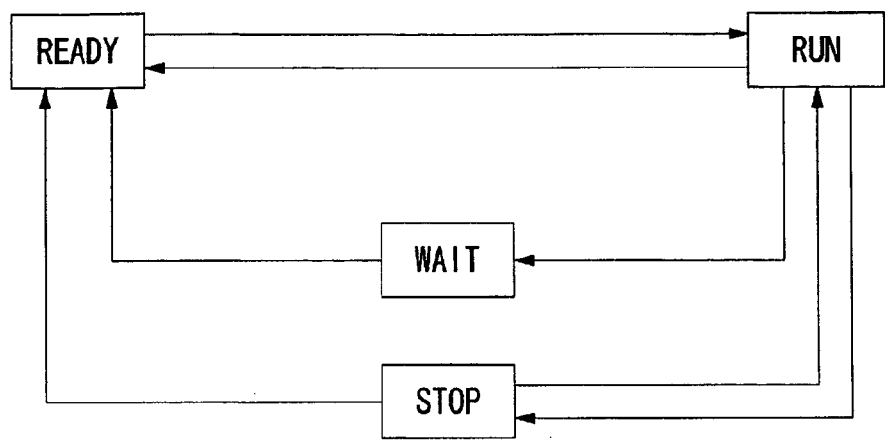
FIG. 1 is a state transition diagram of a task.

Operating systems for dedicated devices such as cell phones, as well as operating systems for general-purpose devices such as personal computers, are required to perform advanced functions on a growing scale. Particularly, an operating system capable of executing a plurality of tasks by a single central processing unit (CPU) (hereinafter, an OS of this type will be referred to as a multitask OS) is now built in a large number of electronic devices.

A multitask OS divides the processing time of a CPU into units of time (time slices) and assigns time slices to a plurality of tasks. Each task is allowed to use the CPU only while being assigned a time slice from the OS. A single task can be executed in a given time slice. Since a time slice is a very short period of time, it looks to a user as if the plurality of tasks are being executed at the same time. According to such a method of processing, the processing power of the CPU is effectively used by giving the right for execution to task B when task A reaches a state to wait for an input and thus no longer needs the computing power of the CPU. The term "right for execution" is synonymous with the right to use the CPU.

Transfer of the right for execution by the multitask OS will be referred to as a task switch. A task switch occurs when a time slice expires or when a task executes a predetermined instruction. A multitask OS saves context information of a task being executed in a task control block (TCB) when a task switch is to be executed. Context information is data related to data stored in a register of the CPU while the task is being executed or data related to the state of execution. A TCB is an area reserved in a memory to store information unique to a task. A multitask saves context information of a task being executed in a TCB, then selects a task to give the right for execution to, reads context information from the TCB for the selected task, and loads the information into a CPU register. In this way, each task continues its process step by step in units of time slices.

While a multitask OS has the advantage of being capable of executing a plurality of tasks efficiently, it also involves a disadvantage of incurring the overhead associated with saving and loading context information. Normally, the advantage of a multitask OS far surpasses the overhead associated with a task switch.

Recently, real-time operating systems with severe requirements for completion of a process within a predefined period of time are being used extensively especially in embedded systems. In an RTOS with severe time requirements, overhead incurred in a task switch may affect the performance of the system as a whole significantly. The task processor 100 achieves task scheduling of a multitask OS by an electronic circuit. Further, the processing efficiency of a multitask OS is improved by implementing a dual-entry queue algorithm compatible with FIFO and LIFO in hardware logic.

The task processor 100 that implements task scheduling of a multitask OS in an electronic circuit will first be described as a "basic implementation." Then task processor 100 that implements task scheduling comparable with that of an ordinary software-based multitask OS by implementing a dual-entry algorithm will then be described as an "improved implementation." References to both the "basic implementation" and the "improved implementation" both concern exemplary embodiments of the present invention.

Basic Implementation

A task processor 100 implements the task scheduling function of a multitask OS by an electronic circuit. Before describing the details of the task processor 100, a description will be given of state transition of a task with reference to FIG. 1. The description hereunder is directed to state transition of a task in a commonly used multitask OS. However, the illustration is equally applicable to state transition of a task in the task processor 100. An overview of a system call executed in the task processor 100 will also be given. The design concept of a commonly used multitask OS will be described with reference to FIGS. 2 and 3 and the method of processing in the task processor 100 will be described in detail with reference to FIGS. 4 through 10. The features of the task processor 100 in connection with processes related to semaphores, mutexes, and events will also be discussed by comparing the inventive features with the technology commonly used.

State Transition of a Task

FIG. 1 is a state transition diagram of a task. In a multitask process, each task has a state. Each task makes a transition between a plurality of states and is in a certain state at any given point of time. A state transition is triggered by execution of a system call or detection of an interrupt request signal. A system call is a special instruction among the instructions executed by a task. An interrupt request signal occurs when certain data is received from a peripheral device (e.g., in the event of depression of a key of the keyboard, a mouse click, or reception of data communicated from elsewhere). A state transition also occurs when a time slice assigned to a task has been consumed.

Tasks are categorized into ordinary tasks and special tasks. Ordinary tasks are non-special tasks executed in response to a system call. Special tasks are tasks executed in response to detection of an interrupt request signal. Special tasks are alternatively referred to as interrupt handlers. The states that a task can assume will be described first and then a description will be given of various system call instructions.

(1) STOP State (Sleep State)

In the STOP state, a task remains inactive. Both ordinary tasks and special tasks can assume the STOP state. Hereinafter, tasks in the STOP state will be referred to as STOP-tasks.

1-1. Ordinary Tasks

When a task executes a system call directing activation of another task (hereinafter, referred to as an activation system call), an ordinary task in the STOP state makes a transition to the READY state described later.

1-2. Special Tasks

A special task is normally in the STOP state. When a task switching circuit 210 described later detects an interrupt request signal, a special task makes a transition from the STOP state to the RUN state. The task formerly in the RUN state makes a transition to the READY state.

(2) RUN State (Execution State)

In the RUN state, a task is being executed. In other words, a task has been assigned a time slice and has acquired the right to use the CPU. Both ordinary tasks and special tasks can assume the RUN state. Hereafter, tasks in the RUN state will be referred to as RUN-tasks. Of a plurality of tasks, only one can assume the RUN state. No two tasks can assume the RUN state concurrently.

2-1. Ordinary Tasks

Upon executing a predetermined system call, an ordinary task in the RUN state makes a transition from the RUN state to the READY state or the WAIT state described later. Transition to the READY state also occurs when a task in the RUN state has consumed a time slice. Whichever is the case, an ordinary task formerly in the READY state makes a transition to the RUN state in place of the task formerly in the RUN state. Upon detection of an interrupt request signal, the RUN-task makes a transition to the READY state. In this process, a special task formerly in the STOP state makes a transition to the RUN state. When the RUN-task executes a system call (hereinafter, referred to as a termination system call) for terminating the execution of itself, the RUN-task makes a transition to the STOP state.

2-2. Special Tasks

A special task, upon making a transition from the STOP state to the RUN state in response to an interrupt request signal, returns to the STOP state upon completion of its process. A special task may only assume the STOP state and the RUN state.

(3) READY State (Executable State)

In the READY state, a task can be executed. A task in the READY state is ready to make a transition to the RUN state once given an authority for execution from the OS. Only ordinary tasks can assume the READY state. Hereinafter, tasks that are in the READY state will be referred to as READY-tasks.

When an ordinary task formerly in the RUN state makes a transition to a state other than the RUN state as a result of the execution of a system call, or when a special task in the RUN state makes a transition to the STOP state upon completion of its process, a READY-task makes a transition to the RUN state to take the place of the task formerly in the RUN state. Ordinary tasks make a transition to the RUN state only from the READY state. When there are a plurality of tasks in the READY state, one of the READY-tasks makes a transition to the RUN state based upon the task order priority, which forms context information. When there are a plurality of READY-tasks assigned the same task priority order, the task with the oldest history of transition to the READY state makes a transition to the RUN state.

(4) WAIT State (Standby State)

In the WAIT state, a task waits for the fulfillment of a WAIT cancellation condition. When the WAIT cancellation condition is fulfilled, the task in the WAIT state makes a transition to the READY state. Only ordinary tasks can assume the WAIT state. Hereinafter, tasks that are in the WAIT state will be referred to as WAIT-tasks. The WAIT cancellation condition will be described in detail later.

To summarize, tasks can continue their process using the CPU only when the task is in the RUN state. An RTOS manages the state of a plurality of tasks to switch between RUN-tasks as appropriate. This will allow the CPU to execute at least one of the tasks at any given point of time.

System Call

An additional description will be given of a system call. System calls are largely categorized into three types: calls related activation; calls related to WAIT; and calls related to SET.

(1) System Calls Related to Activation

System calls related to activation are calls related to transition between the STOP state and the READY state.

1-1. Activation System Call

An activation system call is a call whereby task A, a RUN-task, activates another ordinary task B. In the event of an activation system call, task B in the STOP state makes a transition to the READY state.

1-2. Termination System Call

The task that has executed this system call terminates its process and makes a transition from the RUN state to the STOP state. A termination system call may be an instruction whereby a given task causes another task to terminate its process.

(2) System Calls Related to WAIT

System calls related to WAIT are calls related to transition between the RUN state and the WAIT state.

2-1. Wait Semaphore System Call

A system call that requires acquisition of a semaphore (described later).

2-2. Wait Mutex System Call

A system call that requires acquisition of a mutex (described later).

2-3. Wait Event System Call

A system call that waits for the establishment of an event (described later). For execution, a wait event system call accepts an event ID, a wait flag pattern (described later), and a flag condition (described later) as parameters.

Whichever is the case, system calls related to WAIT establish various WAIT cancellation conditions. When the WAIT cancellation condition is already fulfilled when a system call related to WAIT is executed, the RUN-task that has executed the system call makes a transition to the READY state. Meanwhile, when the WAIT cancellation condition is not fulfilled, the RUN-task makes a transition to the WAIT state in which the task waits for the fulfillment of the WAIT cancellation condition.

(3) System Calls Related to SET

System calls related to SET are calls related to transition between the WAIT state and the READY state. Execution of a system call related to SET triggers the establishment of the WAIT cancellation condition.

3-1. Release Semaphore System Call

A system call that releases a semaphore.

3-2. Release Mutex System Call

A system call that releases a mutex.

3-3. Set Event System Call

A system call that establishes a current flag pattern (described later) of an event.

3-4. Clear Flag System Call

A system call that clears the current flag pattern to zero.

The description assumes the use of the nine types of system calls listed above. It goes without saying, however, that various other system calls can be implemented.

Design Concept of Commonly Used RTOS

Figure 2:
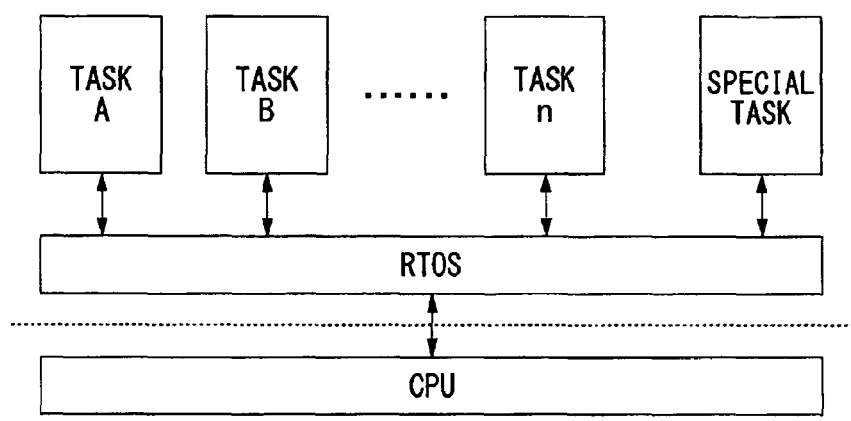
FIG. 2 is a conceptual diagram of a commonly used RTOS.

FIG. 2 is a conceptual diagram of a commonly used RTOS.

The illustrated RTOS is a multitask OS.

A commonly used RTOS is implemented as software. Switching of a RUN-task from task A to task B will be described by way of example. Since task A is occupying the CPU, the RTOS generates an interrupt to the CPU so as to seize the right to use the CPU from task A. Thereupon, the RTOS saves the context information of task A in a TCB. The RTQS selects task B as the next RUN-task and loads the context information from the TCB for task B into a register of the CPU. When the load is complete, the RTOS delivers the right to use the CPU to task B. In this way, the RTOS performs a task switch from task A to task B by temporarily acquiring the right to use the CPU. The same is true of the execution of special tasks. As in the case of ordinary tasks, the RTOS achieves a task switch by saving the context information of a RUN-task in a TCB before delivering the right to use the CPU to a special task.

Since the RTOS is implemented by software, the RTOS needs the right to use the CPU in order to execute its process. In other words, the RTOS and the tasks contend with each other in respect of the right to use the CPU. Hereinafter, an RTOS implemented by software will be referred to as a software OS.

Figure 3:
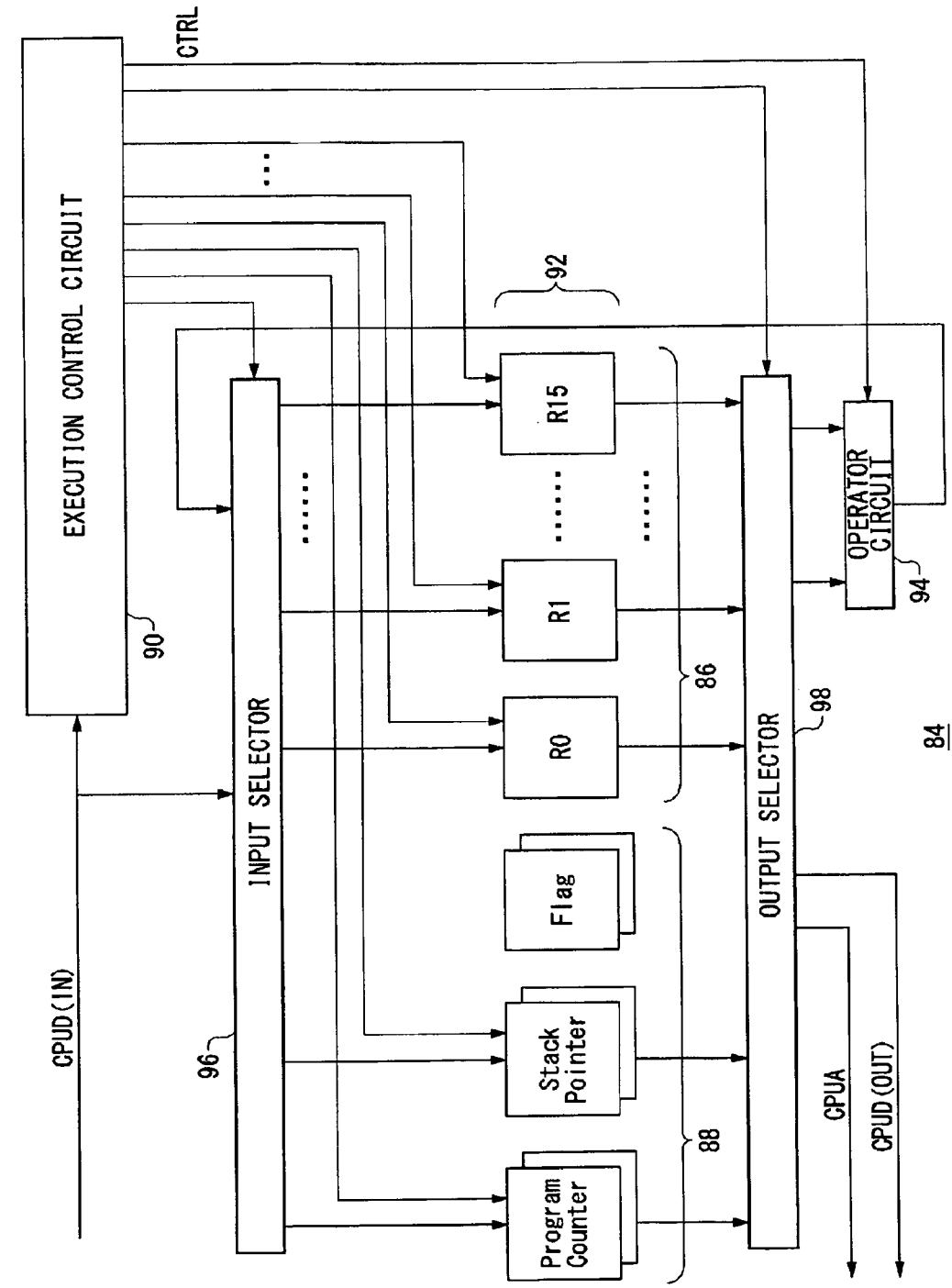
FIG. 3 is a circuit diagram of a commonly used CPU in which a software RTOS is executed.

FIG. 3 is a circuit diagram of a commonly used CPU in which a software RTOS is executed.

A CPU 84 includes an execution control circuit 90 for controlling memory access, instruction execution, etc. in an integrated manner, and a processing register set 92 for storing various data such as context information of tasks, and an operator circuit 94 for arithmetic operation. The processing register set 92 is a set of a plurality of types of registers and is largely categorized into special registers 88 and general-purpose registers 86. Special registers 88 are registers for storing a program counter, a stack pointer, and a flag, etc. General-purpose registers 86 are registers for storing work data and include a total of 16 registers R0-R15. While the special registers 88 are put to both the user's use and the system's use (dual planes), the general-purpose registers 86 is only put to a single use (single plane). Hereinafter, data stored in the processing register set 92 will be referred to as process data.

The execution control circuit 90 uses a control signal (CTRL) directed to an output selector 98 to output the process data in a desired register, of the processing register set 92, to the operator circuit 94. The operator circuit 94 performs an arithmetic operation by referring to the process data, i.e., instructions and variables. The result of operation is output to an input selector 96. The execution control circuit 90 uses a control signal (CTRL) directed to the input selector 96 to feed a result of operation to a desired register of the processing register set 92.

The execution control circuit 90 also reads data from a memory via the CPU bus and loads the data into the processing register set 92 via the input selector 96. Further, the execution control circuit 90 records the process data in the memory via the CPU data bus. The execution control circuit 90 executes a task, while updating the program counter in the special registers 88.

In the event of a task switch, the execution control 90 saves process data in a TCB, an area reserved in the memory. It will be assumed that task A executes a system call and a task switch from task A to task B occurs. The RTOS acquires the right to use the CPU, triggered by the execution of a system call. This causes the CPU 84 to be temporarily operated in accordance with the program of the RTOS. The processing steps are as follows.

Saving of Context Information of Task A

1. The execution control circuit 90 performs switching so as to put the special registers 88 to the system's use instead of the user's use. Process data subject to the RTOS process is loaded into the special registers 88 put to the system's use.

2. The execution control circuit 90 saves the data in the general-purpose registers 86 in a stack (not shown).

3. The execution control circuit 90 loads the process data for the RTOS from a recording medium (not shown) (e.g., another register) into the general purpose registers 86.

At this stage, the process data in the process register set 92 is completely replaced by the process data for the RTOS.

4. The RTOS identifies the TCB for task A in the memory and writes the process data saved in the stack in the TCB. The process data in the special registers 88 put to the user's use is also written in the TCB as part of the context information. In this way, the process data for task A is saved in the TCB. The RTOS indicates in the TCB for task A that task A has made a transition from RUN to READY (or WAIT).

Loading of Context Information of Task B

1. The RTOS identifies the TCB for task B in the memory and writes the context information in the TCB in the stack and in the special registers 88 put to the user's use. The RTOS indicates in the TCB for task B that task B has made a transition from the READY to the RUN.

2. The RTOS removes the data for the RTOS process from the general-purpose registers 86 and saves the same in a recording medium (not shown).

3. The execution control circuit 90 loads the context information in the stack into the general-purpose registers 86. The execution control circuit 90 performs switching so as to put the special registers 88 to the user's use instead of the system's use. In this way, the process data for task B is loaded into the process register set 92.

A task switch is achieved through the processing steps as described above. Normally, each of the general purpose registers 86 comprises a single plane and as such uses a stack in order to switch between the process data for a task and the process data for the RTOS. If the general-purpose registers 86 are provided with two planes, there will be no need to save and load data via a stack. This will allow a task switch to take place at a higher speed.

Even faster task switching by providing save registers 110 for respective tasks can be achieved. A task switch using the save registers 110 will be described in detail with reference to FIG. 5. It will be learned that, in the case of the CPU 84 and the commonly used software RTOS described with reference to FIG. 3, accesses to the TCB occurs frequently for a task switch. An assumption in the example described above is that a task switch from task A to task B occurs. In practice, however, a large number of instructions should be executed in order for the RTOS to select task B. This process also involves frequent accesses from the RTOS to the memory. The task processor 100 enables faster task switching by using a task control circuit 200 (described later) dedicated to task selection.

Hardware Implementation of RTOS by the Task Processor 100

Figure 4:
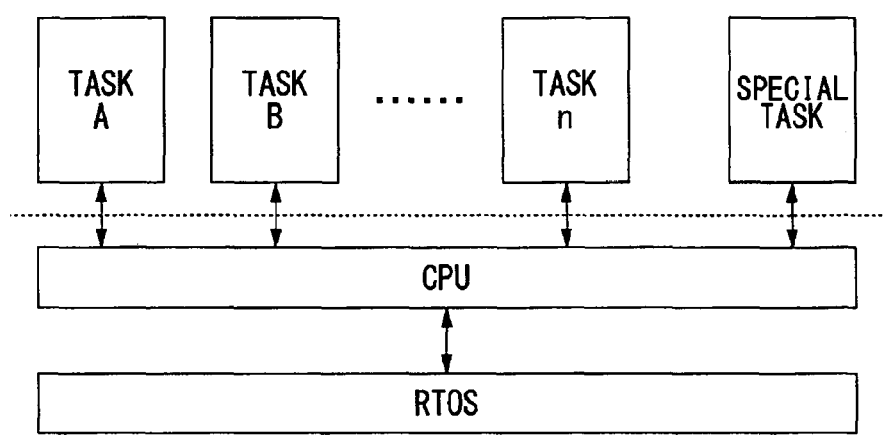
FIG. 4 is a conceptual diagram of the RTOS.

FIG. 4 is a conceptual diagram of the RTOS.

Unlike a commonly used software RTOS, the RTOS is primarily implemented by hardware separate from the CPU. Hereinafter, the RTOS implemented by hardware will be referred to as hardware RTOS. Since the RTOS is primarily configured as hardware separate from the CPU, it hardly needs the right to use the CPU for its processing. In other words, the RTOS and the task do not contend with each other in respect of the right to use the CPU. In the case of the commonly used software RTOS shown in FIG. 2, the CPU serves as a task execution circuit and an RTOS execution circuit. In contrast, in the case of the hardware RTOS, the CPU is clearly defined as a task execution circuit. The task scheduling function is primarily implemented by a save circuit 120 and the task control circuit 200 described later.

Figure 5:
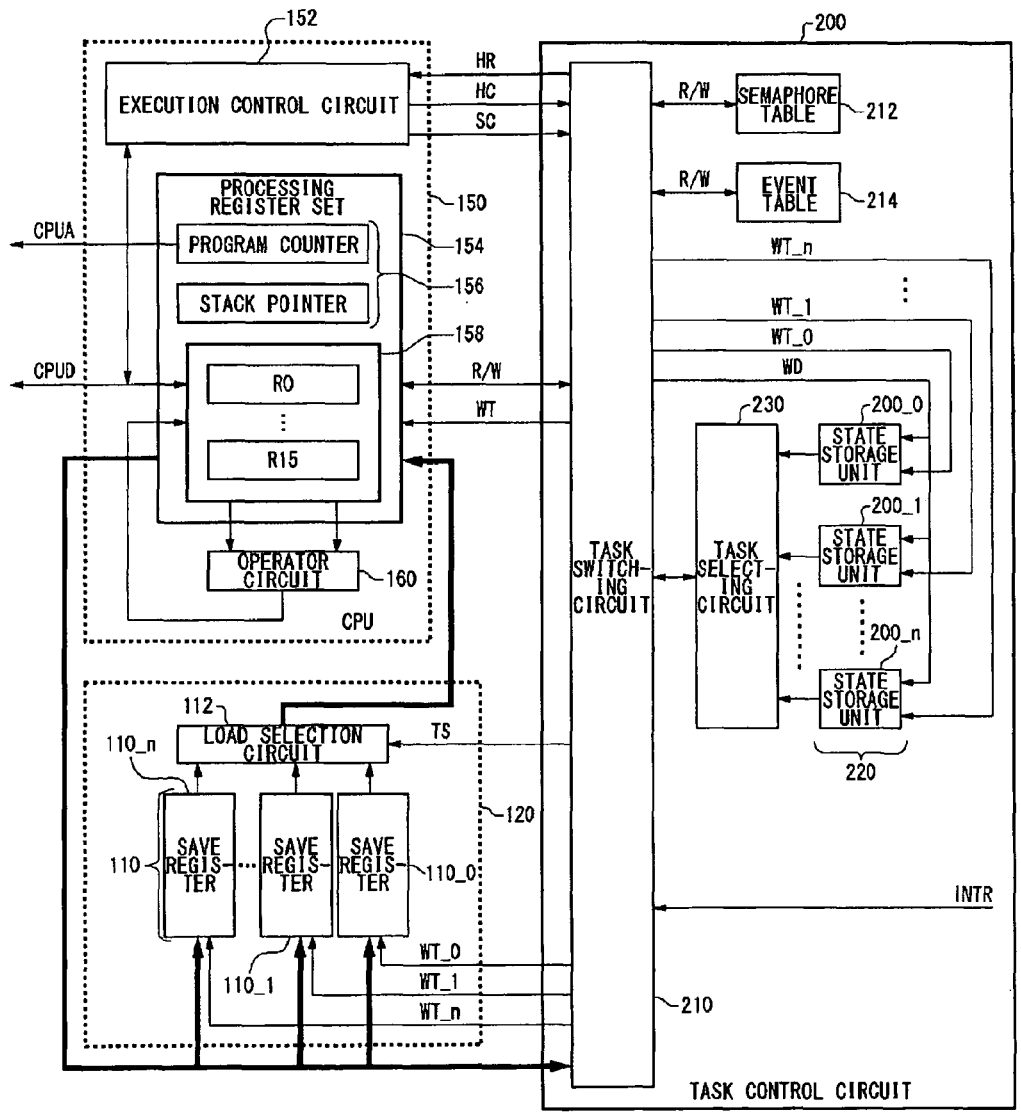
FIG. 5 is a circuit diagram of the task processor according to the basic implementation.

FIG. 5 is a circuit diagram of the task processor 100 according to the basic implementation.

The task processor 100 includes the save circuit 120 and the task control circuit 200 in addition to a CPU 150. The CPU 150 is an entity responsible for the execution of a task. The save circuit 120 and the task control circuit 200 are responsible for playing the role of the RTOS shown in FIG. 4. Task scheduling is performed primarily under the control of the task control circuit 200.

The CPU 150 includes an execution control circuit 152, a processing register set 154, and an operator circuit 160. The CPU 150 may be an ordinary CPU as described with reference to FIG. 3. The difference is that signal lines in the CPU 150 are connected in a manner different from those of the CPU 84 shown in FIG. 3. The specific circuit configuration will be described in detail with reference to FIG. 6.

The task control circuit 200 includes a task switching circuit 210, a semaphore table 212, an event table 214, a task selecting circuit 230, and state storage units 220. The semaphore table 212 and the event table 214 will be described in detail with reference to FIG. 13 and subsequent drawings. The state storage units 220 are units associated with respective tasks. Hereinafter, a state storage unit 220 associated with task A is denoted as a state storage unit 220_A. The same is true of the other units 220. Each state storage unit 220 stores state data of the associated task. State data represents information indicating the attributes (e.g., task priority order, task state, etc.) of a task and forming a part of context information. The specific details of the data will be described later with reference to FIG. 10. The state storage units 220 continuously output the state data of the tasks to the task selecting circuit 230. The task selecting circuit 230 selects a task (e.g., a RUN-task) on the basis of the state data of the tasks. The task selecting circuit 230 will be described in detail with reference to FIG. 10 and subsequent drawings. The task switching circuit 210 performs a task switch when detecting a system call signal (SC) received from the execution control circuit 152 or an interrupt request signal (INTR) from an external device and thereupon.

When a system call is to be executed, the execution control circuit 152 transmits a system call signal (SC) to the task switching circuit 210. When the task switching circuit 210 detects an interrupt request signal (INTR), the task switching circuit 210 asserts a halt request signal (HR) sent to the execution control circuit 152. While the operation of the CPU 150 is halted, the execution control circuit 152 asserts a halt completion signal (HC) sent to the task switching circuit 210. These three signals allow the CPU 150 and the task control circuit 200 to be operated in coordination.

The save circuit 120 includes a load selection circuit 112 and a plurality of save registers 110. The save registers 110 are also units associated with the respective tasks and are used to save process data in the processing register set 154. Therefore, the save registers 110 have a data capacity equal to or greater than that of the processing register set 154. Hereinafter, the save register 110 associated with task A is denoted as a save register 110_A. The same is true of the other registers 110. The load selection circuit 112 is directed by the task switching circuit 210 to load the data in one of the save registers 110 (hereinafter, the data stored in the save register 110 will be referred to as saved data) into the processing register set 154.

Each save register 110 continuously outputs the respective saved data to the load selection circuit 112. When the task switching circuit 210 feeds a task selecting signal (TS) designating a task ID, the load selection circuit 112 outputs the saved data in the save register 110 associated with the designated task to the processing register set 154. Further, when the task switching circuit 210 feeds a write signal (WT) to the processing register set 154, the saved data is actually loaded into the processing register set 154.

Meanwhile, the entirety process data in the processing register set 154 is also continuously output to the save registers 110. When the task switching circuit 210 asserts a write signal (WT) sent to the desired save register 110, the associated processing data is saved in the save register 110. The number of bits transferable in one sitting by the bus connecting the processing register set 154 and the save registers 110 is defined so as to enable parallel transfer of process data. Therefore, the task switching circuit 210 is capable of writing process data in the save registers 110 in one sitting merely by transmitting a write signal once to the save registers 110. The number of bits of the bus connecting the save registers 110 and the load selection circuit 112 and the bus connecting the load selection circuit 112 and the CPU 150 are also defined similarly.

Hereinafter, the methods of performing a task switch in response to a system call and in response to an interrupt request signal will be described.

[1] Execution of System Call

When the execution control circuit 152 of the CPU 15 executes a system call, the execution control circuit 152 halts the clock of the CPU 150 (hereinafter, referred to as CPU clock (CLK). The specific method of halting will be described in detail with reference to FIG. 7, etc. The execution control circuit 152 transmits a system call signal (SC) indicating the execution of a system call to the task switching circuit 210 of the task control circuit 200. When the halt of the CLK is completed, the execution control circuit 152 asserts a halt completion signal (HC) sent to the task switching circuit 210.

Nine signal lines connect the CPU 150 and the task switching circuit 210 for transfer of system call signals. The nine signal lines are associated with the nine types of system calls described before. The execution control circuit 152 transfers a digital pulse via one of the system signal lines in accordance with the type of system call executed. The task switching circuit 210 is immediately capable of detecting the type of system call executed by the identifying the system signal lines on which the digital pulse is detected. The task switching circuit 210 selects necessary data from the data output from the task selecting circuit 230 in accordance with the type of system call and executes the process designated by the system call. The process is executed on the condition that HC is asserted. The relation between the task switching circuit 210 and the task selecting circuit 230 will be described in detail with reference to FIG. 10. The parameter and return value of the system call are written in predetermined general-purpose registers 158 of the processing register set 154. The task switching circuit 210 is capable of reading the parameter from the general-purpose registers 158 and writing the return value in the registers 158. It will be assumed here that task A, a RUN-task, executes a wait semaphore system call. The process data for task A need be saved first.

Saving of Context Information of Task A

The execution control circuit 152 feeds an SC signal indicating a wait semaphore system call to the task switching circuit 210. The execution control circuit 152 halts CLK and asserts HC when the halt is completed. The task switching circuit 210 outputs the semaphore ID of the semaphore to be waited for to a semaphore-based selection circuit 234 (described later), which forms the individual selecting circuits built in the task selecting circuit 230, and the selects task B to be executed next. The task switching circuit 210 writes necessary data in the state storage unit 220_A. For example, the circuit 210 updates the state of task A, switching from RUN to READY or WAIT. More specifically, the task switching circuit 210 outputs state data indicating the task state WAIT to all of the state storage units 220 and thereupon feeds a write signal WT_A only to the state storage unit 220_A. In this way, the state of task A is updated.

Subsequently, the task switching circuit 210 outputs a write signal (WT) to the save register 110_A. Since the process data in the processing register set 154 is continuously output to the save registers 110, the write signal (WT) causes the process data for task A to be saved in the save register 110_A for task A.

Loading of Context Information of Task B

When the updating of the state data of task A and saving of the process data for task A are completed, the task switching circuit 210 outputs a task selecting signal (TS_B) designating task B to the load selection circuit 112. This causes the saved data in the save register 110_B to be output to the processing register set 154. When the task switching circuit 210 outputs a write signal (WT) to the processing register set 154, the saved data for task B is loaded into the processing register set 154. The task switching circuit 210 also writes necessary data in the state storage unit 220 for task B. For example, the circuit 210 updates the state of task B, switching from READY to RUN. When the above process is completed, the execution control circuit 152 resumes the CPU clock. The CPU 15 starts executing task B according to the resumed CPU clock. The further details of the processing method will be described with reference to FIG. 8B.

[2] Generation of Interrupt Request Signal

The task switching circuit 210 detects an interrupt request signal (INTR) from a peripheral device. More specifically, the interrupt request signal (INTR) is transmitted from an interrupt controller (not shown) to the task switching circuit 210. The parameter indicating the level of the interrupt request signal is recorded in a register built in the interrupt controller. The task switching circuit 210 asserts a halt request signal (HR) sent to the execution control circuit 152, whereupon the execution control circuit 152 halts the CPU clock. As in the process initiated by the execution of a system call, the task switching circuit 210 saves the process data for the RUN-task in the save register 110. Subsequently, the task switching circuit 210 activates a special task. Only one type of special task is available for activation irrespective of the parameter of the interrupt request signal. The special task reads the parameter of INTR from the register built in the interrupt controller and performs a process according to the parameter. The process performed by the special task may be the execution of a set event system call or a semaphore system call, or the process may be the activation of an ordinary task. Depending on the parameter, the special task may be terminated without executing any specific process. What process is executed according to the parameter of INTR depends on the implementation of the special task. When the execution of the special task is completed, the next RUN-task is selected from among the READY-tasks.

The task switching circuit 210 loads the process data in the save register 110 associated with the special task into the CPU 150. Time required to switch from an ordinary task to a special task can be estimated from the operation clock of the task control circuit 200. When a predetermined number of operation clocks is counted since HR is asserted and sent to the execution control circuit 152, the task switching circuit 210 negates HR in order to cancel the halt of the CPU clock. When I-IAR is negated, the execution control circuit 152 resumes the CPU clock-. At this point of time, the task switching circuit 210 has completed the task switch from an ordinary task to a special task. The specific details of the processing method will be described later with reference to FIG. 8A.

In either case, core processes involved in a task switch, i.e., (A) saving and loading of process data and (B) task state transition and selection of a RUN-task are implemented in hardware. Elimination of a need to access a TCB on the memory in (A) and (B) additionally contributes to increase of speed in a task switch. What is required in the CPU 150 of the task processor 100 is to additionally include the function of halting and resuming the CPU clock. The scope of the present invention is not limited to the complete hardware implementation of these functions. For example, a skilled person would readily appreciate that the primary function of (A) or (B) may be implemented in hardware and a part of the function of the RTOS may be implemented in software in order to assist the hardware function.

Figure 6:
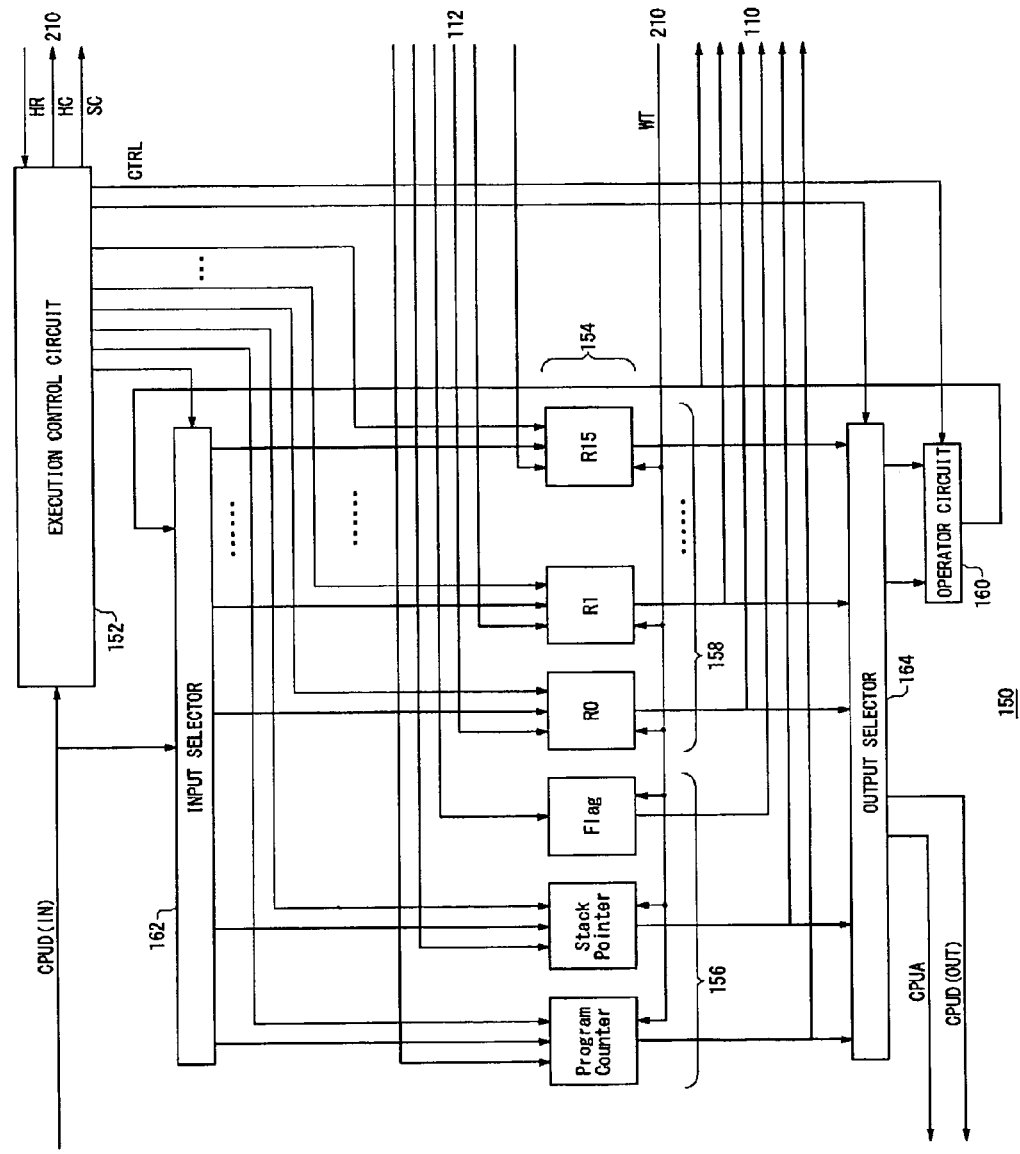
FIG. 6 is a circuit diagram of the CPU of FIG. 5.

FIG. 6 is a circuit diagram of the CPU 150 of FIG. 5.

Unlike the CPU 84 of FIG. 3, the special registers 156 and the general-purpose registers 158 of the processing register set 154 are both of a single-plane configuration. Introduced in the processing register set 154 are an input bus from the load selection A circuit 112, an output bus to the save registers 110, and a signal line for a write signal (WT) from the task switching circuit 210. The execution control circuit 152 uses a control signal (CTRL) directed to an output selector 164 to feed the data in a desired register, of the processing register set 92, to the operator circuit 160. The result of operation represents an input to the input selector 162. The execution control circuit 152 uses a control signal (CTRL) directed to the input selector 162 to feed the result of operation to a desired register of the processing register set 154. The execution control circuit 152 executes a task, while updating the program counter in the special registers 156.

The process data is not saved in the TCB on the memory but in the save registers 110. The processing register set 154 continuously outputs the process data to the save registers 110. The point of time at which the process data is saved in the save registers 110 is controlled by the task switching circuit 210 as described previously.

The saved data is loaded into the processing register set 154 not from the TCB on the memory but from the save registers 110. The determination of a save register 110 from which to load the process data and the timing of load are controlled by the task switching circuit 210 as described previously.

The number of bits transferable by the bus connecting the processing register set 154 and the load selection circuit 112 and the bus connecting the processing register set 154 and the save registers 110 are defined so as to enable parallel transfer of process data in one sitting. Thus, data can be read or written in one sitting in response to a write signal (WT) from the task switching circuit 210. An ordinary software RTOS need occupy the processing register set 154 temporarily for task switching. In contrast, the hardware RTOS need not load special process data into the processing register set 154 for a task switch. What is only required for task switch from task A to task B is to save the process data for task A and then load the process data for task B. Accordingly, there is no need to configure the processing register set 154 to comprise two planes or to swap data via a stack.

Figure 7:
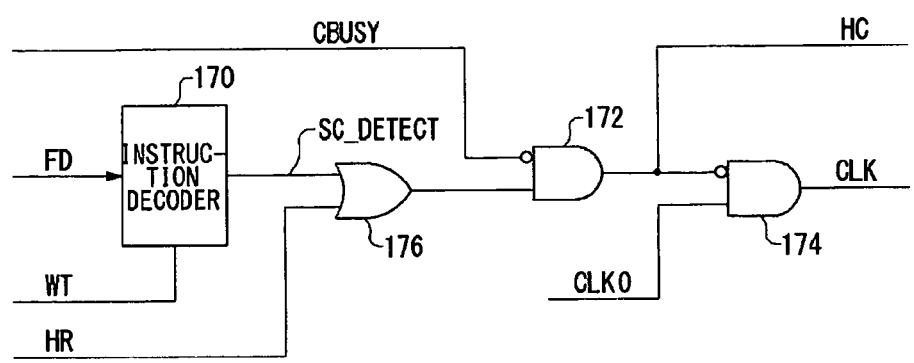
FIG. 7 is a circuit diagram showing how the execution control circuit halts the CPU clock.

FIG. 7 is a circuit diagram showing how the execution control circuit 152 halts the CPU clock.

The original clock (CLK0) and the output of a first AND gate 172 are fed to a second AND gate 174. The output of the gate 172 is inverted before being provided to the gate 174. The output of the first AND gate 172 is a halt completion signal (HC). Since the halt completion signal (HC) is normally zero, the second AND gate 174 outputs the input original clock (CLK0) as the CPU clock (CLK) unmodified. The CPU 150 operates by receiving the CPU clock output by the second AND gate 174. When the output of the first AND gate 172 is 1, i.e., when the halt completion signal (HC)=1, the output of the second AND gate 174 is fixed at zero so that the CPU clock (CLK) is halted.

The output of an OR gate 176 and a CPU busy signal (CBUSY) are fed to the first AND gate 172. The CPU busy signal is inverted before being provided to the gate 172. CBUSY is a signal output from a known state machine that generates an internal cycle of the CPU 150. When the CPU 150 can be halted, CBUSY becomes 1. For example, when the operator circuit 94 has executed a single instruction or the last of a plurality of instructions being locked and the CPU can be halted accordingly, or when the supply of the CPU clock is already halted, CBUSY becomes 0.

The output of an instruction decoder 170 (SC_DETECT) and a halt request signal (HR) from the task switching circuit 210 are fed to the OR gate 176. The instruction decoder 170 has a built-in latch circuit for latching SC_DETECT. The instruction decoder 170 receives data (FD) fetched from the CPU 150. When FD is a system call instruction, the decoder 170 outputs SC_DETECT=1. The built-in latch circuit ensures that the instruction decoder 170 continues to output SC_DETECT=1 even if FD changes T subsequently. A write signal (WT) sent from the task switching circuit 210 to the processing register set 154 is also fed to the instruction decoder 170. When WT changes from 0 to 1, the saved data is loaded into the processing register set 154, as described previously. WT is a pulse signal that returns from 1 to 0 after a predetermined period of time. When WT changes from 1 to 0, the latch circuit of the instruction decoder 170 is reset and the instruction decoder 170 negates SC_DETECT. The relation between SC_DETECT and the write signal (WT) will be described in detail with reference to FIG. 8B. The instruction decoder 170 is a device exclusively provided in the execution control circuit 152 in order to determine whether an instruction subject to execution is a system call. In a variation, the instruction decoder 170 and the CPU decoder responsible for the decoding stage of the CPU 150 may be implemented in the same hardware. In this case, the instruction decoder 170 can be implemented by adding to the CPU decoder the function of outputting SC_DETECT=1 when the decoded data is a system call instruction.

When an instruction request signal (INTR) occurs, the task switching circuit 210 asserts a halt request signal (HR) sent to the execution control circuit 152. In other words, the output of the OR gate 176 goes 1 when a system call is executed or when a halt request signal (HR) is asserted.

To summarize, when a system call is executed or an interrupt request signal occurs, and when the CPU busy signal goes 0, the output of the first AND gate 172 goes 1 and the second AND gate 174 discontinues outputting the CPU clock.

Figure 8A:
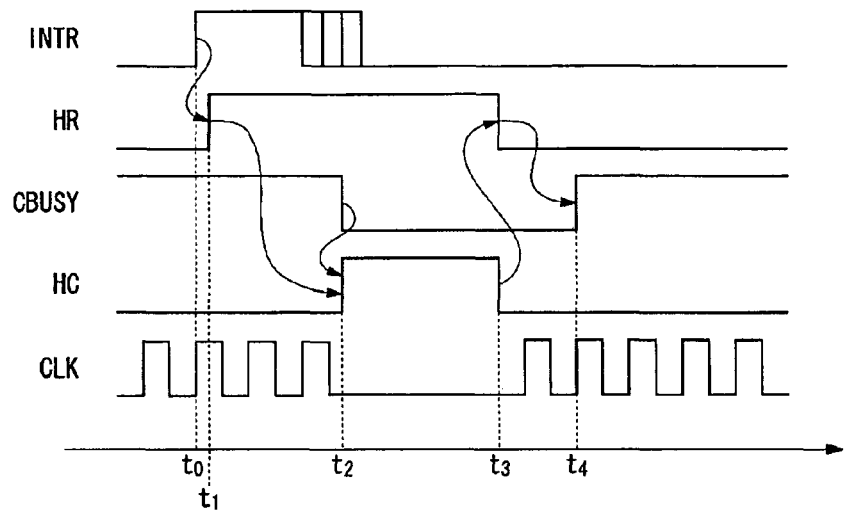
FIG. 8A is a time chart showing the relation between signals when an interrupt request signal occurs.

FIG. 8A is a time chart showing the relation between signals when an interrupt request signal occurs.

Referring to FIG. 8A, the task switching circuit 210 detects an interrupt request signal (INTR) from an external device at time t0. The task switching circuit 210 asserts a halt request signal (HR) sent to the execution control circuit 152 in order to allow execution of a special task. Time t1, when the signal HR is input, substantially concurs with time t0 when the interrupt is detected. At time t1, the state machine of the CPU 150 indicates that a task is being executed so that CBUSY=1. Since HR=1, the OR gate 176 outputs 1. However, the CPU 150 is not halted since CBUSY=1. Therefore, even if I-IR=1 is fed, the CPU clock (CLK) in synchronization with the original clock (CLK0) is output for a time.

As time elapses, CBUSY goes 0 at time t2.

Since HR=1 already, the first AND gate 172 outputs HC=1. The CPU clock output from the second AND gate 174 is fixed at 0. Meanwhile, the task switching circuit 210 initiates a task switch from an ordinary task to a special task, triggered by the assertion of HC. Details will be described later. Time required for a task switch includes several clocks for operating the task control circuit 200. The task control circuit 200 negates the halt request signal (HR) on the condition that the operation clock for the task control circuit 200 changes a predetermined number of times (time t3) since the assertion of HC. Since HR=0, the execution control circuit 152 resumes the CPU clock (CLK). When the CPU 150 resumes its process, the CPU 150 changes CBUSY from 0 to 1 (time t4). Thus, in a period from time t2 to time t3, while the CPU clock is halted, a task switch from an ordinary task to a special task is performed.

In an alternative method of processing, HR may be negated on the condition that the task switching circuit 200 has completed a task switch instead of on the condition that the operation clock for the task control circuit 200 changes a predetermined number of times. The execution control circuit 152 may negate HC on the condition that I-IR is negated. The execution control circuit 152 resumes the CPU clock (CLK)' when HC=0. The execution of the task may be resumed accordingly.

Figure 8B:
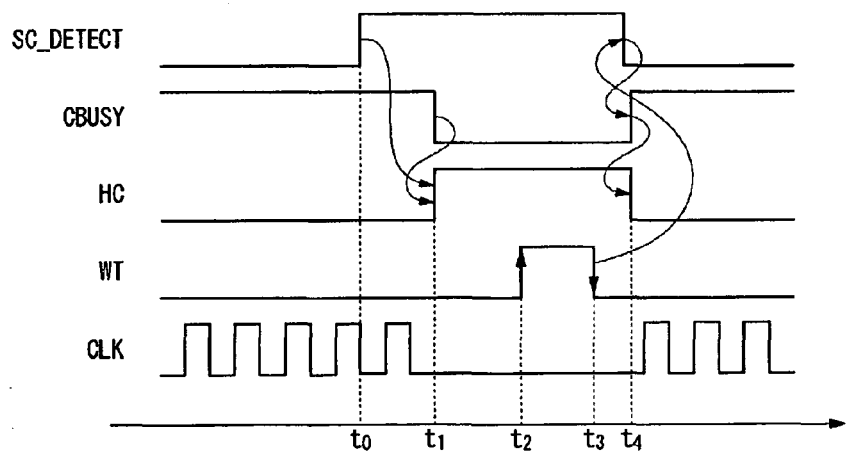
FIG. 8B is a time chart showing the relation between signals when a system call is executed.

FIG. 8B is a time chart showing the relation between signals when a system call is executed. 4

Referring to FIG. 8B, the instruction decoder 170 detects a system call and changes SC_DETECT from 0 to 1 at time t0. At time t0, the slate machine of the CPU 150 indicates that the task is being executed so that CBUSY=1. Since SC_DETECT=1, the OR gate 176 outputs 1. However, since CBUSY=1, the CPU 150 is not halted. Therefore, even if SC_DETECT=1 is output, the CPU clock (CLK) in synchronization with the original clock (CLK0) is output for a time.

As time elapses, CBUSY goes 0 at time t1. Since SC_DETECT=1 and CBUSY=1, 1-IC is negated and the CPU clock is halted. When HC=0 is fed, the task switching circuit 210 initiates a task switch and outputs a write signal (WT) to the CPU 150. At time t2, when WT goes from 0 to 1, the saved data is loaded into the processing register set 154. Since a write signal (WT) is a pulse signal, WT goes 0 at time t3 after an elapse of a predetermined time. Detection of a falling edge of WT (WT:1->0) causes SC_DETECT latched in the instruction decoder 170 to be reset (time t4). At this point of time, CBUSY changes from 0 to 1. Since CBUSY=1, HC=0 so that the CPU clock is resumed. Thus, in a period from time t1 to time t4, while the CPU clock is halted, a task switch is performed.

In an alternative method of processing, I-IC may be negated on the condition that the task switching circuit 200 has completed a task switch and negated I-IR instead of on the condition that a falling edge of WT (WT:1->0) is detected. SC_DETECT is reset on the condition that I-IC=0. The execution control circuit 152 resumes the CPU clock (CLK) and CBUSY goes from 0 to 1.

In any case, the CPU 150 need not have knowledge that the RUN-task is switched while the CPU clock is halted. The task switching circuit 210 performs a task switch while the CPU clock is halted so that the CPU 150 is "frozen". Therefore, the process in the CPU 150 and the process in the task switching circuit 200 are isolated from each other in the sequence of events.

Figure 9:
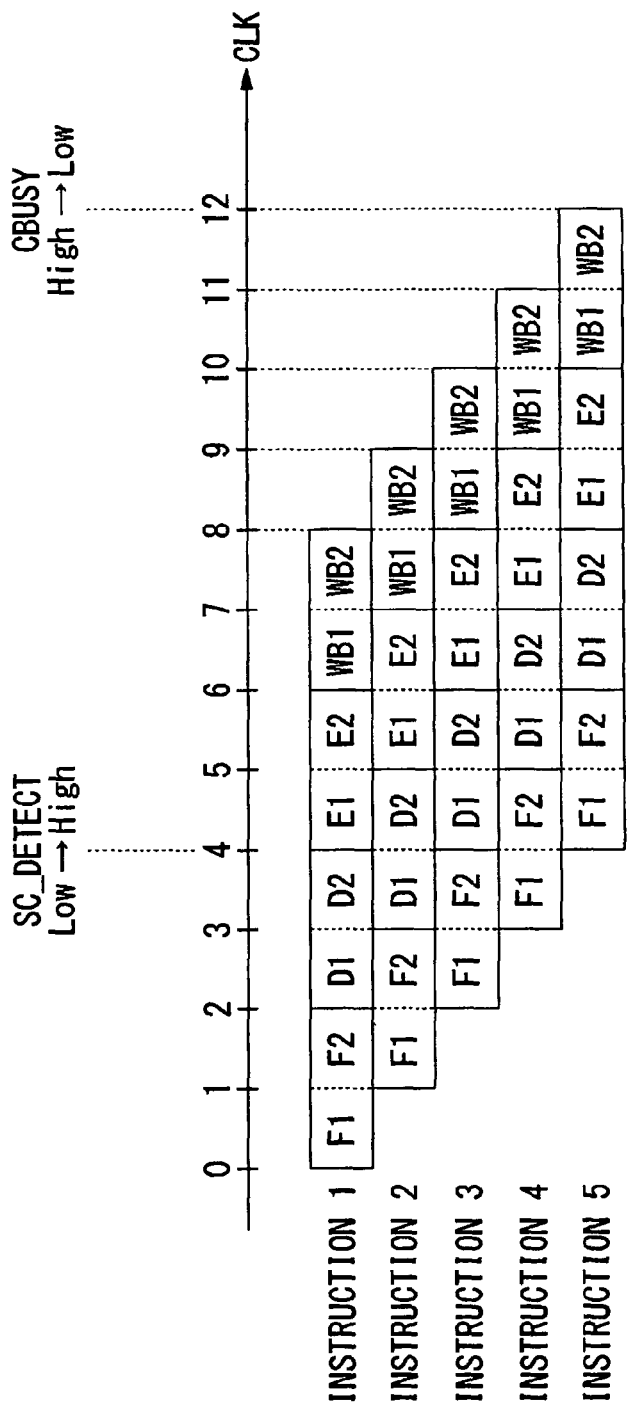
FIG. 9 schematically shows the timing of halting the CPU clock in a pipeline process.

FIG. 9 schematically shows the timing of halting the CPU clock in a pipeline process.

The CPU 150 executes a task by executing a plurality of instructions, reading them sequentially from the memory into the processing register set 154. Execution of an instruction as a unit of execution of a task is decomposed into the following four phases.

1. F (fetch): the instruction is retrieved from the memory.
2. D (decode): the instruction is decoded.
3. E (execution): the instruction is executed.
4. WB (write back): the result of execution is written in the memory.

When a given task sequentially executes instructions 1 through 5, instruction 1 may be allowed to go through stages F through WB and then instruction 2 may be allowed to go through stage F. However, for efficient execution, the execution of instruction 2 is started during the execution of instruction 1 in a majority of cases. Such a method of processing is called pipeline processing. For example, when instruction 1 reaches phase D, phase F of instruction 2 is started. When instruction 1 reaches phase E, phase D of instruction 2 and phase F of instruction 3 are initiated. Thus, the execution time of each task can be reduced by increasing the number of instructions executed per unit time.

Each phase may be further divided into two small phases. For example, phase F may be divided into two phases F1 an F2. When instruction 1 reaches phase F2, phase F1 of instruction 2 is started. When instruction 1 reaches phase D1, phase F2 of instruction 2 and phase F1 of instruction 3 are started. By segmenting a phase, the computing resources of the CPU 150 can be used more efficiently. Referring to FIG. 9, a description will be given of the timing of halting the CPU clock when a system call is generated in a pipeline process whereby each phase is segmented into two phases for execution.

Referring to FIG. 9, instruction 1 is started to be processed at time 0 defined by the CPU clock. At time 4 defined by the CPU clock, decoding of instruction 1 is completed. It will be assumed that instruction 1 is a system call. The instruction decoder 170 changes SC_DETECT from 0 to 1. SC_DETECT returns from 1 to 0 on the condition that the write signal from the task switching circuit 210 to the processing register set 154 changes from 1 to 0. Even if SC_DETECT=1 is output, CBUSY remains 1 since instructions 2 through 5 are already being executed. Therefore, the second AND gate 174 continues to output the CPU clock. Meanwhile, when SC_DETECT=1, the execution control circuit 152 suspends the update of the program counter so that no new instructions are fetched. Accordingly, instruction 6 and subsequent instructions are not fetched.

The execution of instruction 1 is completed at time 8 defined by the CPU clock, but instructions 2 through 5 are being executed. Therefore, the CPU busy signal remains 1. When time 12 defined by the CPU clock is reached, the execution of instruction 5 is completed. At this point of time, the CPU busy signal goes 0. The supply of the CPU clock is halted according to the process described with reference to FIG. 8B. The task switching circuit 210 saves the process data yielded upon completion of the execution of instruction 5 in the save registers 110. According to the method of halting as described above, a task switch can take place in such a manner that the result of execution of instructions subsequent to the execution of a system call is not wasted. When the task switch is completed, the CPU busy signal is set to 1 again and the instruction decoder 170 resumes its process. This resumes the supply of the CPU clock.

In an alternative method of processing, the CPU busy signal may be set to 0 at a point of time when the execution of a system call instruction is completed so that the supply of the CPU clock is halted. In this case, instructions that are executed concurrently with the system call instruction are halted while being executed. The interim results of processing the suspended instructions are recorded in the processing register set 154 before being saved in the save registers 110. The execution of the suspended instructions is resumed when the task generating these instructions is turned into a RUN-task subsequently. For example, when an instruction is fetched and then suspended at that stage, instructions and operands read from the memory are saved in the save registers 110. When the task is resumed, the data in the save registers 110 is loaded into the processing register set 154 so that the decoding stage and the subsequent stages are executed.

Figure 10:
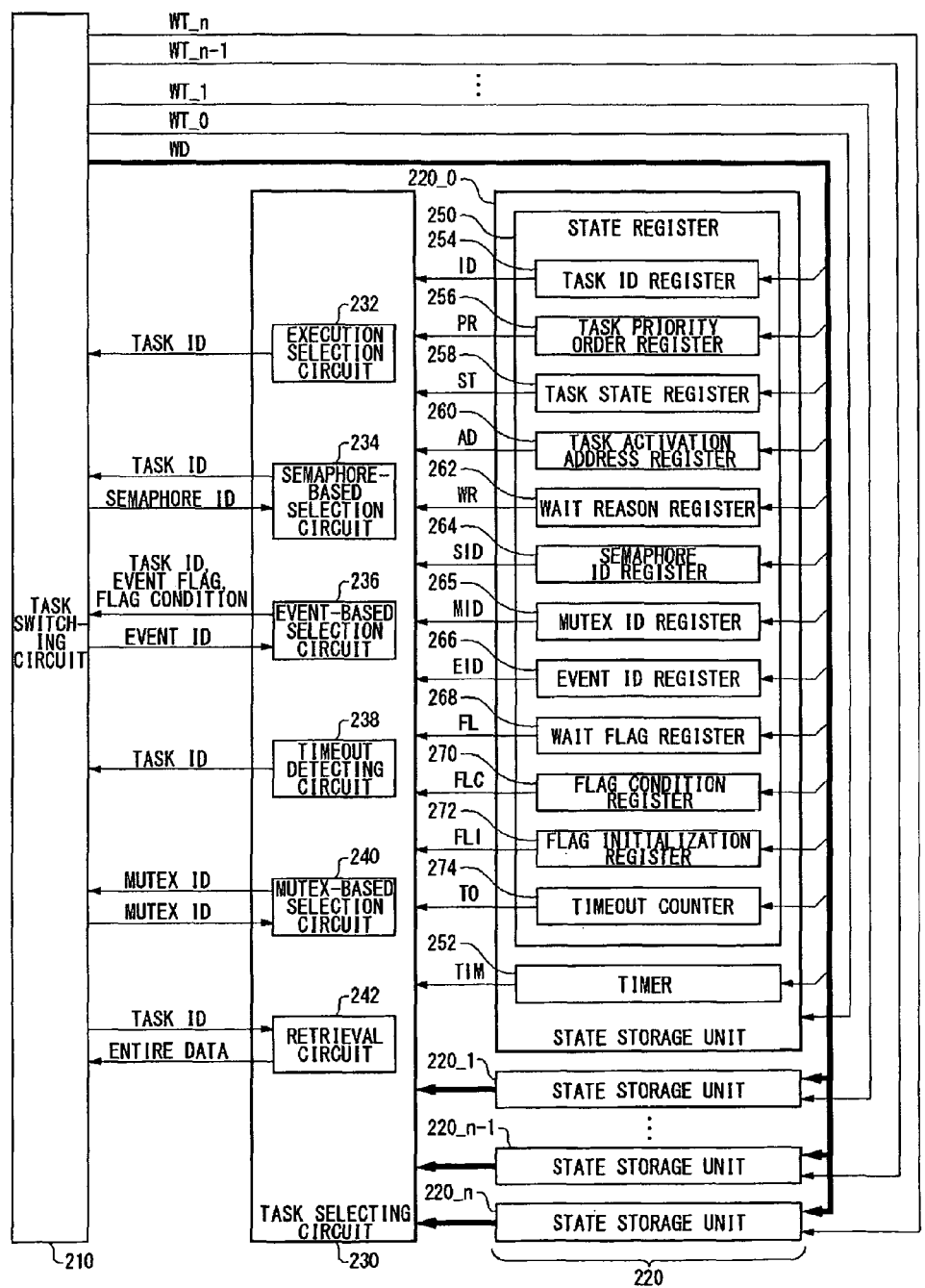
FIG. 10 is a circuit diagram showing the relation between the state storage units and the task switching circuit.

FIG. 10 is a circuit diagram showing the relation between the state storage unit 220 and the task switching circuit 210.

The state storage unit 220 includes a state register 250 and a timer 252. The stage storage unit 220 stores the state data of a task. The timer 252 is started when a task makes a transition to the READY state or to the WAIT state. Time elapsed since the transition of a task to the READY state is referred to as elapsed READY time and time elapsed since the transition of a task to the WAIT state will be referred to as elapsed WAIT time. The timer 252 continuously outputs the value of the elapsed time as a TIM signal. When a task makes a transition to the READY state or to the WAIT state in a task switch, the task switching circuit 2'10 drives the timer 252 for the task so as to start measuring time.

The state storage unit 220 is a set of registers as described below.

(A) Task ID register 254: a register for storing a task ID. The task ID register 254 continuously outputs an ID signal indicating a task ID to the task selecting circuit 230. Hereinafter, the ID signal output from the task ID register 254 for task A to the task selecting circuit 230 will be denoted as an ID_A signal. The same notation will be used for all the other signals output from the state storage unit 220.

(B) Task priority order register 256: a register for storing a task priority order. The task priority order register 256 continuously outputs a PR signal indicating the priority order of a task. The larger the value, the higher the priority of the task, 0 denoting the highest priority.

(C) Task state register 258: a register for storing a task state. The register 258 continuously outputs an ST signal indicating one of the STOP, RUN, WAIT, and IDLE states. An IDLE state occurs prior to the initialization of a task.

(D) Task activation register 260: a register for storing the TCB address of a task in the memory. The register 260 outputs an AD signal.

(E) Wait reason register 262: a register for storing the reason for wait while a task is in the WAIT state, the reason for wait forming a WAIT cancellation condition. The reasons for wait are as follows:

"in wait for a semaphore";
"in wait for an event"; and
"in wait for a mutex".

The register 262 outputs a WR signal.

(F) Semaphore ID register 264: a register for storing the semaphore ID of a semaphore to wait for when a task is in the WAIT state for the reason that the task waits for a semaphore. The register 264 outputs an SID signal.

(G) Mutex ID register 265: a register for storing the mutex ID of a mutex to wait for when a task is in the WAIT state for the reason that the task waits for a mutex. The register 264 outputs an MID signal.

(H) Even ID register 266: a register for storing the event ID of an event to wait for when a task is in the WAIT state for the reason that the task waits for an event. The register 266 outputs an EID signal.

(I) Wait flag register 268: a register for storing a wait flag pattern when a task is in the WAIT state for the reason that the task waits for an event. The register 268 outputs an FL signal.

(I) Flag condition register 270: a register for storing a flag condition when a task is in the WAIT state for the reason that the task waits for an event. The register 270 outputs an FLC signal. A wait flag pattern and a flag condition will be described in detail later.

(K) Flag initialization register 272: a register for storing data indicating whether or not a wait flag pattern is established. The register 272 outputs an FLI signal.

(L) Timeout counter 274: a register for storing a timeout value. A timeout value is a variable designated in system calls related to WAIT. The task switching circuit 210 decrements the timeout value of the timeout counter 274 periodically. The counter 274 outputs a TO signal. Instead of allowing the task switching circuit 210 to decrement a timeout value, the timeout counter 274 may periodically decrement its timeout value autonomously.

The task selecting circuit 230 selects a task on the basis of the signals output from the state storage units 220. The task selecting circuit 230 include the following circuits.

(A) Execution selection circuit 232: a circuit for selecting a next RUN-task to effect a task switch. The execution selection circuit 232 always selects one of the tasks on the basis of the state data continuously output from the state storage units 220. The execution selection circuit 232 receives four inputs ID, ST, PR, and TIM. The circuit outputs the task ID of the next RUN-task. The circuit configuration will be described in detail with reference to FIG. 12.

(B) Semaphore-based selection circuit 234: a circuit for selecting the task to make a transition from the WAIT state to the READY state in response to the execution of a release semaphore system call. The circuit 234 receives the semaphore ID of the semaphore released by a release semaphore system call (hereinafter, simply referred to as a semaphore to be released) from the task switching circuit 210. The circuit 234 receives six inputs ID, ST, WR, PR, SID, and TIM from the state storage units 220. The output of the circuit 234 is the task ID of the task to make a transition from the WAIT state to the READY state. In the absence of the associated task, the circuit 234 outputs a predetermined value such as −1. The specific circuit configuration will be described in detail with reference to FIG. I3.

(C) Event-based selection circuit 236: a circuit for selecting the task to make a transition from the WAIT state to the READY state in response to the execution of a set event system call. The circuit 236 receives the event ID of the event that is set by a set event system call (hereinafter, simply referred to as a set event) from the task switching circuit 210. The circuit 236 receives six inputs ID, ST, WR, EID, FL, and FLC from the state storage units 220. The output of the circuit 236 is the task ID of the task to make a transition from the WAIT state to the READY state and FL and FLC of the task.

(D) Timeout detecting circuit 238: a circuit for detecting a task among the tasks in the WAIT state, for which the timeout value of the timeout counter 274 reaches zero. The timeout detecting circuit 238 is driven each time the timeout value is updated. The circuit 238 receives three inputs ID, ST, and TO. The circuit 238 outputs the task ID of the associated task. In the absence of the associated task, the circuit 238 outputs a 4 predetermined value such as −1.

(E) Mutex circuit 240: a circuit for selecting the task to make a transition from the WAIT state to the READY state in response to the execution of a release mutex system call. The circuit 240 receives the mutex ID of the mutex released by a release mutex system call (hereinafter, simply referred to as a released mutex) from the task switching circuit 210. The circuit 240 receives six inputs ID, ST, WR, PR, SID, and TIM from the state storage units 220. The circuit 240 outputs the task ID of the task to make a transition from the WAIT state to the READY state. In the absence of the associated task, the circuit 240 outputs a predetermined value such as −1.

(F) Retrieval circuit 242: a circuit that outputs the entire state data of a task when the task ID thereof is received from the task switching circuit 210.

Hereinafter, a task switch will be described, highlighting the process of the task selecting circuit 230 and discussing the selection of a RUN-task, semaphore, event, mutex, and timeout in comparison with the commonly used technology.

[Selection of a RUN-Task]

[1] Selection of a RUN-Task by a commonly used Software RTOS

Figure 11:
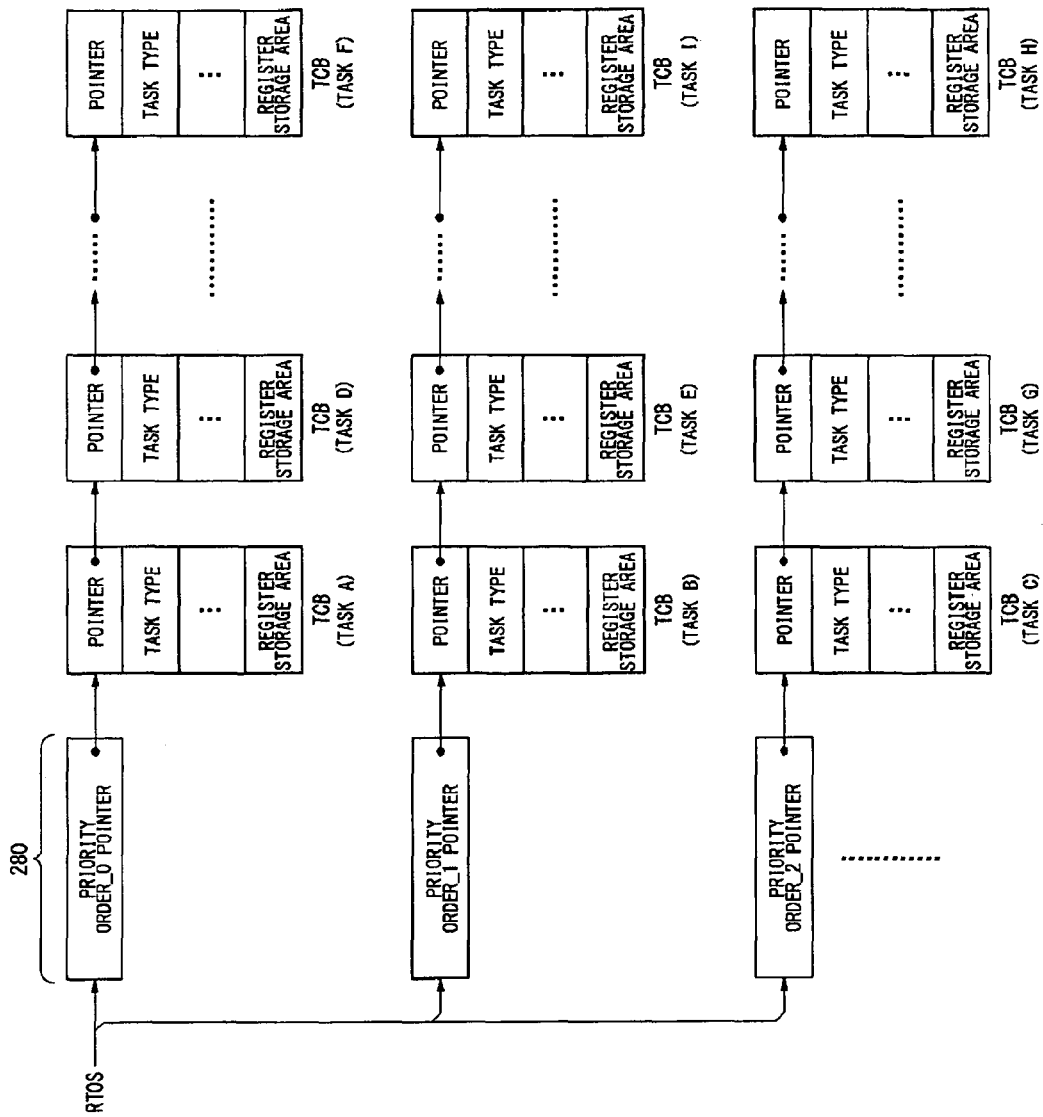
FIG. 11 shows a task ready list used by a commonly used RTOS to select a RUN-task.

FIG. 11 shows a task ready list used by a commonly used RTOS to select a RUN-task.

A task ready list is formed on the memory, connecting the TCBs of the READY-tasks by pointers. Priority order pointers 280 are provided for respective task priority orders and indicate the start address of the TCB for the task having the associated task priority order. In the case of the task ready list of FIG. 11, the priority order pointer 280 of the task priority order 0 addresses the TCB for task A. The priority order pointer 280 of the task priority order 1 addresses the TCB for task B. The TCB for task A addresses the TCB for task D.

A commonly used software RTOS scans the task ready list to select the next RUN-task. In this process, the RTOS performs the following two steps.

A. Cause a RUN-task to make a transition from RUN to READY.

B. Select the next RUN-task and causes the selected task to make a transition from READY to RUN The process performed by the software RTOS is decomposed into the following.

State Transition of a RUN-Task

The description hereunder assumes that task] is the RUN-task.

A1. The RTOS stores the task ID of the RUN-task in the memory.

The RTOS acquires the address of the TCB for task] on the basis of the task ID.

A2. The RTOS accesses the TCB to acquire the task priority order of task J. It will be assumed that the task priority order is 0.

A3. The RTOS refers to the task ready list shown in FIG. 11 to acquire the priority order pointer 280 associated with the task priority order of task J.

A4. The RT OS detects the TCB indicated by the priority order pointer 280 thus acquired. In this case, the TCB for task A is detected.

A5. The RTOS follows the pointer leading from the TCB for task A so as to detect the TCB at the end of the list. FIG. 11 shows that task is at the end of the list.

A6: The RTOS configures the pointer from the TCB for task F to address the TCB for task J. In this way, the TCB for task I is added to the task ready list.

A7. The RTOS indicates in the TCB for task J that task J is in the READY state. The process data is copied to the register storage area of the TCB.

State Transition of a READY-Task

B1. The RTOS detects whether the priority order pointer 280 of the task priority order 0 points to any TCB. In the absence of TCBs, RTOS detects whether the priority order pointer 280 of the task priority 1 points to any TCB. The RTOS attempts to identify a task until a TCB pointed to is found, while going through the list in the descending order of task priority. In the illustrated case, task A is identified.

B2. The RTOS removes task A from the task ready list. More specifically, the priority order pointer 280 of the task order 0 is rewritten so as to address the TCB for task D instead of task A. Further, the pointer of task A is configured to NULL so as not to address task D. In this way, the TCB for task A is removed from the task ready list.

B3. The RTOS indicates in the TCB for task A that task A is in the RUN state. Further, the process data saved in the register storage area of the TCB for task A is loaded into the processing register set.

A commonly used software RTOS performs a task switch by using the task ready list as described above. The following policies are observed when the RTOS selects a RUN-task from among a plurality of READY-tasks.

1. The task selected should be a READY-task (first condition).

2. The task selected should have the highest priority order among the READY-tasks (second condition).

3. If there are a plurality of tasks assigned the highest task priority order, the task selected should have the oldest history of going into the READY state (third condition).

These three conditions will be collectively referred to as a RUN-task selection condition. The execution control circuit 232 of the task processor 100 implements the RTOS's task scheduling function as described above in hardware.

Figure 12:
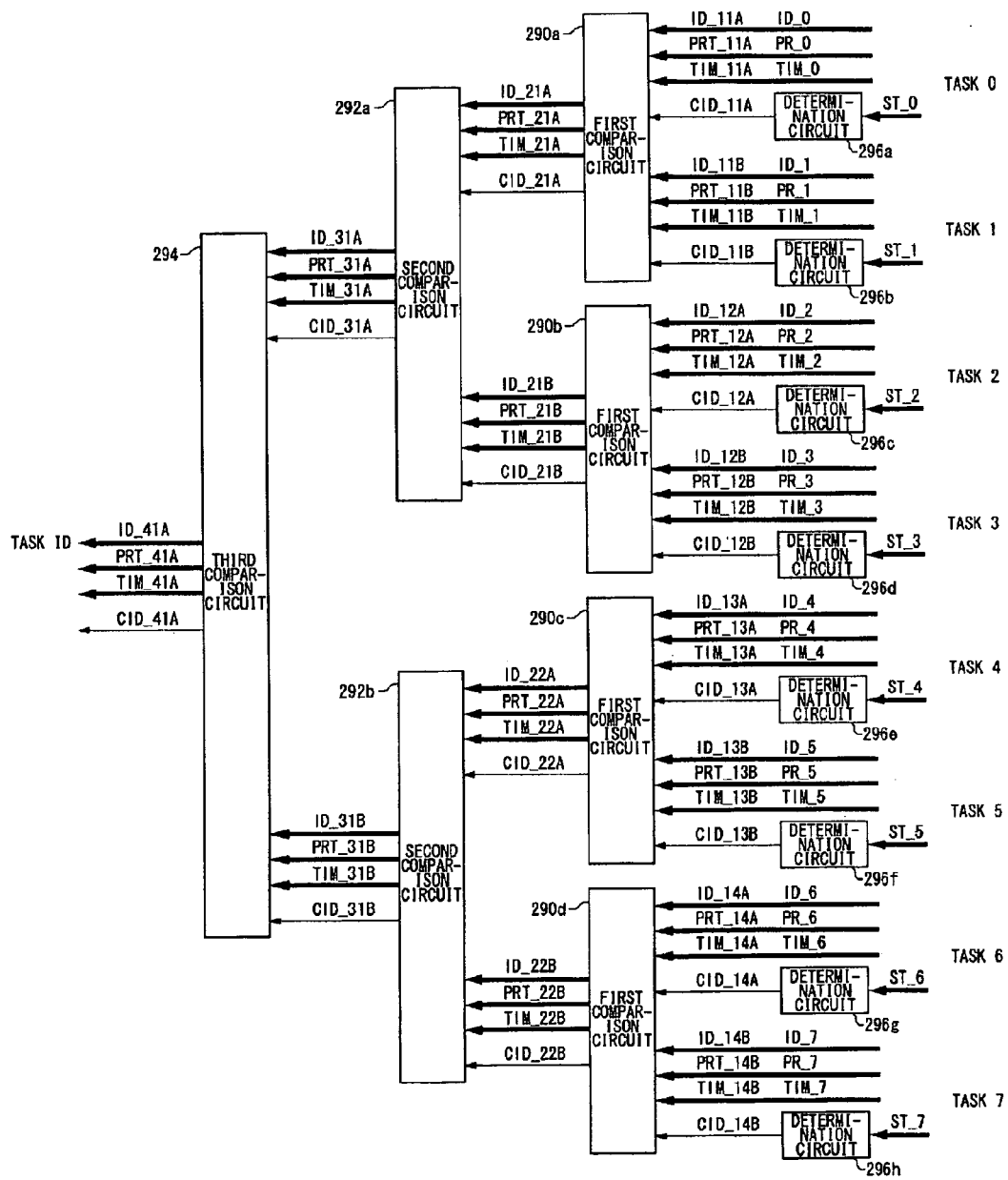
FIG. 12 is a circuit diagram of the execution selection circuit.

[2] Selection of a Run-Task by the Hardware RTOS According to the Basic Implementation FIG. 12 is a circuit diagram of the execution selection circuit 232.

The description hereunder assumes that a RUN-task is selected from among eight tasks, namely task 0 through task 7. The execution selection circuit 232 includes four 1st comparison circuits 290 (290a-290d), two 2nd comparison circuits 292 (292a, 292b), and a 3rd comparison circuit 294. The circuit 232 also includes eight determination circuits 296 (296a-296h). Each of the determination circuits 296 receives an ST signal indicating the task state. When the signal indicates READY, the circuit 296 outputs a CID signal at 1. When the signal indicates a state other than READY, the circuit 296 outputs a CID signal at 0.

The determination circuit 296 performs a determination based upon the first condition of the RUN-task selection condition. Each of the first comparison circuits 290 receives ID, PR, and TIM of two tasks and also receives the CID signal from the determination circuit 296.

The first comparison circuit 290a will be described by way of example. The first comparison circuit 290a compares task 0 and task 1 so as to select the suitable of the two on the basis of the RUN task selection condition mentioned above.

First determination: the circuit 290a compares the CID signals output from the determination circuit 296a and the determination circuit 296b, respectively. If one of the signals is 1, i.e., if only one of the tasks is in the READY state, the first comparison circuit 29a outputs ID, PR, and TIM of the task. If both of the signals are 0, i.e., if neither of the tasks is in the READY state, the first comparison circuit 290a outputs ID=PR=TIM=NULL. This shows that none of the tasks is selected. If both of the signals are 1, i.e., if both of the tasks are in the READY state, the second determination is performed as described below.

Second determination: the circuit 290a compares the PR signal of task'0 and the PR signal of task 1 so as to select the task with the higher task priority order. For example, given that the task priority order of task 0 is 1 and the task priority order of task 1 is 2, the circuit 290a outputs ID, PR, and TIM of task 0. The second determination enables selection of the RUN-task with the highest task priority order as a candidate for RUN-task. If the task priority order of task 0 is the same as that of task 1, the third determination is performed as described below.

Third determination: the circuit 290a compares the TIM signal of task 0 and the TIM signal of task 1 so as to select the task with the longer elapsed READY time. If the tasks are associated with the same elapsed READY time, task 0 is selected. Since the determination is made only by comparing the elapsed time, TCB order management such as that based on a task ready list is not necessary.

In this way, a pair of task 0 and task 1, a pair of task 2 and task 3, a pair of task 4 and task 5, and a pair of task 6 and task 7 are subject to comparison according to the RUN task selection condition. Each of the second comparison circuits 292 narrows down the candidates for RUN-task by examining the output from the two 1st comparison circuits 290. The second comparison circuit 292a performs task selection by referring to the outputs of the first comparison circuit 290a and the first comparison circuit 290b. Therefore, the second comparison circuit 292a outputs ID, PR, and TIM of the task that best matches the RUN task selection condition from among task 0 through task 3. The third comparison circuit 294 operates in a similar manner. The third comparison circuit 294 outputs the task ID of one of task 0 through task 7.

According to the method of processing as described above, the RUN task selection condition can be implemented in hardware. A commonly used software RTOS selects a RUN-task by accessing a task ready list. In contrast, the execution selection circuit 232 selects a RUN-task by referring to the state data continuously output from the state storage units 220. The process performed by the execution selection circuit 232 is summarized as follows.

State Transition of a RUN-Task

The description hereunder assumes that task] is the RUN-task.

A1. The task switching circuit 210 indicates READY in the task state register 258 for task J.

A2. The task switching circuit 210 sets the timer 252 for task I so as to start measuring the elapsed READY time.

This causes task I to make a transition from RUN to READY. As described previously, the process data is saved in the save register 110 for task J. The bus connecting the processing register set 154 and the save registers 110 is capable of transferring process data in parallel so that the processes A1 and A2 can be performed in one clock.

<State transition of a READY-Task>

B1. The task switching circuit 210 identifies the RUN-task by referring to the task ID output from the execution selection circuit 232 upon completion of the state transition of task J. The circuit 210 indicates RUN in the task state register 258 for the identified task.

Thus, the identified task makes a transition from READY to RUN. The process data for the identified task is loaded from the save registers 110 into the processing register set 154. The bus connecting the save registers 110 and the processing register set 154 is also capable of transferring process data in parallel so that the process of B1 can be performed in one clock. I A software RTOS consumes more CPU clocks in a task switch due, for example, to accesses to a task ready list. In contrast, the task control circuit 200 is capable of completing a task switch in a far shorter period of time. Since the state storage units 220 continuously output status data to the execution selection circuit 232, the execution control circuit 232 continuously outputs the task ID of one of the tasks. Selection of a RUN-task is not started after a task switch is initiated. Instead, selection of a RUN-task is performed according to the output from the execution selection circuit 232 occurring concurrently with a task switch. This adds to the speed of a task switch. The description above assumes that there are eight tasks. A larger number of tasks can be addressed by increasing the number of stages of comparison circuits.

Semaphore Process

Figure 13:
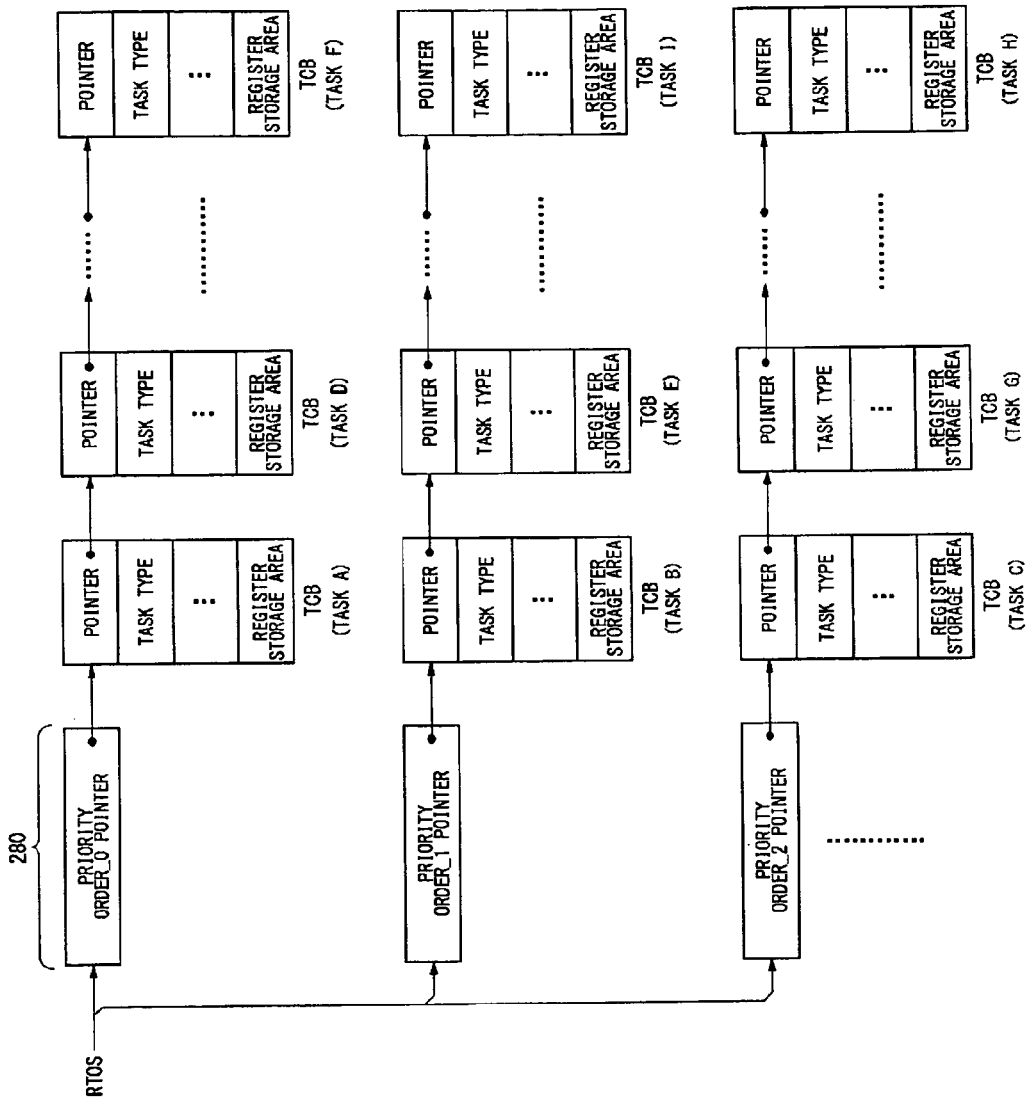
FIG. 13 shows a wait semaphore list used in a semaphore process performed by a commonly used RTOS.

FIG. 13 shows a wait semaphore list used in a semaphore process performed by a commonly used RTOS.

A brief description will be given of a semaphore before describing a wait semaphore list. The semaphore table 212 records semaphore IDs and semaphore counters in association with each other. Initially, a finite number is established in a semaphore counter. For example, it will be assumed that a semaphore ID=4 and a semaphore counter=3 are established. When one of the tasks executes a wait semaphore system call designating the semaphore with the semaphore ID=4 as a semaphore to wait for, the task switching circuit 210 decrements the semaphore counter of the semaphore to wait for. The semaphore counter is decremented each time a wait semaphore event call is issued to request acquisition. When the counter reaches 0, the semaphore can no longer be acquired. The task that executes a wait semaphore system call designating a semaphore with the semaphore counter at 0 as a semaphore to wait for makes a transition to the WAIT state.

Meanwhile, when one of the tasks executes a release semaphore system call, designating the semaphore with the semaphore ID=4 as a semaphore to be released, the task switching circuit 210 increments the semaphore counter of the semaphore table 212. In summary:

When the semaphore counter=0, the task that executes a wait semaphore system call makes a transition from RUN to READY. In this case, the semaphore counter is decremented.

When the semaphore counter=0, the task that executes a wait semaphore system call makes a transition from RUN to WAIT. The semaphore counter is not decremented.

In order for the task that executes a wait semaphore system call to make a transition from WAIT to READY, another task need execute a release semaphore system call.

[1] Semaphore Process by a Commonly Used Software RTOS

A commonly used software RTOS manages the TCBs' of tasks in the WAIT state for the reason that the task waits for a semaphore (hereinafter, referred to as a task in wait for a semaphore) by using a wait semaphore list. The wait semaphore list is a list having the configuration similar to that of the task ready list of FIG. 11 and is formed on the memory. The TCBs for the tasks in wait for a semaphore are connected by pointers. The priority order pointer 280 indicates the start address of the TCB for the task in wait for a semaphore having the associated task priority order.

When a release semaphore system call is executed, a commonly used software RTOS scans the wait semaphore list to select a task in wait for a semaphore to be placed from the WAIT state to the READY state. The following processes are performed by the RTOS when executing a wait semaphore system call and when executing a release semaphore system call.

Execution of a Wait Semaphore System Call

The description hereunder assumes that task J is the RUN-task.

A1. The RTOS stores the task ID of the RUN-task in the memory. The RTOS acquires the address of the TCB for task J on the basis of the task ID.

A2. The RTOS detects the semaphore counter of the semaphore to wait for designated in a wait semaphore system call. Hereinafter, the process branches according to the value of the semaphore counter.

(When the Semaphore Counter>0)

A3. The RTOS decrements the semaphore counter of the semaphore to wait for.

A4. The RTOS indicates READY in the TCB for task J.

In this way, the TCB for task J is added to the task ready list.

(When the Semaphore Counter-=0)

A3. The RTOS accesses the TCB to acquire the task priority order of task J. It will be assumed that the task priority order is 0.

A4. The RTOS refers to the wait semaphore list to acquire the priority order pointer associated with the task priority order of task J.

A5. The RTOS detects the TCB indicated by the priority order pointer thus acquired. In this case, the TCB for task A is detected.

A6. The RTOS follows the pointer leading from the TCB for task A so as to detect the TCB at the end of the list. FIG. 13 shows that task F is at the end of the list.

A7: The RTOS configures the pointer from the TCB for task F to address the TCB for task J. In this way, the TCB for task J is added to the wait semaphore list.

A7. The RTOS indicates in the TCB for task J that task J is in the WAIT state. The RTOS also establishes the semaphore ID of the semaphore to wait for.

<Execution of a Release Semaphore System Call>

B1. The RTOS sequentially follows the tasks with the task priority order 0 so as to identify a task in wait for a semaphore to be released. In the absence of such a task, the RTOS searches for a task with the task priority order 1. The process branches depending on whether a task in wait for a semaphore to be released is identified.

(When the Task is Detected)

B2. The description hereunder assumes that task E is detected as such. The RTOS indicates in the TCB for task E. that task E is in the READY state. The RTOS also clears the semaphore ID of the semaphore to wait for.

B3. The RTOS removes task E from the wait semaphore list.

B4. The RTOS causes the task that released the semaphore to make a transition from RUN to READY. The TCB for the task is added to the task ready list.

(When the Task is not Detected)

B2. The RTOS increments the semaphore counter.

B3. The RTOS causes the task that released the semaphore to make a transition from RUN to READY. The TCB for the task is added to the task ready list.

A commonly used software RTOS performs a semaphore-related process by managing a wait semaphore list as described above. The following policies are observed when the RTOS selects a READY-task from among a plurality of WAIT-tasks in releasing a semaphore.

1. The task selected should be a WAIT-task (first condition).

2. The task selected should be a WAIT-task in wait for a semaphore to be released (second condition).

3. If there are a plurality of such tasks, the task selected should have the highest priority order (third condition).

4. If there are a plurality of tasks assigned the highest task priority order, the task selected should have the oldest history of going into the WAIT state (fourth condition).

These four conditions will be collectively referred to as a semaphore wait cancellation condition. The semaphore-based selection circuit 234 of the task processor 100 implements the RTOS's task scheduling function as described above in hardware.

Figure 14:
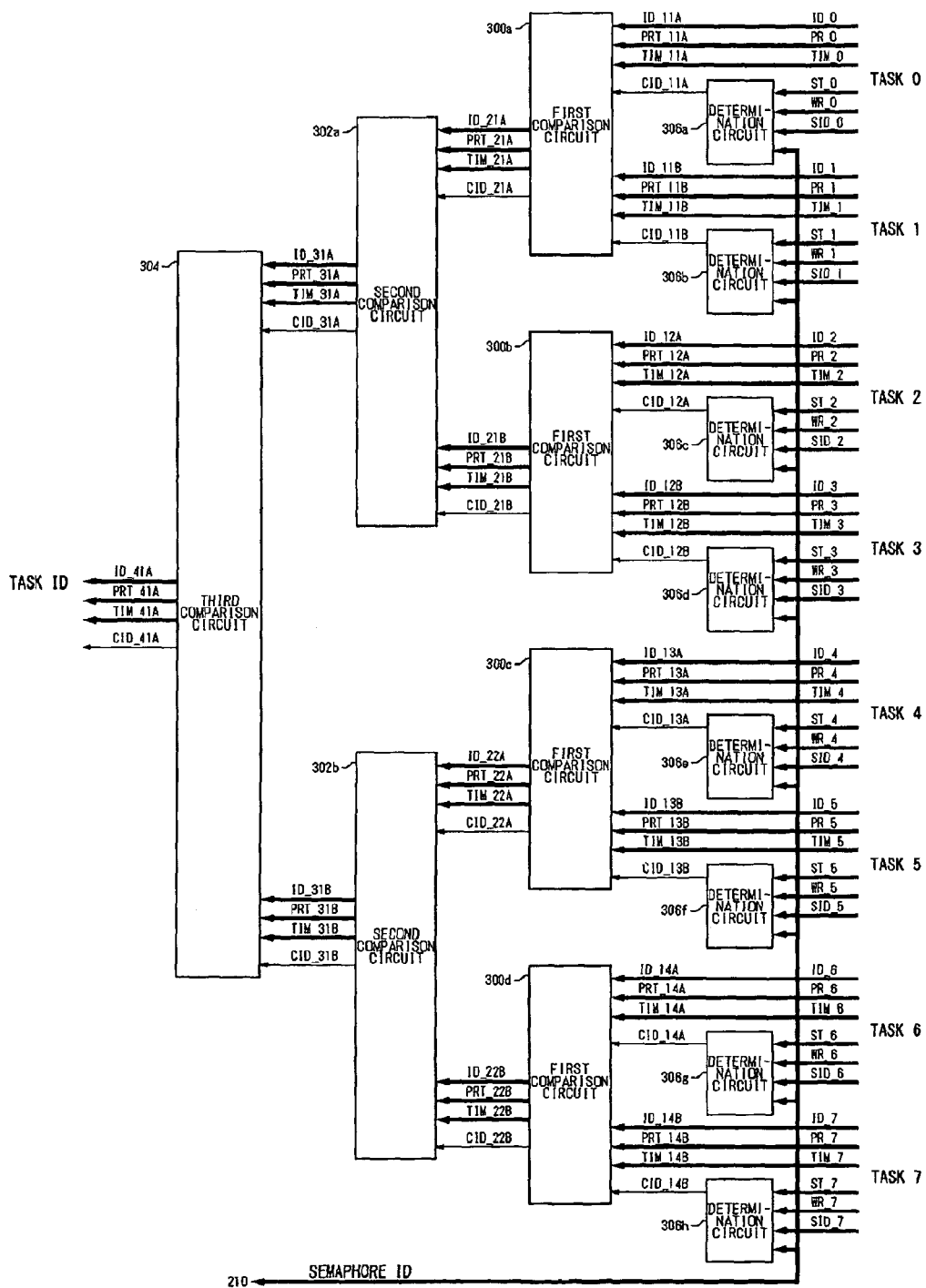
FIG. 14 is a circuit diagram of the semaphore-based selection circuit.

[2] Semaphore Process by the Hardware RTOS According to the Basic Implementation FIG. 14 is a circuit diagram of the semaphore-based selection circuit 234.

As in [1], the description assumes eight tasks, namely task 0 through task 7. The semaphore-based selection circuit 234 includes four 1st comparison circuits 300 (300a-300d), two 2nd comparison circuits 302 (302a, 302b), and a 3rd comparison circuit 304. The circuit 234 also includes eight determination circuits 306 (306a-306h).

Each of the determination circuits 306 receives ST, WR, and SID signals from the state storage units 220 and also receives a signal from the task switching circuit 210 indicating a semaphore ID. The semaphore ID received is the semaphore ID of the semaphore to be released. Each of the determination circuits 306 outputs a CID signal at 1 if the associated task is a task in wait for a semaphore to be released. If not, the circuit 306 outputs a CID signal at 0. The determination circuit 306 outputs a result of determination based upon the first and second conditions of the semaphore wait cancellation condition. Each of the first comparison circuits 300 receives ID, PR, and TIM of two tasks and also receives the CID signal from the determination circuit 306.

The first comparison circuit 300 performs a determination based upon the third and fourth conditions of the semaphore wait cancellation condition. The same is true of the second comparison circuits 302 and the third comparison circuit 304. As already made clear above, the second and third conditions of the RUN-task selection condition are identical with the third and fourth conditions of the semaphore wait cancellation condition. The comparison circuits of the execution selection circuit 232 compare state data (PR, TIM) of tasks. Meanwhile, the comparison circuits of the semaphore-based selection circuit 234 also compare state data (PR, TIM) of tasks. Thus, the first comparison circuits 290 of the execution selection circuit 232 and the first comparison circuits 300 of the semaphore-based selection circuit 234 are circuits having the same logic built in. Therefore, the first comparison circuits may be implemented in the same hardware. Each task is subject to determination by the determination circuit 306 on the basis of the first and second conditions, before being subjected to determination by the first comparison circuit 300. Through the steps for determination similar to those performed by the execution selection circuit 232, one of the task IDs is output from the third comparison circuit 304. The following processes are performed when executing a wait semaphore system call and when executing a release semaphore system call.

<Execution of a Wait Semaphore System Call>

The description hereunder assumes that task J is the RUN-task.

A1. The task switching circuit 210 detects from the semaphore table 212 the semaphore counter of the semaphore designated in a wait semaphore system call. Hereinafter, the process branches according to the value of the semaphore counter.

(When the Semaphore Counter>0)

A2. The task switching circuit 210 decrements the semaphore counter in the semaphore table 212.

A3. The task switching circuit 210 indicates READY in the task state register 258 for task]. The task switching circuit 210 sets the timer 252 for the RUN-task so as to start measuring the elapsed READY time.

(When the Semaphore Counter=0)

A2. The task switching circuit 210 indicates WAIT in the task state register 258 for task J, indicates "in wait for a semaphore" in the wait reason register 262, sets the semaphore ID of the semaphore to wait for in the semaphore ID register 264, and sets the timer 252 so as to start measuring the elapsed WAIT time.

The task that has executed the wait semaphore system call makes a transition from the RUN to READY or WAIT.

Execution of a Release Semaphore System Call

B1. The task switching circuit 210 feeds the semaphore ID of the semaphore to be released to the determination circuits 306. Each determination circuits 306 receiving the semaphore ID determines whether the first and second conditions of the semaphore wait cancellation condition are fulfilled. Thus, the first comparison circuit 300 selects a task on the basis of the third and fourth conditions.

(When One of the Determination Circuits Outputs 1 and the Third Comparison Circuit 304 Outputs One of the Task IDs)

B2. The circuit 210 indicates READY in the task state register 258 for the detected task, clears the wait reason register 262 and the semaphore ID register 264, and causes the timer 252 to start measuring the elapsed READY time.

B3. The circuit 210 indicates READY in the task state register 258 for the task that has executed the system call and starts measuring the elapsed READY time.

(When None of the Determination Circuits 306 Outputs 1 and the Third Comparison Circuit 304 does not Output any Task ID).

B2. The task switching circuit 210 increments the semaphore counter of the semaphore table 212.

B3. The circuit 210 causes the task that has executed the system call to make a transition from RUN to READY.

Since the state storage units 220 continuously output status data to the semaphore-based selection circuit 234, the semaphore-based selection circuit 234 can immediately perform selection when the task switching circuit 210 feeds a semaphore ID to the determination circuit 306.

Mutex Process

Like a semaphore, a mutex is used in synchronizing tasks. A mutex and a semaphore differ in the following respects.

1. An integer equal to or greater than 1 may be established in a semaphore counter. In contrast, a mutex is a special kind of semaphore where the count of the 1 semaphore counter is 1 or 0. When the count of the semaphore counter is 2 or greater, two or more tasks can acquire the same semaphore. However, only one task can acquire a given mutex.

2. The task capable of releasing a semaphore by a release semaphore system call is not necessarily the task that has acquired the semaphore by a wait semaphore system call. In contrast, only the task that has acquired a mutex by a wait mutex system call is capable of releasing the mutex by a release mutex system call.

The following policies are observed when the circuit 210 selects a READY-task from among a plurality of WAIT-tasks in releasing a mutex.

1. The task selected should be a WAIT-task (first condition).
2. The task selected should be a WAIT-task in wait for a mutex to be released (second condition).
3. If there are a plurality of such tasks, the task selected should have the highest priority order (third condition).

B3. The circuit 210 indicates READY in the task state register 258 for the task that has executed the system call and starts measuring the elapsed READY time.

(When None of the Determination Circuits 306 Outputs 1 and the Third Comparison Circuit does not output any task ID).

B2. The task switching circuit 210 increments the semaphore counter of the semaphore table 212.

B3. The circuit 210 causes the task that has executed the system call to make a transition from RUN to READY.

Since the state storage units 220 continuously output status data to the semaphore-based selection circuit 234, the semaphore-based selection circuit 234 can immediately perform selection when the task switching circuit 210 feeds a semaphore ID n to the determination circuit 306.

Mutex Process

Like a semaphore, a mutex is used in synchronizing tasks. A mutex and a semaphore differ in the following respects.

1. An integer equal to or greater than 1 may be established in a semaphore counter. In contrast, a mutex is a special kind of semaphore where the count of the 1 semaphore counter is 1 or 0. When the count of the semaphore counter is 2 or greater, two or more tasks can acquire the same semaphore. However, only one task can acquire a given mutex.

2. The task capable of releasing a semaphore by a release semaphore system call is not necessarily the task that has acquired the semaphore by a wait semaphore system call. In contrast, only the task that has acquired a mutex by a wait mutex system call is capable of releasing the mutex by a release mutex system call.

The following policies are observed when the circuit 210 selects a READY-task from among a plurality of WAIT-tasks in releasing a mutex.

1. The task selected should be a WAIT-task (first condition).
2. The task selected should be a WAIT-task in wait for a mutex to be released (second condition).
3. If there are a plurality of such tasks, the task selected should have the highest priority order (third condition). The first and second conditions of the mutex wait cancellation condition are fulfilled. The determination circuit outputs 1 only when the first and second conditions of the mutex wait condition are both fulfilled with regard to the designated mutex. When a task not occupying the mutex to be released executes a release mutex system call, the task is caused to make a transition from RUN to READY.

(When One of the Determination Circuits Outputs 1 and the Mutex Circuit 240 Outputs One of the Task IDs)

B2. The circuit 210 indicates READY in the task state register 258 for the detected task, clears the wait reason register 262 and the mutex ID register 265, and causes the timer 252 to start measuring the elapsed READY time.

B3. The circuit 210 indicates READY in the task state register 258 for the task that has executed the system call and starts measuring the elapsed READY time.

(When None of the Determination Circuits 306 Outputs 1 and the Mutex Circuit 240 does not Output any Task ID)

B2. The task switching circuit 210 indicates that the mutex is unoccupied in the semaphore table 212.

B3. The circuit 210 causes the task that has executed the system call to make a transition from RUN to READY.

[Event Process]

A brief description will now be given of event management according to the basic implementation. The event table records an event ID and a flag pattern (hereinafter, referred to as a current flag pattern) in association with each other.

A flag pattern is an 8-bit pattern.

A set event system call is a system call for updating a current flag pattern, using an event ID and a flag pattern (hereinafter, referred to as a set flag pattern) as parameters. When a set event system call is executed, the current flag pattern of the associated event is updated to a logical sum of the current flag pattern and the set flag pattern. For example, given that the current flag pattern is 00001100 and the set flag pattern is 00000101, the current flag pattern is changed to 00001101. Hereinafter, each flag pattern is defined to comprise bit 0, bit 1, . . . , and bit 7 from left to right.

A wait event system call is a system call to wait until the current flag pattern of an event to wait for fulfills a predetermined condition. The wait event system call has an event ID, a flag pattern (hereinafter, referred to as "wait flag pattern"), and a flag condition as parameters. When a wait event system call is executed, a determination is made as to whether the flag condition is fulfilled between the current flag pattern and the wait flag pattern. The flag condition is logical sum (OR) or logical product (AND). When the flag condition is logical product (AND), the WAIT cancellation condition is that, for all bits of I in the wait flag pattern, the associated bits in the current flag pattern are 1. When the flag condition is logical sum (OR), the WAIT cancellation condition is that, for at least one of bits of 1 in the wait flag pattern, the associated bits in the current flag pattern are 1. For example, given that the current flag pattern is 00001101, the wait flag pattern is 00000011, and the flag condition is logical sum (OR), bit 6 and bit 7 of the wait flag pattern are 1 and bit 7 of the current flag pattern is 1. In this case, the WAIT cancellation condition designated in the wait event system call is fulfilled. Meanwhile, if the flag condition is logical product, the WAIT cancellation condition is not fulfilled since bit 6 of the current flag pattern is 0.

[1] Event Process Performed by a Commonly Used Software RTOS

The following processes are performed by a commonly used RTOS when executing a wait event system call and when executing a set event system call. In a commonly used RTOS, an event table is maintained on the memory for event management. An event table stores not only an event ID, a current flag pattern but also the task ID of a task in the WAIT state for the reason that the task waits for the associated event (hereinafter, referred to as a task in wait for an event), a wait flag pattern of the task, and a flag condition of the task, in association with each other.

<Execution of a Wait Event System Call>

A1. The RTOS reads a current flag pattern of the event designated in a system call from the event table.

A2. The RTOS compares the current flag pattern with the wait flag pattern according to the flag condition so as to determine whether the WAIT cancellation condition is fulfilled.

(When the Wait Cancellation Condition is Fulfilled)

A3. The RTOS causes the task that has executed the system call to make a transition from RUN to READY.

(When the Wait Cancellation Condition is not Met)

A3. The RTOS records the task ID of the task that has executed the system call in the event table.

A4. The RTOS records the wait flag pattern in the event table.

A5. The RTOS records the flag condition in the event table.

A6. The RTOS causes the task that has executed the system call to make a transition from RUN to WAIT.

<Execution of a Set Event System Call>

B1. The RTOS reads from the event table the current flag pattern, task ID, the wait flag pattern, and the flag condition associated with the event designated in the system call.

B2. The RTOS records the logical sum of the current flag pattern and the set flag pattern as a new current flag pattern.

(When there are No Tasks in Wait for the Designated Event, or when the WAIT Cancellation Condition is not Fulfilled in Reference to the Wait Flag Pattern and the Flag Condition Even if there is a Task in Wait for the Designated Event).

B3. The RTOS causes the task that has executed the system call to make a transition from RUN to READY.

(When there is a Task in Wait for the Designated Event and the WAIT Cancellation Condition is Fulfilled)

B3. The RTOS causes the task formerly in wait for the designated event to make a transition from WAIT to READY.

B4. The RTOS clears the wait task ID, the wait flag pattern, and the flag condition in the event table.

B5. The RTOS causes the task that has executed the system call to make a transition from RUN to READY. Also, the RTOS selects a RUN-task.

The following policies are observed when the RTOS selects a READY-task from among a plurality of WAIT-tasks when a set event system call is executed.

1. The task selected should be a WAIT-task (first condition).

2. The task selected should be a WAIT-task in wait for an event designated in the system call (second condition).

3. The task selected should be a task for which the WAIT cancellation condition is fulfilled based upon the comparison as to the wait flag pattern, the current flag pattern, and the flag condition (third condition).

These three conditions will be collectively referred to as an event wait cancellation condition.

[2] Event Process Performed by the Hardware RTOS According to the Basic Implementation The following processes are performed by the RTOS when the task processor 100 executes a wait event system call and when it executes a set event system call. The semaphore table 212 built in the task processor 100 stores an event ID and a current flag pattern in association with each other. Information such as a wait task ID and a wait flag pattern is stored in the state storage units 220.

<Execution of a Wait Event System Call>

A1. The task-switching circuit 210 reads a current flag pattern from the event table 214.

A2. The task switching circuit 210 compares the current flag pattern with the wait flag pattern according to the flag condition so as to determine whether the WAIT cancellation condition is fulfilled.

(When the Wait Cancellation Condition is Fulfilled)

A3. The circuit 210 indicates READY in the task state register 258 for the task that has executed the system call.

(When the Wait Cancellation Condition is not Fulfilled)

A3. The task switching circuit 210 indicates WAIT in the task state register 258 for the task that has executed the system call, indicates "in wait for an event" in the wait reason register 262, sets the event ID of the event to wait for in the event ID register 266, sets the wait flag pattern in the wait flag register 268, and sets the flag condition in the flag condition register 270.

<Execution of a Set Event System Call>

B1. The task switching circuit 210 reads a current flag pattern from the event table 214 and feeds the event ID of the event designated in the system call to the event-based selection circuit 236.

B2. The task switching circuit 210 produces a logical sum of the current flag pattern from the event table 214 and the set flag pattern.

B3. The event-based selection circuit 236 selects a task for which the event wait condition is fulfilled with reference to the event ID thus fed. A plurality of tasks may be selected regardless of the task priority order and the elapsed WAIT time.

(When there is a Task that Fulfills the Event Wait Cancellation Condition)

B4. The circuit 210 indicates READY in the task state register 258 for the task in wait for the event and clears the event ID register 266, the wait flat register 268, and the flag condition register 270.

B5. The circuit 210 causes the task that has executed the system call to make a transition from RUN to READY.

(When there are No Tasks that Fulfill the Event Wait Cancellation Condition)

B4. The circuit 210 causes the task that has executed the system call to make a transition from RUN to READY.

[Timeout Process]

The task that has made a transition to the WAIT state makes a transition to the READY state when the WAIT cancellation condition is fulfilled. If the fulfillment of the WAIT cancellation condition is thwarted due to some external factor or a bug in an application program, the task is incapable of leaving the WAIT state. In this regard, a timeout value is normally established when a task is caused to makes a transition to the WAIT state. A timeout value is decremented periodically. When the value reaches 0, the task is forced to make a transition from the WAIT state to the READY state even if the WAIT cancellation condition is not fulfilled. In this way, the task is prevented from remaining in the WAIT state for a period of time beyond the timeout value.

[1] Timeout Process Performed by a Commonly Used Software RTOS

In the case of a commonly used software RTOS, a timeout value is established in the TCB for a task in the WAIT state. The timeout value is decremented periodically. The RTOS sends an interrupt to the CPU process periodically so as to check the entire TCBs and detect a WAIT-task for which the timeout value reaches 0. In the event that such a task is detected, the RTOS causes the task to make a transition from WAIT to READY.

[2] Timeout Process Performed by the Hardware RTOS According to the Basic Implementation In the case of the basic implementation, the task switching circuit 210 decrements the timeout value of the timeout counters 274 periodically. Timeout values are established as a parameter in executing systems call related to WAIT. The task switching circuit 210 establishes a timeout value in the timeout counter 274 for the task that has executed the system call.

Since the process of decrementing the timeout value does not require the CPU 150, the task switching circuit 210 is capable of updating the timeout value independent of the task execution process. Therefore, the task control circuit 200 is capable of updating the timeout value autonomously even while the CPU 150 is executing the task. Since the state data is continuously fed to the timeout detecting circuit 238, the timeout detecting circuit 238 is capable of detecting a task for which the timeout count reaches 0 substantially at the same time as the timeout count is updated. The timeout detecting circuit 238 outputs the task ID of the detected task. Upon receiving the task ID from the timeout detecting circuit 238, the task switching circuit 210 acknowledges that a timeout has occurred. The circuit 210 then asserts HC so as to halt the supply of the CPU clock. The task switching circuit 210 causes the WAIT-task for which the timeout has occurred to make a transition to READY and causes the RUN-task to make a transition to READY. The task switching circuit 210 selects a task to be executed next from among the READY-tasks. The task switching circuit 210 restarts the timer 252 for the task for which the timeout has occurred so as to measure the elapsed READY time.

According to the method of processing described above, occurrence of a timeout during the execution of a task, i.e., while the CPU clock is running, is immediately followed by an interrupt to the CPU 150 for a task switch. The task switching circuit 210 is capable of independently updating the timeout value during the execution of a task without depending on the processing power of the CPU 150.

[Task Switching Circuit 210 as a Finite State Machine]

Figure 15:
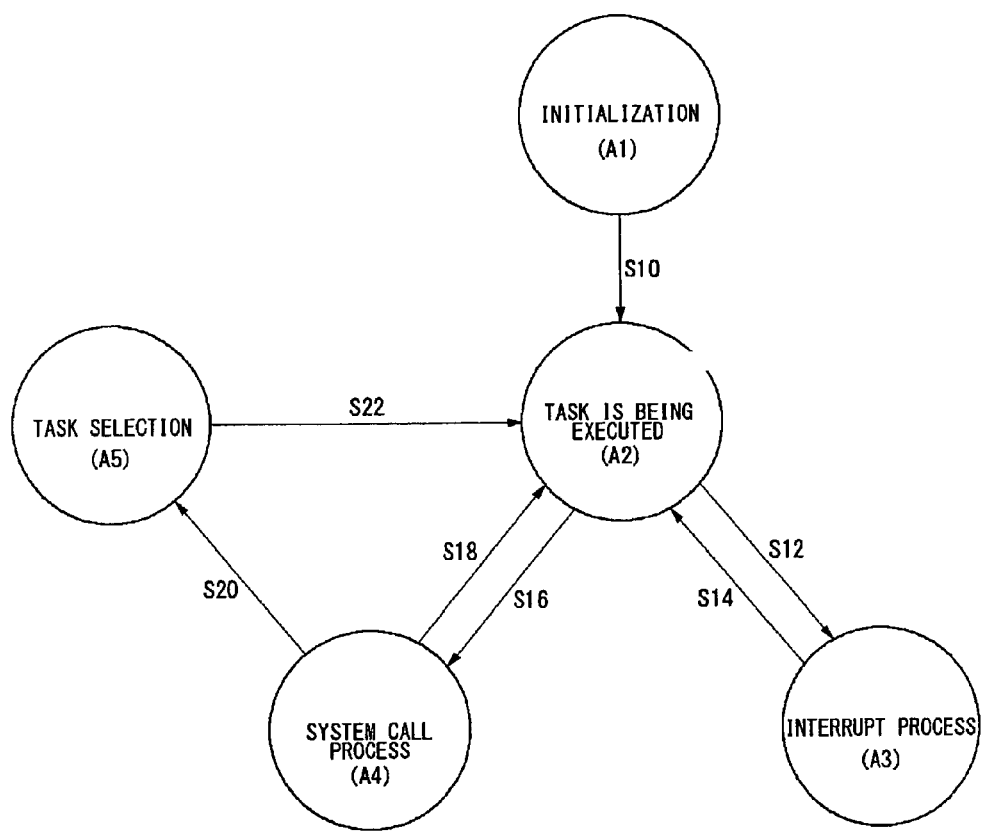
FIG. 15 is a state transition diagram of the task switching circuit.

FIG. 15 is a state transition diagram of the task switching circuit 210.

Before an initialization process (A1), all tasks are in an IDLE state. When the initialization process is complete (S10), one of the tasks becomes a RUN-task and the circuit 210 is placed in the task execution state (A2). When an interrupt request signal is detected (S12), a special task becomes a RUN-task and an interrupt process (A3) is performed. When the interrupt process is completed (S14), the task switching circuit 210 selects a RUN-task from among the ordinary tasks and makes a transition to A2.

When a system call is executed while a task is being executed (A2) (S16), a system call process is performed (A4). When a task switch, i.e., switching of RUN-tasks, does not occur (S18), the circuit 210 returns to A2. When a task switch occurs as a result of a system call process (A4) (S20), the task switching circuit 210 selects a RUN-task based upon an output from the execution selection circuit 232 (A5). When a task switch is completed (S22), the circuit 210 makes a transition to the state A2.

Finally, an additional description will be given in connection the basic implementation of cases where only one of the save circuit 120 and the task control circuit 200, which are main elements of the task processor 100, is implemented.

[Task Processor 100 of a Type not Provided with the Task Control Circuit 200]

Figure 16:
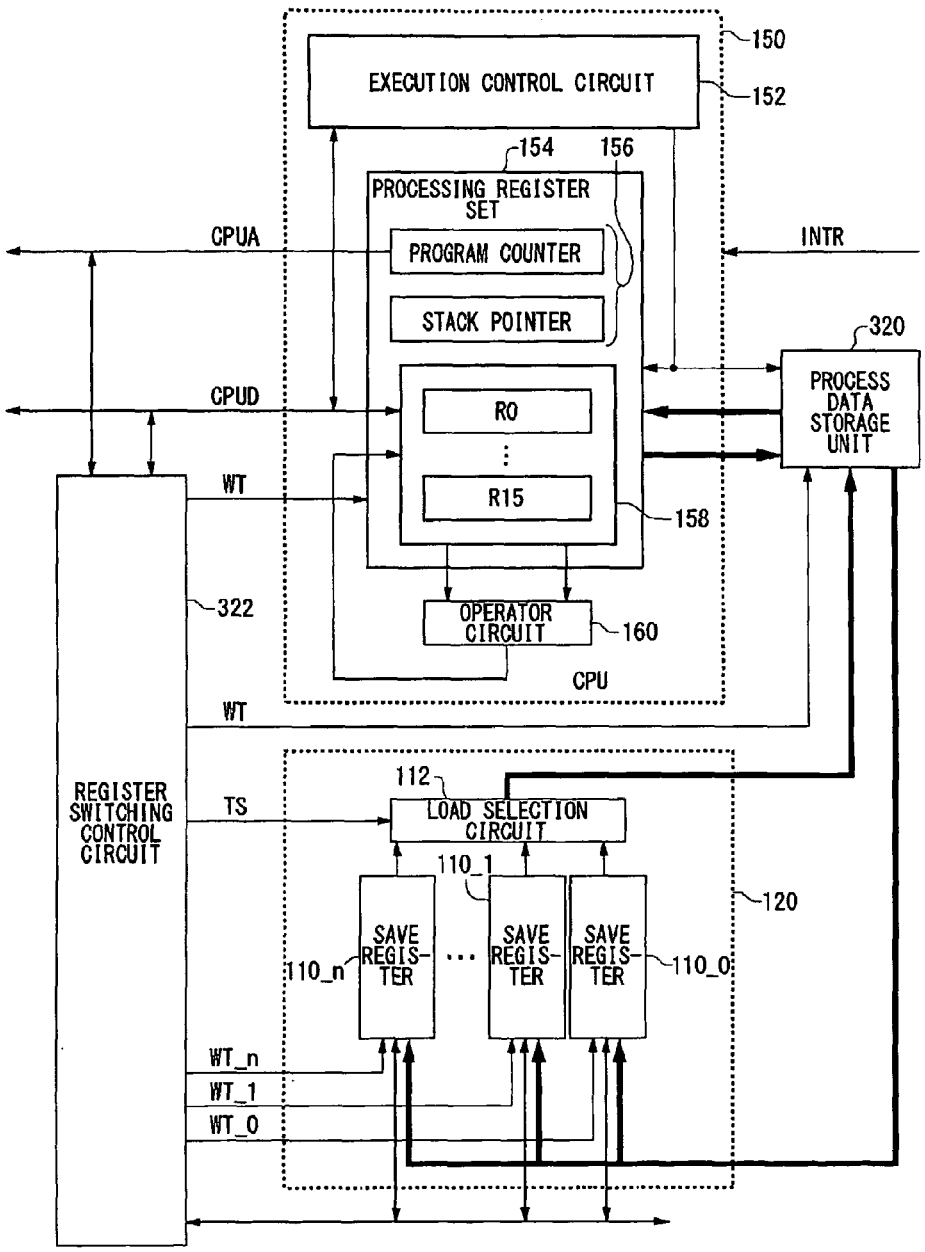
FIG. 16 is a circuit diagram showing a variation to the task processor of FIG. 5 in which the task control circuit is not provided.

FIG. 16 is a circuit diagram showing a variation to the task processor 100 of FIG. 5 in which the task control circuit 200 is not provided.

Instead of providing the task control circuit 200, a register switching control circuit 322 and a process data storage unit 320 are added. Since the processor 100 is not provided with the task control circuit 200, the task scheduling function is implemented by the software RTOS. Accordingly, the RTOS needs to acquire the right to use the CPU 150 temporarily for a task switch. Normally, the process data storage unit 320 stores process data for the RTOS. When the RTOS acquires the right to use the CPU 150, the process data storage unit 320 switches between the process data for use by the RTOS stored in the unit 320 and the process data for use by the task stored in the special registers 156. The processing steps involved will be described assuming that task A is switched to task B.

A1. When task A executes a system call, the parameter in a system call and the system call ID are recorded in some of the general-purpose registers 158.

A2. The register switching control circuit 322 moves the process data for task A to the process data storage unit 320 and loads the process data for use by the RTOS in the process data storage unit 320 to the processing register set 154. At this stage, the RTOS acquires the right to use the CPU 150.

A3. The register switching control circuit 322 feeds a write signal to the save register 110a so as to save, in the save registers 110, the process data for use by task A stored in the process data storage unit 320.

A4. The RTOS performs a process responsive to the system call based upon the parameter and ID of the system call recorded in the general-purpose registers '158. Further, the RTOS indicates in the TCB for task A that task A is READY and appends the TCB for task A to the task ready list.

B1. Subsequently, the RTOS selects a RUN-task (in this case, task B) in accordance with the RUN-task selecting condition described above.

02. The RTOS directs the register switching control circuit 322. to feed a task selection signal designating task B to the load selection circuit 112. This causes the process data to be moved from the save register 110b to the process data storage unit 320.

B3. The register switching control circuit 322 switches between the process data for use by task B in the process data storage unit 320 and the process data for use by the RTOS in the processing register set 154. This allows task B to acquire the right to use the CPU 150.

According to the method of processing described above, the task processor 100 can be made more compact in overall size as compared to the task processor l00 of FIG. 5 provided with the task control circuit 200. The RTOS is implemented in software. However, the loading and saving of process data are subject to hardware control according to signals from the register switching control circuit 322. By defining the number of bits of the bus connecting the processing register set 154, the process data storage unit 320, the load selection circuit 112, and the save registers 110' so as to enable parallel transfer of process data, tasks can be switched faster than by saving process data in TCBs and loading process data from TCBs.

[Task Processor 100 of a Type not Provided with the Save Circuit 120]

Figure 17:
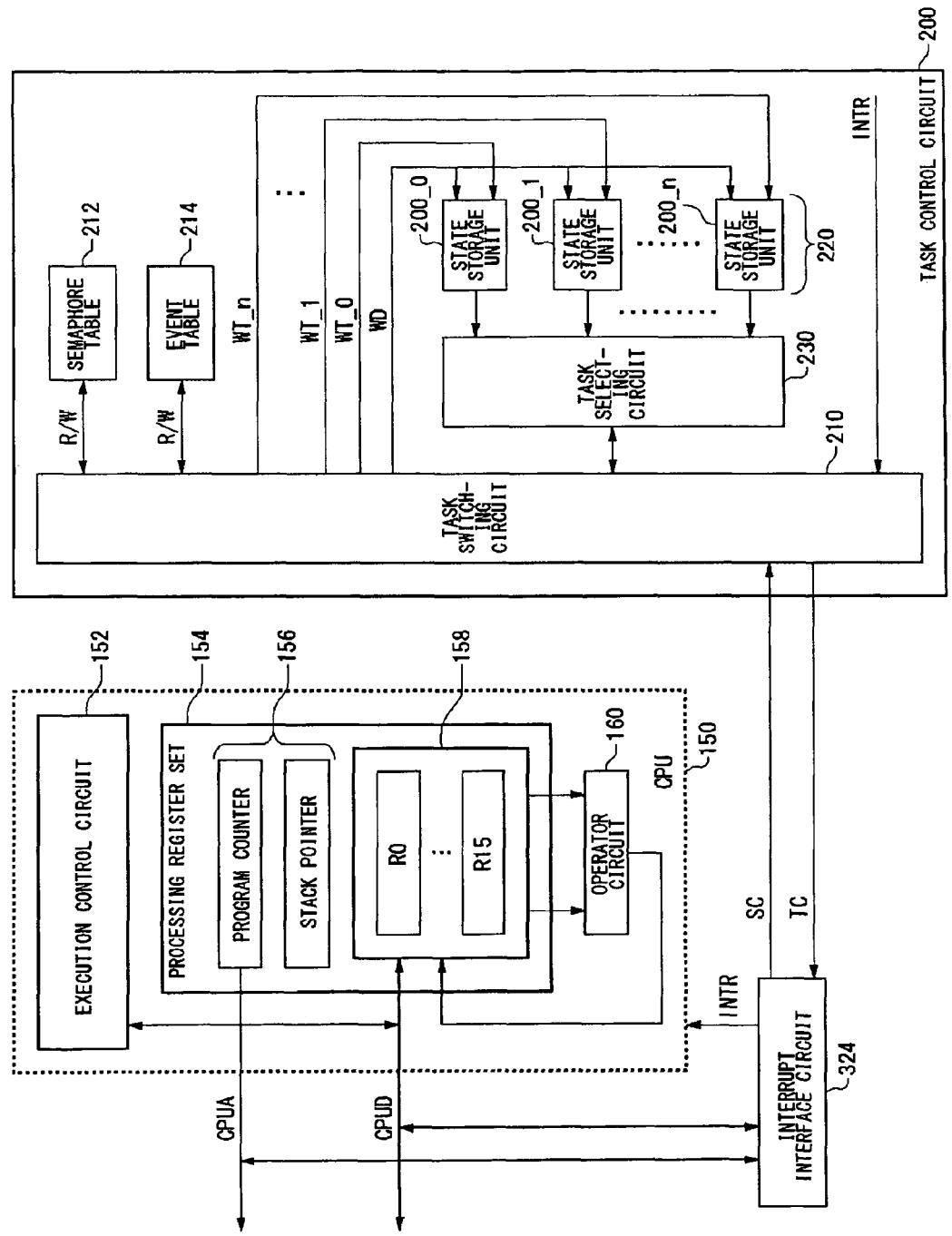
FIG. 17 is a circuit diagram showing a variation to the task processor of FIG. 5 in which the save circuit is not provided.

FIG. 17 is a circuit diagram showing a variation to the task processor 100 of FIG. 5 in which the save circuit 120 is not provided.

Instead of providing the save circuit 120, an interrupt interface circuit 324 is added. Since the save circuit 120 is not provided} process data is saved in TCBs in the memory. Saving and loading of process data are achieved by the software-based RTOS. Therefore, the RTOS needs to acquire the right to use the CPU 15 temporarily for a task switch. The processing steps involved will be described assuming that A is switched to task B.

When a task switch is initiated by a system call, the software RTOS saves the process data for task A in the TCB for task A. The RTOS loads the process data for the RTOS in the processing register set 154. The method of processing is similar to that described with reference to FIG. 3.

The software RTOS writes the parameter of a system call in the interrupt interface circuit 324. The execution control circuit 152 halts the CPU clock of the CPU 150. The interrupt interface circuit 324 causes the task control circuit 200 to perform a task switch. The task switching circuit 210 indicates READY in the task state register 258 for task A and selects task B as the next RUN-task in accordance with an output from the task selecting circuit 230. The task switching circuit 210 directs the interrupt interface circuit 324 to load the process data for task B. At this point of time, the interrupt interface circuit 324 causes the execution control circuit 152 to resume the CPU clock. The interrupt interface circuit 324 notifies the software RTOS that task B is selected. The software RTOS accesses the TCB for task B so as to load the process data for task B into the processing register set 154.

According to the method of processing described above, the task processor 100 can be made more compact in overall size as compared to the task processor 100 of FIG. 5 provided with the save circuit 120. A part of the RTOS function is implemented in hardware but the task selection process is implemented by the task control circuit 200.

Unlike the software RTOS described with reference to FIGS. 2 and 3, a part of the RTOS function is implemented in the hardware of the task processor 100 of FIGS. 16 and 17. As described with reference to FIG. 16, provision of the save circuit 120' eliminates the need to access TCBs to save and load process data. This allows the register switching control circuit 322 to save and load process data. Meanwhile, as described with reference to FIG. 17, provision of the task control circuit 200 allows the software RTOS can delegate the task selecting function to the task control circuit 200.

As described with reference to FIG. 5, the task scheduling function of RTOS can be completely built into hardware in the case of the task processor 100 provided with the save circuit 120 and the task control circuit 200. Since there is no need to access TCBs in the memory for a task switch, the speed of a task switch is further increased. Our experiments show that the task processor 100 according to the basic implementation operates at a speed 100 times that of a commonly used software RTOS described with reference to FIG. 3.7

[Improved Implementation]

A description will now be given of the task processor 100 according to an improved implementation in which the dual-entry queue algorithm is implemented in hardware. The task processor 100 according to the basic implementation is provided with the timer-based task scheduling function. In the task scheduling according to the basic implementation, the right for execution is given to a task with the longest wait time, given the same task priority order. Hereinafter, task scheduling of this type will be referred to as fair task scheduling.

The method of managing a task ready list based' on the idea of fair task scheduling is described with reference to FIG. 11. When task J a RUN-task, returns to the READY state, task J is appended behind task F at the end of the list. Task A is turned into a RUN-task after task]. Therefore, connected to the priority order pointer 280 of the task priority order 0 are the TCBs of task D, . . . , task F, and task J in the stated order. Task I is not given the right for execution until the execution of task F is completed. The method of processing in fair task scheduling is similar to the algorithm of FIFO, i.e., the queue algorithm. Since the algorithm is fit for timer-based management, fair task scheduling can be implemented in hardware using a timer.

Meanwhile, some software OS's employ task scheduling requiring that a task, once turned into a RUN-task, is assigned the right for execution in preference to other tasks with the same task priority order. Hereinafter, such task scheduling will be referred to as prioritized re-execution task scheduling. In prioritized re-execution task scheduling, task J, a RUN-task, returning to the READY state is placed at the start of the list instead of at the end. Task A is turned into a RUN-task after task J. Therefore, connected to the priority order pointer 280 of the task priority order 0 are the TCBs of task J, task D, . . . , task F in the stated order. When task A is completed, task J is given the right for execution again in preference to task D or task F. When it is desirable that a task once given the right for execution be executed in a sitting, prioritized re-execution task scheduling will prove useful. It can be said that prioritized re-execution task scheduling encompasses the algorithm of LIFO, i.e., the stack algorithm. In the improved implementation, prioritized re-execution task scheduling algorithm is put into operation by implementing the dual-entry queue algorithm, basically designed for FIFO but also compatible with LIFO, in hardware.

The dual-entry queue algorithm is useful not only in prioritized re-execution task scheduling but also in application programs in general. As such, hardware implementation of dual-entry queue algorithm is useful in improving the processing speed of various computer programs.

Figure 18:
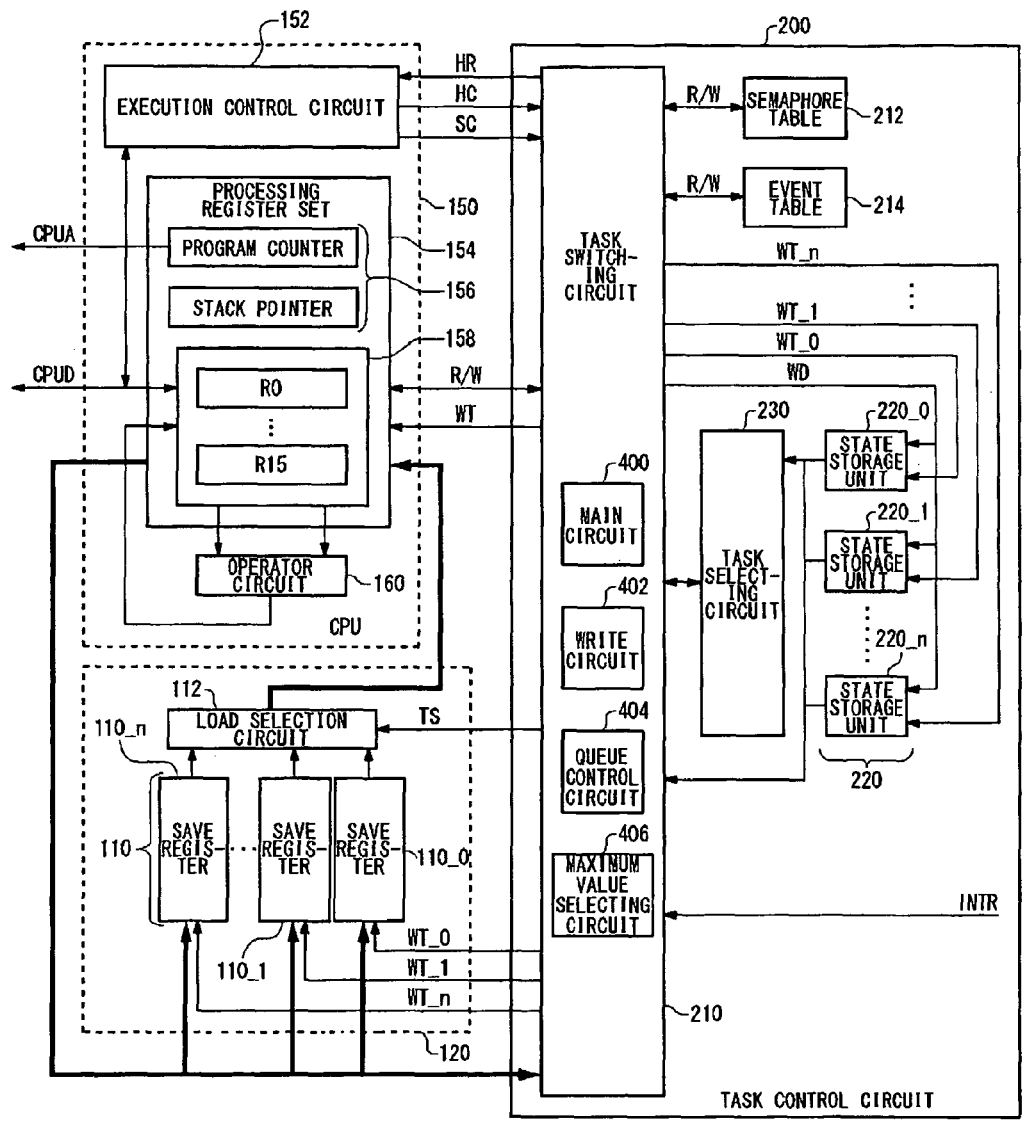
FIG. 18 is a circuit diagram of the task processor according to an improved implementation.

FIG. 18 is a circuit diagram of the task processor 100 according to the improved implementation.

The task processor 100 according to the improved implementation also includes the save circuit 120 and the task control circuit 200 in addition to the CPU 150. The difference is that the task switching circuit 210 according to the improved implementation includes a main circuit 400, a write circuit 402, a queue control circuit 404, and a maximum value selecting circuit 406. The main circuit 400 is a circuit having substantially the same function as the task switching circuit 210 according to the basic implementation. Therefore, the task switching circuit 210 according to the improved implementation is configured to include the write circuit 402, the queue control circuit 404, and the maximum value selecting circuit 406 in addition to the main circuit 400, which is comparable with the task switching circuit 210 according to the basic implementation. The state storage units 220 continuously output the entire state data not only to the task selecting circuit 230 but also to the maximum value selecting circuit 406 and the queue control circuit 404.

Figure 19:
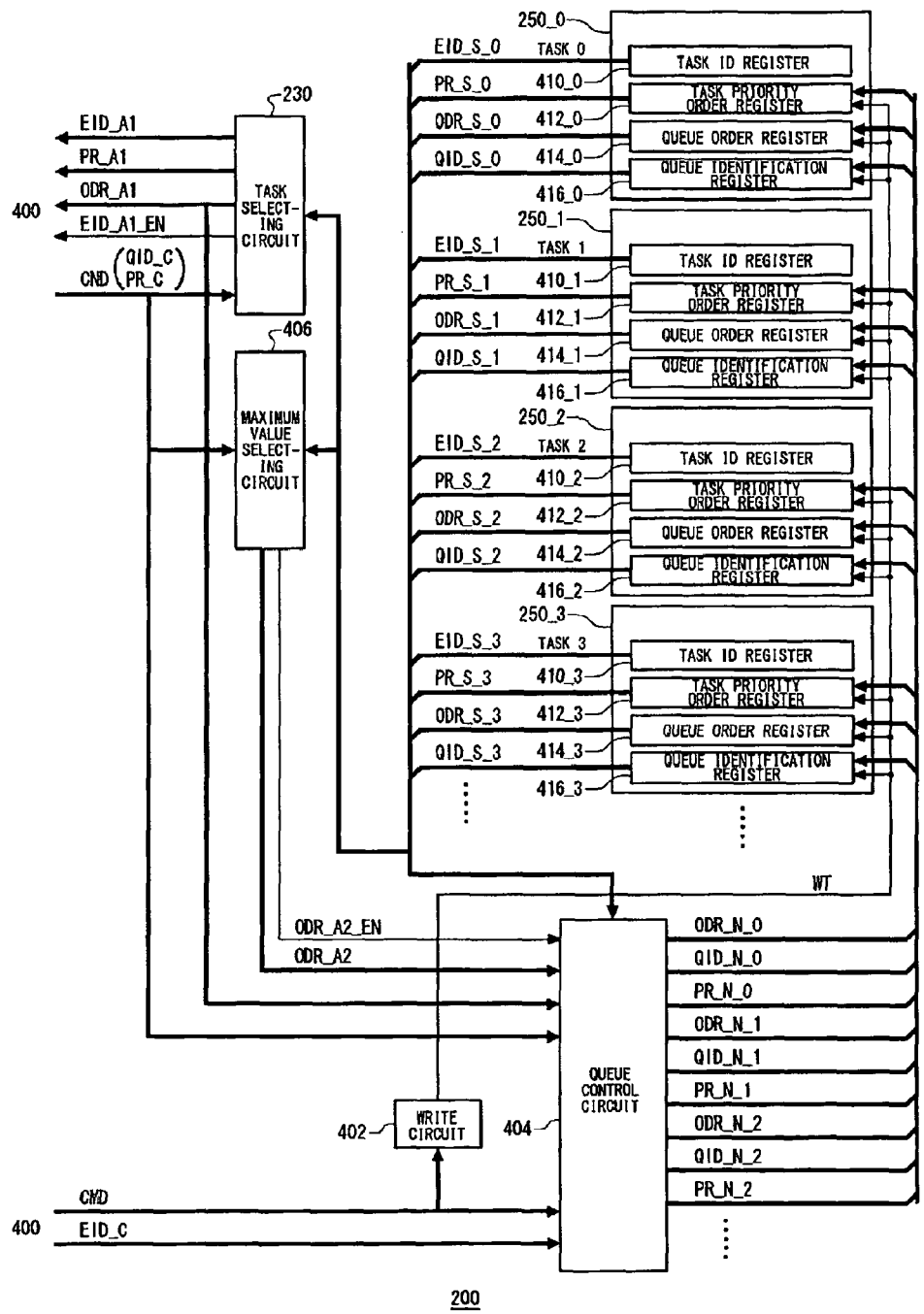
FIG. 19 is a partial circuit diagram of the task control circuit according to the improved implementation.

FIG. 19 is a partial circuit diagram of the task control circuit 200 according to the improved implementation.

The basic configuration of the task control circuit 200 is substantially the same as the circuit configuration shown in FIG. 10. Each of the state registers 250 respectively associated with tasks includes a task ID register 410, a task priority order register 412, a queue order register 414, and a queue identification register 416. The state register 250 may include other registers but the description herein will highlight those registers involved in the dual-entry queue algorithm.

(A) Task ID register 410: a register for storing a task ID. The register 410 is the same as the task ID register 254 described in the basic implementation. The task ID register 410 continuously outputs an EID_S signal indicating a task ID.

(B) Task priority order register 412: a register for storing a task priority order (PR). The register 412 is the same as the task priority register 256 described in the basic implementation. The register 412 continuously output a PR_S signal indicating 1a task priority order.

(C) Queue order register 414: a register for storing an order value (ODR) indicating the order of placement, described later, in a virtual queue. The larger the value, the deeper into the virtual queue the task is placed. Details will be described later. The order value is continuously output as an ODR_S signal.

(D) Queue identification register 416: a register storing a queue ID (QID) identifying a virtual queue. The register 416 continuously outputs a QID_S signal identifying a virtual queue.

The task priority register 412, the queue order register 414, the queue identification register 416 function as queue registers for managing virtual queues.

A virtual queue is a queue associated with a task state. For example, a virtual queue with QID=0 (hereinafter, denoted as virtual queue (0)) may be associated with the READY state, a virtual queue (1) may be associated with the state waiting for a semaphore, and a virtual queue (2) may be associated with the state waiting for a mutex. Alternatively, a virtual queue (1) may be associated with the state waiting for a semaphore with the semaphore ID=0, and a virtual queue (2) may be associated with the state waiting for a semaphore with the semaphore ID=1. Association between QiDs and task states may be desirably set in the software.

When a task is in the READY state, the QID of a virtual queue associated with the READY state is set up in the queue identification register 416_A. The task selecting circuit 230 or the queue control circuit 404 is capable of determining the task state of the tasks by referring to the queue identification registers 416. For this reason, the queue identification register 416 can function in the same way as the task state register 258, the wait reason register 262, the semaphore ID register 264, the mutex ID register 265, and the event ID register 266 according to the basic implementation.

It will be important to note that a virtual queue is not located physically but is postulated according to the configuration in the queue order register 414 and the queue identification register 416. For example, when the queue identification register 416 and the queue order register 414 are configured such that:
 task A: QID=0, ODR=0
 task B: QID=0, ODR=1
 task C: QID=0, ODR=2
 task D: QID=1, ODR=0,
it means that tasks C, B, and A are placed in the virtual queue (0) in the stated order, and only task D is placed in the virtual queue (1). The number and size of virtual queues can be flexibly updated by defining the numerical range of QID and ODR.

The task selecting circuit 230 selects a task to make a state transition on the basis of the state data output from the state registers 250. The main circuit 400 feeds a CND signal to the task selecting circuit 230. CND is a signal indicating a task selection condition and includes QID_C indicating a queue ID and PR_C indicating a task priority order. For example, when it is desired to retrieve a task from the virtual queue (0), the main circuit 400 sets up QID_C=0 in CND. The task selecting circuit 230 outputs EID_A1 indicating the task ID of the task to be retrieved (hereinafter, simply referred to as retrieved task) residing in the virtual queue (0) thus designated. The circuit 230 asserts E1D_A1_EN. PR_A1 and ODR_A1 output from the circuit 230 indicate the task priority order and order value of the retrieved task, respectively. Thus, the main circuit 400 is capable of identifying the task retrieved from a virtual queue (Qn) by placing an inquiry to the task selecting circuit 230, designating QID_C=Qn. The task selecting circuit 230 1 functions as a retrieval candidate circuit for selecting a retrieved task. Details will be described later with reference to FIG. 32.

The maximum value selecting circuit 406 is fed with the CND signal from the main circuit 400. When notified that QID_C-Qn by CND, the maximum value selecting circuit 406 outputs ODR_A2 indicating the maximum order value in the virtual queue (Qn) and asserts EID_A2_EN. Details will be described later with reference to FIG. 28.

The queue control circuit 404 controls state transition of the tasks by setting up the state data in the state registers 250. The queue control circuit 404 receives CMD and E1D_C from the main circuit 400. In addition, the queue control circuit 404 receives CND (QID_C, PR_C), ODR_A1, ODR_A2, O1DR_A2_EN, and the state data in the state registers 250.

CMD denotes a command for operating a virtual queue. The queue ID of the virtual queue subject to the operation using CMD, the task ID and task priority order of the task subject to the operation are designated by QID_C, ED_C, and I'R_C, respectively. The commands asserted include ENQ_TL, ENQ_TP, and DEQ.

When a normal placement command ENQ_TL is input, the task designated by the E1D_C signal is placed at the end of the virtual queue. Hereinafter, the placement at the end of a queue will be referred to as normal placement. When a retrieval command DEQ is input, the task at the start of a virtual queue is retrieved. ENQ_TL and DEQ control a queue in the FIFO mode. When a reverse placement command ENQ_TP is input, the task 'designated by the EID_C signal is placed at the start of a virtual queue. Hereinafter, the placement at the start of a queue will be referred to as reverse placement. Reverse placement is a special way of placing in that the placement is not in the FIFO mode.

When CMD is fed from the main circuit 400, the write circuit 402 asserts WT. This causes the data output from the queue control circuit 404 to be written in the state registers 250. The queue control circuit 404, the write circuit 402, the task selecting circuit 230, and the maximum value selecting circuit 406 function as a virtual queue processing circuit for controlling virtual queues. The circuit configuration of the queue control circuit 404 will be described in detail with reference to FIG. 20.

Figure 20:
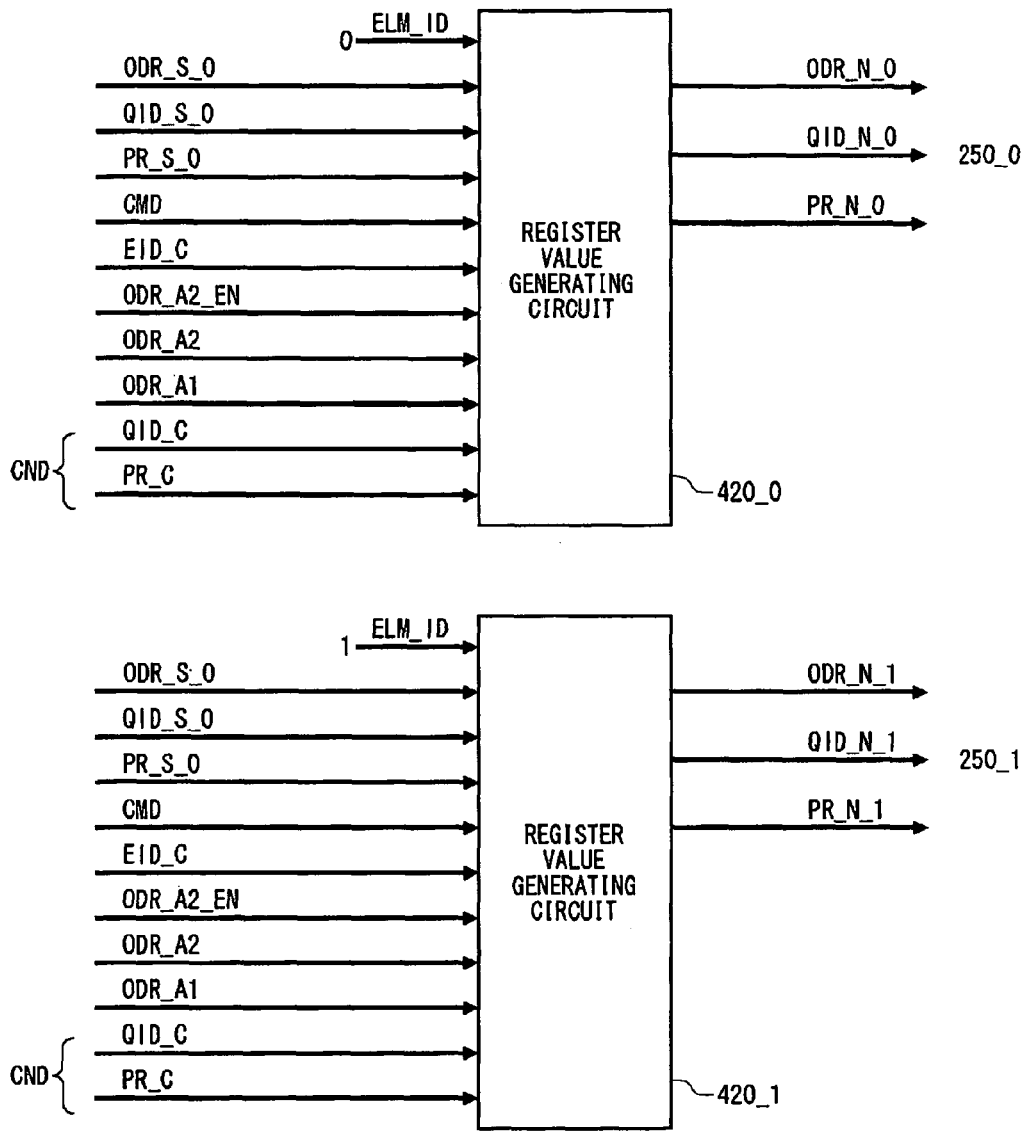
FIG. 20 is a circuit diagram of a queue control circuit.

FIG. 20 is a circuit diagram of the queue control circuit 404.

The queue control circuit 404 is a set of a plurality of register value generating circuits 420. The register value generating circuits 420 are identical circuits. The register value generating circuits 420 are associated with respective tasks. It can be said that the circuits 420 are associated with the respective state registers 250. The register value generating circuit 420_En is associated with a task with the task ID=En (hereinafter, referred to as task (En)). The task ID of the associated task is permanently fed to the register value generating circuit 420 as an EIM_ID signal.

ODR_S, QID_S, and PR_S are state data output from the state registers 250 and indicate the order value, queue ID, and task priority order, respectively. Input to the register value generating circuit 420_En associated with task (En) are ODR_S_En, QID_S_En, and PR_S_En indicating the order value, queue ID, and task priority order of task (En). CMD and EID_C are fed from the main circuit 400. ODR_A2_EN and ODR_A2 are fed from the maximum value selecting circuit 406. ODR_A2, indicating the maximum order value, is valid when ODR_A2_EN is asserted. ODR_A1 is fed from the task selecting circuit 230. ODR_A1 indicates the task TD of the retrieved task. QID_C and PR_C are CND signals fed from the main circuit 400 and indicate QID and PR as task selecting conditions.

The register value generating circuit 420_En output the order value, queue ID, task priority order of task (En) as QID_N_En, ODR_N_En, PR_N_En, respectively, which are written in the state register 250_En when WT is asserted by the write circuit 402.

When the write circuit asserts WT, Q1D_N_En, ODR_N_En, PR_N_En from the entire register value generating circuits 420 are written in the entire state registers 250. The register value-generating circuit 420 associated with the task affected by CMD writes new data designated according to the algorithm described later in the state registers 250. The register value generating circuits 420 associated with the tasks not affected by CMD also performs a write operation by outputting the same data as already written in the state registers 250 again.

WT, which allows data from the register value generating circuit 420 to be written, may be directly fed to the queue control circuit 404 instead of the state registers 250. In this case, of the register value generating circuits 420 built in the queue control circuit 404, only the register value generating circuit 420 associated with the task of which the state should be updated by CMD may write new data in the state registers 250.

Specific details of the process performed by the register value generating circuit 420 will be described later.

Figure 21:
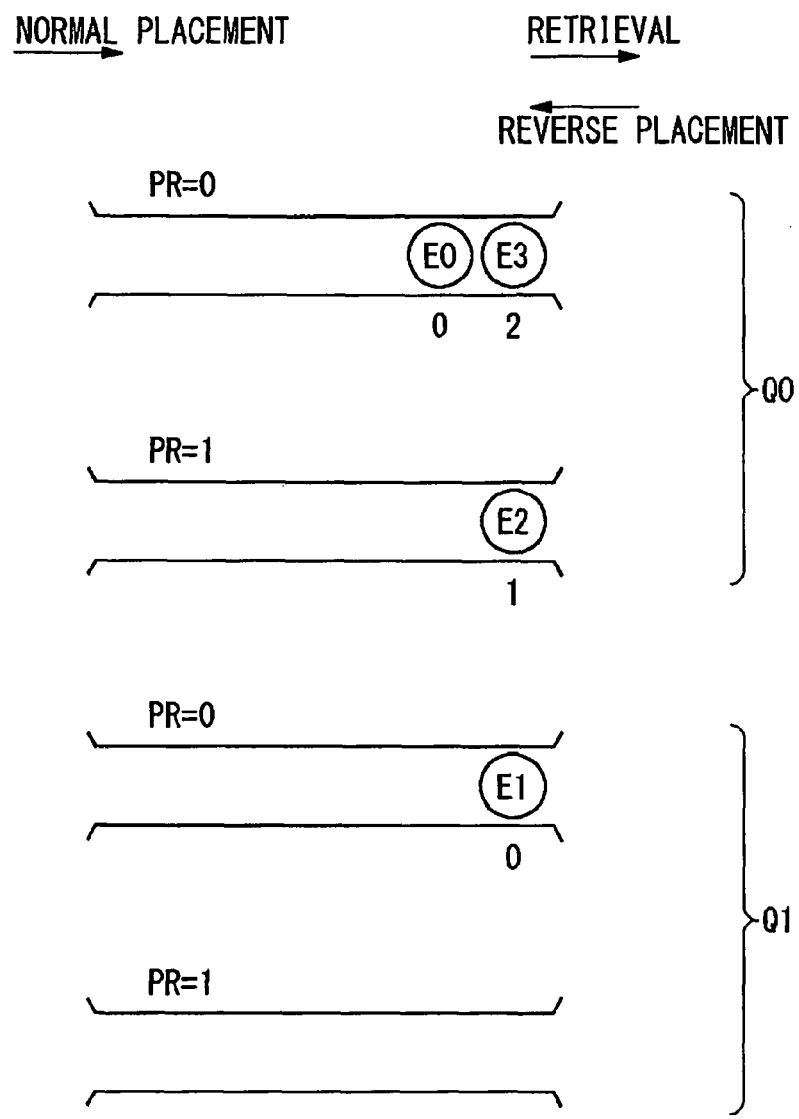
FIG. 21 is a conceptual diagram showing the relation between virtual queues and tasks.

FIG. 21 is a conceptual diagram showing the relation between virtual queues and tasks.

Two virtual queues, namely a virtual queue (Q0) and a virtual queue (Q1), are postulated. The virtual queue (Q0) is a set comprising a priority queue in which tasks with the task priority order PR=0 are placed (hereinafter, denoted as a priority queue (Q0:0)) and a priority queue (Q0:1) in which tasks with the task priority order PR=1 are placed. The same is true of the virtual queue (Q1). A total of four priority queues are postulated. For example, the virtual queue (Q0) may be associated with the READY state and the virtual queue (Q1) may be associated with the WAIT state.

In each of the virtual queues, a port of placement (entry) is shown on the left and a port of retrieval is shown on the right. In a normal placement, a task is placed at left. In a reverse placement, a task is placed at right. Tasks are always retrieved at right.

In the illustrated example, four tasks with the task ID's=E0, E1, E2, and E3 are placed in virtual queues. Task (E0), task (B2), and task (E3) are placed in the virtual queue (Q0). Of these, task (E0) and task (E3) are tasks with the task priority order PR-0 and are therefore placed in the priority queue (Q0:0). Task (E2) is a task with PR=1 and is placed in the priority queues (Q0:1). The order values ODR of task (E3), task (E2), and task (E0) placed in the virtual queue (Q0) are 2, 1, and 0, respectively. Task (E1) with the task priority order PR=0 is placed in the virtual queue (Q1).

The task's ODR is 0.

FIG. 22 shows the data structure in the state registers 250 mapping the state of FIG. 21.

The state of placement of tasks in the virtual queues shown in FIG. 21 is represented by the setting in the state registers 250. Referring to FIG. 21, placed in the virtual queues are task (E0)-task (E3), among task (E0)-task (E7). Therefore, "none" is indicated in the queue identification registers 416 for the other tasks to indicate that the task is not placed in any queues.

Q0 is indicated in the queue identification registers 416 for task (E0), task (E3), and task (E2) placed in the virtual queue (Q0). Q1 is indicated in the queue identification register 416 for task (E1) placed in the virtual queue (1). The identity of a virtual queue in which a task is placed is represented by the setting in the queue identification registers 416.

0, 2, and 1 are indicated as ODR in the queue order registers 414 for the three tasks including task (E0), task (E3), and task (E2), respectively, which are placed in the virtual queue (Q0). Since task (E1) is the only task placed in the virtual queue (Q1), the minimum order value 0 is set up. The position of a task in a virtual queue is represented by the setting in the queue order registers 414.

The task priority order PR of task (E0), task (E1), and task (E3) is 0. Therefore, 0 is indicated in the task priority order registers 412 for these tasks. Since the task priority order PR of task (E2) is 1, 1 is indicated in the task priority order register 412_E'.2. The identity of a priority queue in which a task is placed is represented by the setting in the task priority registers 412.

The details of processing in normal placement, reverse placement, and retrieval will be described based upon the setting described above.

[Normal Placement]

Figure 23:
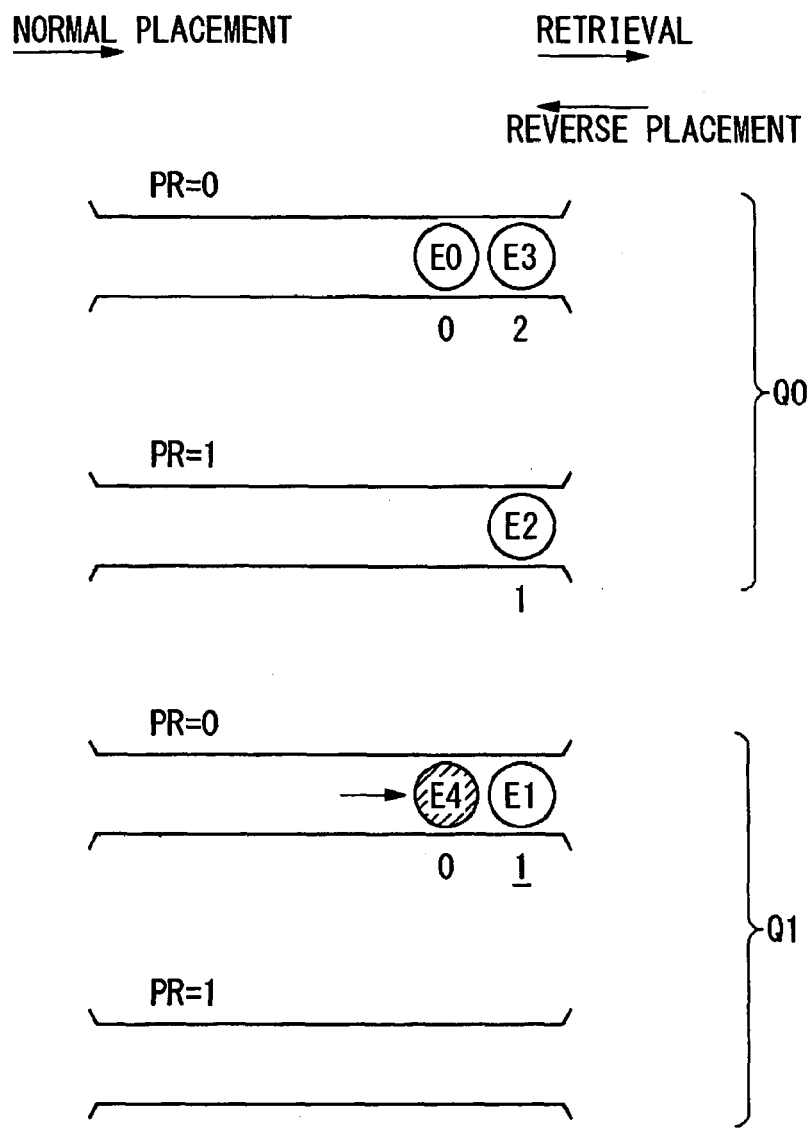
FIG. 23 is a conceptual diagram showing the normal placement of task (E4) in the virtual queues of FIG. 21.

FIG. 23 is a conceptual diagram showing the normal placement of task (E4) in the virtual queues of FIG. 21. It will be assumed here that task (E4) with the task priority order PR=0 is normally placed in the virtual queue (Q1). The main circuit 400 configures CMD=E.NQ_TL (normal placement command) such that EID_C=E4, QID_C=Q1, and PR_C=0. The register value generating circuit 420_E4 built in the queue control circuit 404 detects EID_C=ELM_ID=E4 and outputs QID_N_E4=QID_C=Q1, ODR_N_E4=0, and PR_N_E4=PR_C=0. QID_N_E4 indicates the QID of the virtual queue to which task (E4) is placed, ODR_N_E4 indicates the order value for placement, and PR_N_E4 indicates the task priority order of task (E4). ODR_N is always set to 0 for the task normally placed. 0 is the order value indicating the latest placement in the queue.

Not only the register value generating circuit 420_E4 but also the register value generating circuit 420_En that is fed Q1D_S_En=QID_C=Q1 responds to the command. The register value generating circuit 420_En responding as such outputs ODR_N_En=ODR_S_En+1. In this case, the register value generating circuit 420_E1 detects QID_S_E1=QID_C=Q1 and outputs ODR_N_E1=0+1=1. ODR_N_E1 indicates the order value occurring after task (E1) is placed. The order values of the tasks already placed in the virtual queue (Q1), to which task (E4) is normally placed, are affected. Through these steps of processing, the state data of task (E4) and task (E1), which form the virtual queue (Q1), is adjusted.

FIG. 24 shows the data structure in the state registers 250 mapping the state of FIG. 23.

Underlines indicate changes from the setting of the state registers 250 shown in FIG. 22. QID_N_E4 sets Q1 in the queue identification register 416_E4 in association with the normal placement of task (E4) in the virtual queue (Q1). ODR and PR of task (E4) are 0 and 0, respectively. As a result of the normal placement of task (E4), ODR of task (E1) already placed in the virtual queue (Q1) is incremented from 0 to 1. The setting in the state registers 250 as modified represents the state of the virtual queue (Q1) shown in FIG. 23.

Figure 25:
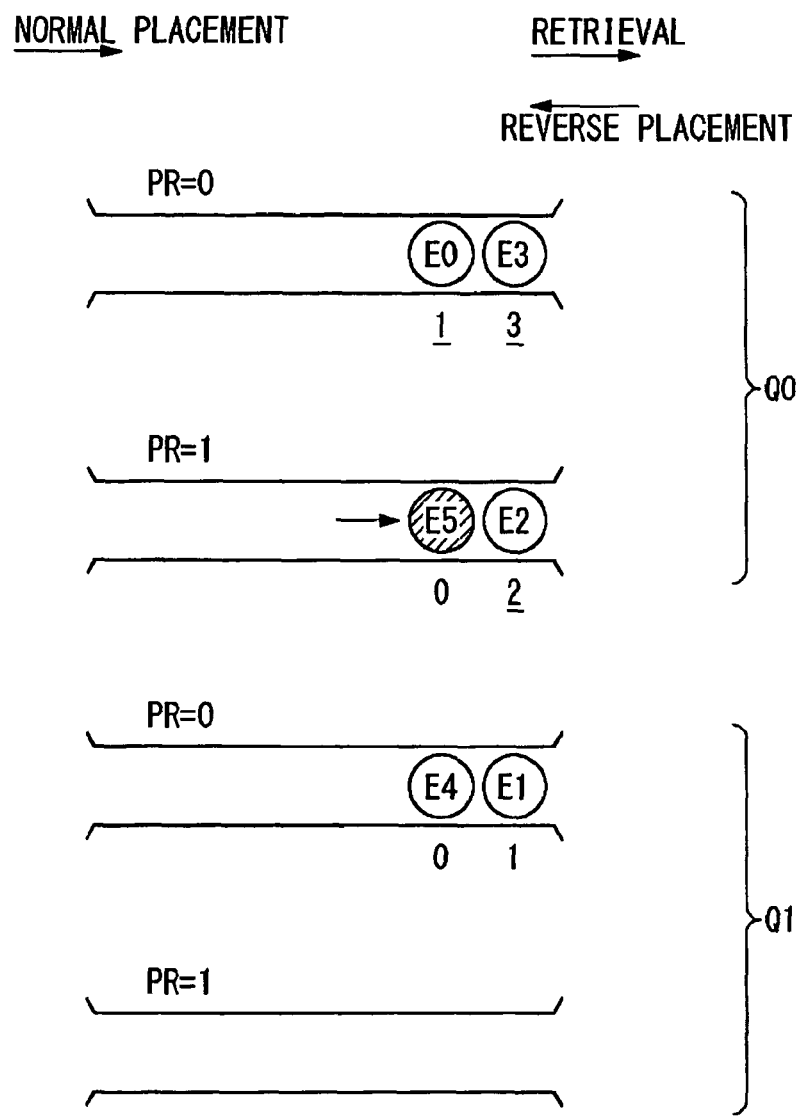
FIG. 25 is a conceptual diagram showing the normal placement of task (E5) in the virtual queues of FIG. 23.

FIG. 25 is a conceptual diagram showing the normal placement of task (E5) in the virtual queues of FIG. 23.

It will be assumed here that task (E5) with the task priority order PR=1 is normally placed in the virtual queue (Q0). The main circuit 400 configures CMD=E1\1Q_TL (normal placement command) such that EID_C=E5, Q1D_C=Q0, and PR_C=1. The register value generating circuit 420_E5 outputs QID_N_E5=QID_C=Q0, ODR_N_E5=0, and IR_N_E5=PR_C=1

Not only the register value generating circuit 420_E5 but also the register value generating circuit 420_En that is fed QID_C=QID_S_En=Q0 detects QID_C=QID_S_En and outputs ODR_N_En=ODR_S_En+1. In the illustrated example, the register value generating circuits 420 associated with task (E0), task (E2), and task (E3) are such registers. In this way, the state data of task (E5), task (E0), task (E2), and task (E3), which form the virtual queue (Q0), is adjusted.

FIG. 26 shows the data structure in the state registers 250 mapping the state of FIG. 25.

Underlines indicate changes from the setting of the state registers 250 shown in FIG. 24. Q0 is indicated in the queue identification register 416_E5 in association with the normal placement of task (E5) in the virtual queue (Q0). ODR and PR of task (E5) are 0 and 1, respectively. As a result of the normal placement of task (E5), QDR of task (E0), task (E1), and task (E3) already placed in the virtual queue (Q0) is incremented accordingly.

Figure 27:
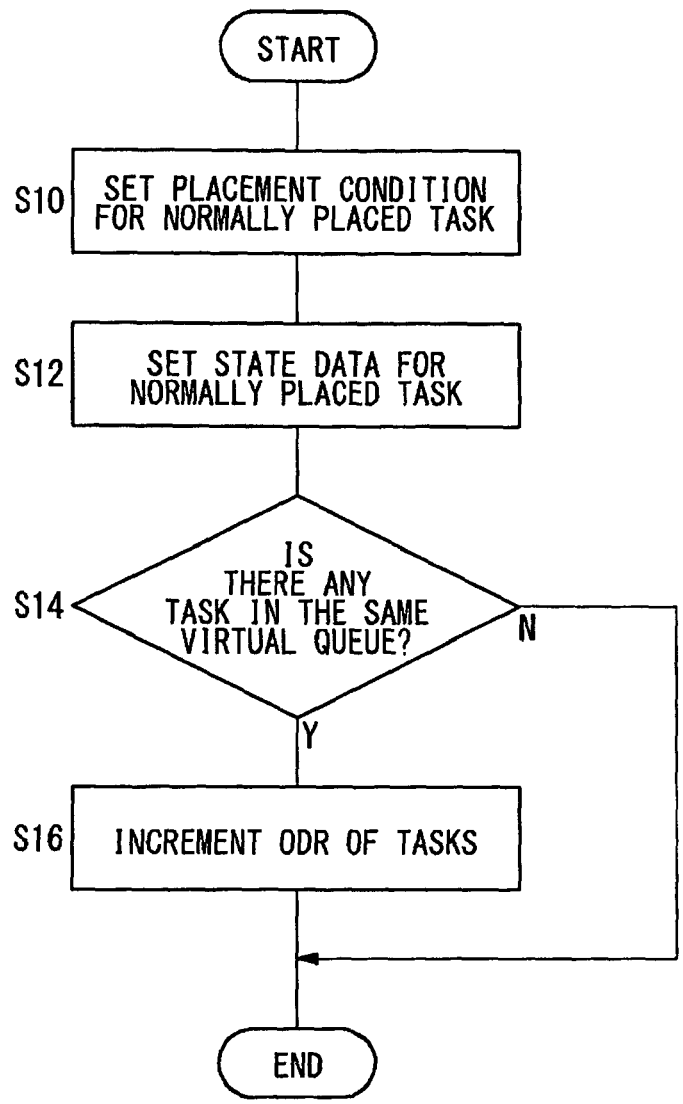
FIG. 27 is a flowchart showing the processing steps in normal placement.

FIG. 27 is a flowchart showing the processing steps in normal placement.

The main circuit 400 establishes a condition for placing a task normally (S10). Hereinafter, such a task will be referred to as a normally placed task. More specifically, EID_C, QID_C, and PR_C are configured in CMD=ENQ_TL. The register value generating circuit 420 in the queue control circuit 404 associated with the normally placed task establishes PR_C, 0, and QID_C in the task priority order register 412, the queue order register 414, and the queue identification register 416 for the normally placed task, respectively (S12).

When other tasks are already placed in the virtual queue (QID_C) (Y in S14), ODR for the tasks already placed is incremented accordingly (S16). In the example shown in FIG. 25, ODR for task (E0), task (E2), and task (E3) is incremented. The steps of S12, S14, and S16 proceed substantially in parallel.

[Reverse Placement]

Figure 28:
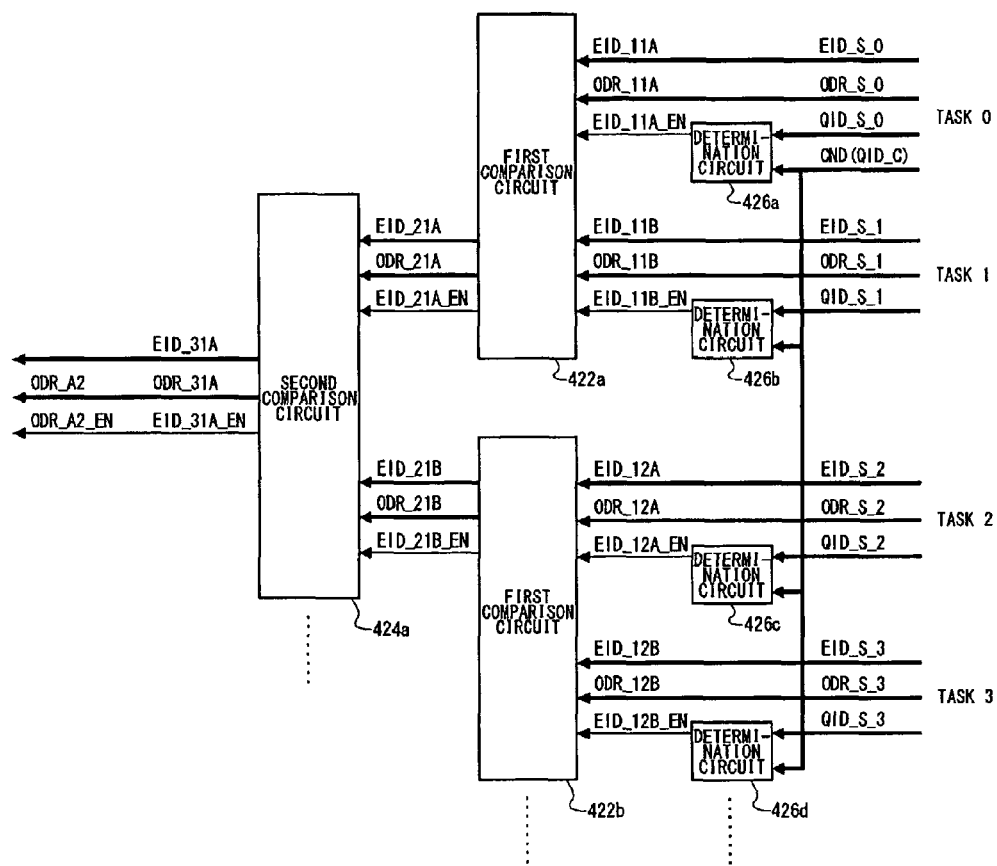
FIG. 28 is a partial circuit diagram of the maximum value selecting circuit.

FIG. 28 is a partial circuit diagram of the maximum value selecting circuit 406.

The maximum value selecting circuit 406 is a circuit driven by the main circuit 400 for reverse placement. Upon receipt of a CND signal indicating Q1D_C=Qn, the maximum value selecting circuit 406 outputs ODR_A2 indicating the maximum order value in the virtual queue (Qn) and asserts ODR_A2_EN Like the execution selection circuit 232 and the semaphore-based selection circuit 234 described in relation to the basic implementation, the maximum value selecting circuit 406 comprises comparison circuits connected in multiple stages. The maximum value selecting circuit 406 includes four 1$^{st}$ comparison circuits 422 (422a-422b, etc), two 2nd comparison circuits 424 (424a, etc.), and a 3rd comparison circuit (not shown). The circuit 406 also includes eight determination circuits 426 (426a, 426b, 426c, 426d, etc.).

The first comparison circuit 422a will be described by way of example. The first comparison circuit 422a compares task 0 and task 1. If both are placed in the virtual queue (Qn), the circuit 422a selects the task with the larger order value. The first comparison circuit 422a receives EID_S and ODR_S respectively indicating the task ID and order value of task 0 and task 1.

First determination: The determination circuit asserts EID_11A_EN if task 0 is already placed in the virtual queue (Qn). The determination circuit 426b asserts EID_11B_EN if task 1 is already placed in the virtual queue (Qn). The first comparison circuit 422a refers to the EID_11_EN signals output from the determination circuit 426a and the determination circuit 426b. If one of the signals is 1, it means that only one of the tasks is placed in the virtual queue (Qn). In this case, the first comparison circuit 422a outputs the task 1o(EID_s) and order value (ODR_S) of the task placed in the virtual queue (Qn) as E1D_21A and ODR_21A and asserts E1A_21A_EN.

When both the determination circuit 426a and the determination circuit 426b output 0, neither of the tasks is placed in the virtual queue (Qn). In this case, EID_21A_EN is negated. Task 0 and task 1 will not be subject to comparison by the second comparison circuit 424a.

When both the determination circuit 426a and the determination circuit 426b output 1, it means that both tasks are placed in the virtual queue (Qn). In this case, the second determination is made as described below.

Second determination: The circuit 422 compares ODR_S_0 of task 0 and ODR_S_1 of task 1 and selects the task with the larger order value. The first comparison circuit 422a outputs EID_21A and ODR_21A respectively indicating the task ID (EID_S) and the order value (ODR_S) of the task with the larger order value, and asserts EID_21A_EN.

The other first comparison circuits 422 process data similarly. Thus, a pair of task 0 and task 1, a pair of task 2 and task 3, a pair of task 4 and task 5, and a pair of task 6 and task 7 are subject to comparison. The second comparison circuit 424 selects the task with the larger order value by examining the outputs from two first comparison circuits 422. The second comparison circuit 424a will be described by way of example. The second comparison circuit 424a compares the output signal from the first comparison circuit 422a and the output signal from the first comparison circuit 422b so as to select the task with the larger order value. The second comparison circuit 424a receives E1D_21, ODR_21, and EID_EN from each of the first comparison circuit 422a and the first comparison circuit 422b. Of task 0-task 3, the second comparison circuit 424 selects the task with the largest order value in the virtual queue (Qn). The same thing is true of the other second comparison circuits 424. The maximum order value in the virtual queue (Qn) is output ultimately as the ODR_A2 signal. When one of the tasks is selected, ODR_A2_EN is asserted. When no tasks are located in the virtual queue (Qn), ODR_A2_EN is negated.

A PR invalidating signal for invalidating the determination on priority order may be fed to the first comparison circuits 422, the second comparison circuits 424, and the third comparison circuit. When the PR invalidating signal is asserted, the comparison circuits select tasks by excluding the priority order from the condition for determination. The same is true of the comparison circuits shown in FIG. 32.

Figure 29:
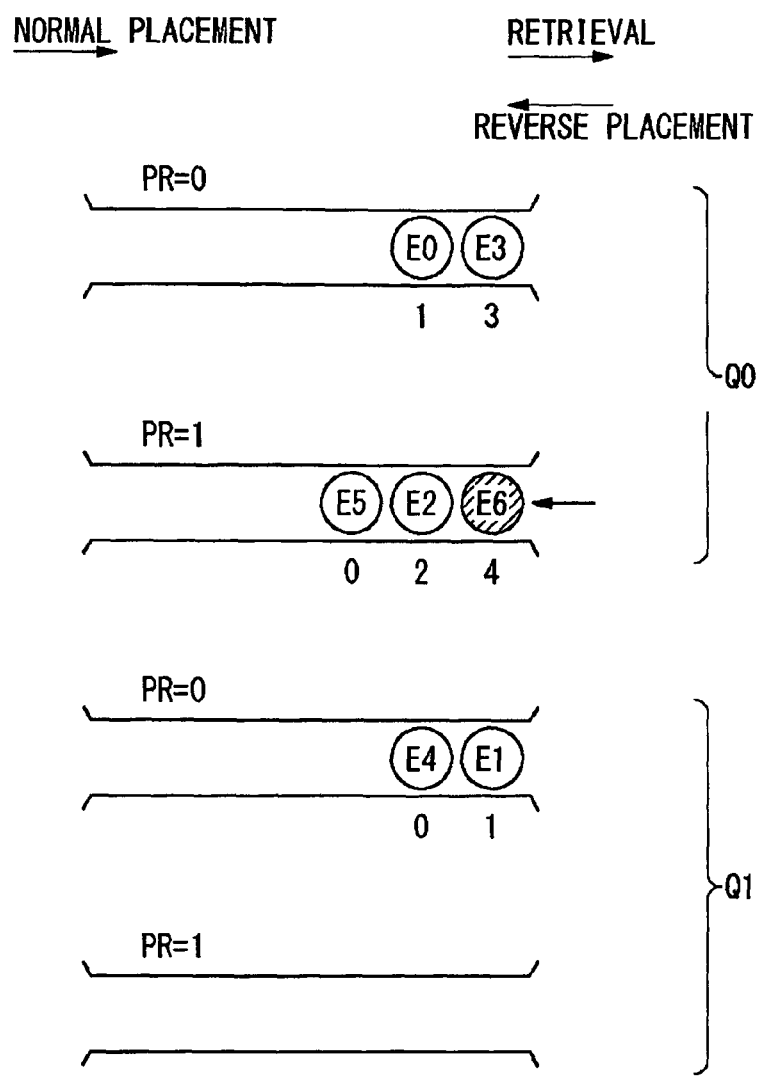
FIG. 29 is a conceptual diagram showing the reverse placement of task (E6) in the virtual queues of FIG. 25.

FIG. 29 is a conceptual diagram showing the reverse placement of task (E6) in the virtual queues of FIG. 25.

It will be assumed here that task (E6) with the task priority order PR=1 is reversely placed in the virtual queue (Q0). The main circuit 400 feeds the QID_C signal indicating the destination of placement QID=Q0 to the maximum value selecting circuit 406. The maximum value selecting circuit 406 outputs ODR_A2, indicating the maximum order value in the virtual queue (Q0), to the queue control circuit 404 and asserts ODR_A2_EN. Referring to FIG. 25, the maximum order value in the virtual queue (Q0) in the virtual queue (Q0) is 3 of task (E3). Therefore, ODR_A2=3.

The main circuit 400 then configures CMD=ENQ_TP (reverse placement command) such that EID_C=E6, QID_C=Q0, and PR_C=1. The register value generating circuit 420_E6 built in the queue control circuit 404 detects EID_C=ELM_ID=E6 and outputs QID_N_E6=QID_C=Q0, ODR_N_E6=ODR_A2+1=3+1=4, and PR_N_E6=PR_C=0.

When CMD=ENQ_TP (reverse placement command), only the register value generating circuit 420 associated with the task designated by EID_C operates. Therefore, only the state data for task (E6) reversely placed is updated.

FIG. 30 shows the data structure in the state registers 250 mapping the state of FIG. 29.

Underlines indicate changes from the setting of the state registers 250 shown in FIG. 26. Q0 is indicated in the queue identification register 416_E6 in association with the reverse placement of task (E6) in the virtual queue (Q0). ODR and PR of task (E6) are 4 and 1, respectively. The state data of the other tasks remain unaffected by the reverse placement of task (E6).

Figure 31:
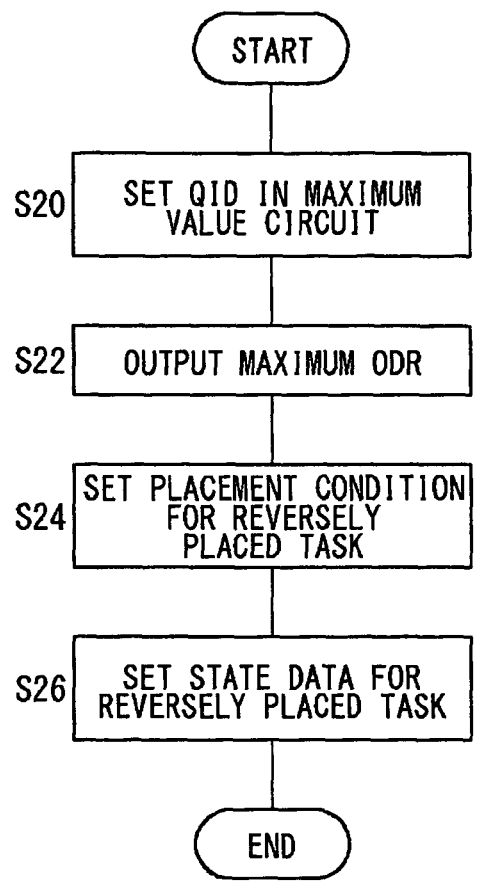
FIG. 31 is a flowchart showing the steps performed in reverse placement.

FIG. 31 is a flowchart showing the steps performed in reverse placement.

The main circuit 400 feeds QID=Qn of the virtual queue that is the destination of reverse placement to the maximum value selecting circuit 406 (S20). The main circuit 400 outputs the maximum order value in the virtual queue (Qn) to the queue control circuit 404 (S22). The main circuit 400 establishes a condition for placement of the task to be reversely placed (hereinafter, referred to as reversely placed task) (S24). More specifically, EID_C, QID_C, and PR_C are configured in CMD=ENQ_TP. The register value generating circuit 420 in the queue control circuit 404 associated with the reversely placed task establishes PR_C, the maximum order value+1, and QID_C in the task priority order register 412, the queue order register 414, and the queue identification register 416 for the reversely placed task, respectively (S26). When the maximum order value=0 and when ODR_A2_EN is negated, i.e., when no tasks are placed in the virtual queue (Qn), 0, indicating that the task is placed for the first time is set up in the queue order register 414.

As described, the order values of tasks other than the one placed should be subject to adjustment in normal placement. However, such an adjustment is not necessary in reverse placement. if a virtual queue is viewed assuming the FIFO mode, tasks with older history of being placed are assigned larger order values. In other words, the deeper a task is placed in a virtual queue, the larger the order value. Conversely, the deeper a task is placed in a virtual queue, the smaller the order value may be. in this case, adjustment of order values of tasks other than the task placed will not be necessary in normal placement. However, the order values of tasks other than the one placed may be subject to adjustment in reverse placement.

[Retrieval]

Figure 32:
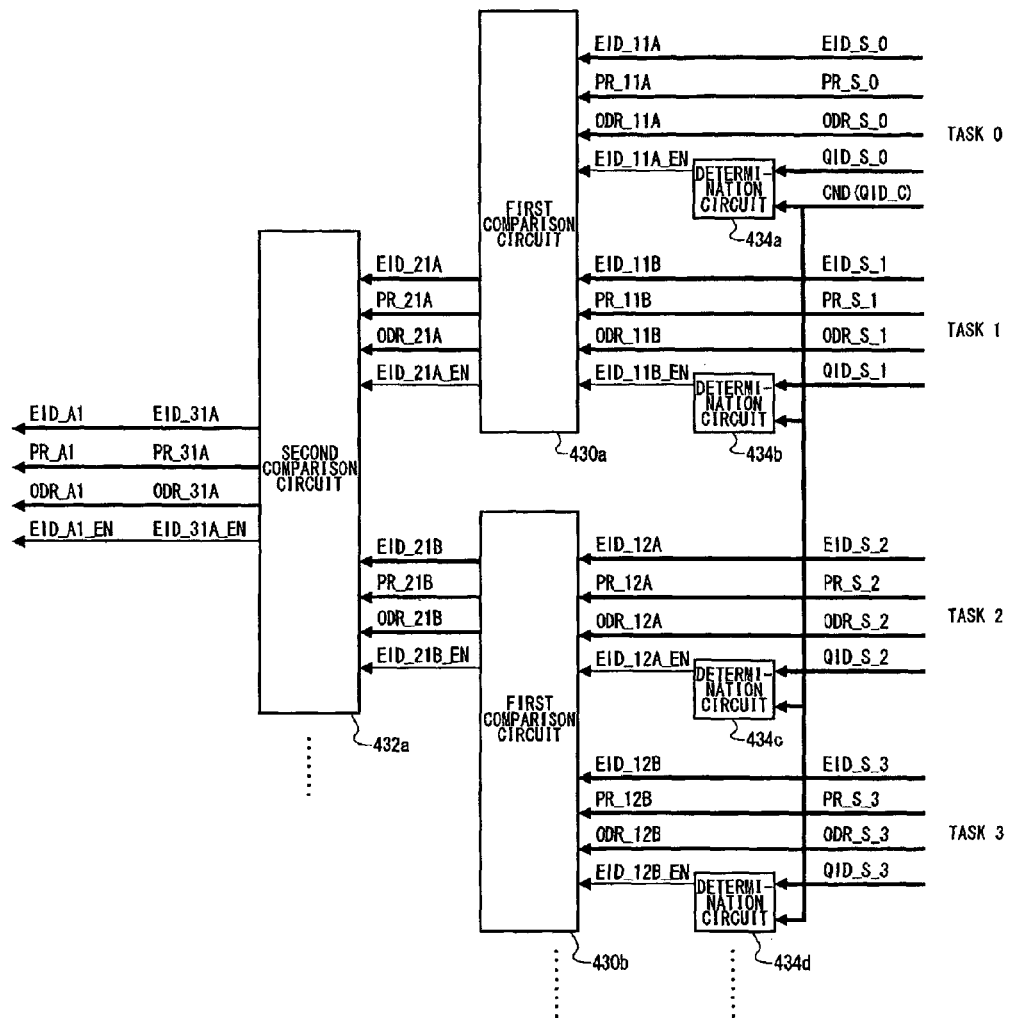
FIG. 32 is a partial circuit diagram of the task selecting circuit.

FIG. 32 is a partial circuit diagram of the task selecting circuit 230.

The basis configuration of the task selecting circuit 230 is as described with reference to FIG. 12. The task selecting circuit 230 according to the improved implementation identifies a retrieved task upon receipt of an inquiry from the main circuit 400. A description will be given herein of the circuit configuration involved in identifying a retrieved task. Upon receipt of a CND signal indicating QID_C=Qn, the task selecting circuit 230 selects a retrieved task from the priority queue with the highest task priority order in the virtual queue (Qn). The circuit 230 outputs EID_A_1, PR_A1, and ODR_A1 indicating the task ID, task priority order, and order value of the retrieved task, and asserts EIA_A1_EN. Like the execution selection circuit 232 and the semaphore-based selection circuit 234 described in relation to the basic implementation, the task selecting circuit 230 comprises comparison circuits connected in multiple stages. The task electing circuit 230 includes four 1st comparison circuits 430 (430a-430b, etc), two 2nd comparison circuits 432 (432, etc.), and a 3rd comparison circuit (not shown). The circuit 230 also includes eight determination circuits 434 (434a, 434b, 4340, 434d, etc.).

The first comparison circuit 430a will be described by way of example. The first comparison circuit 422a compares task 0 and task 1. If both are placed in the virtual queue (Qn), the circuit 422a selects the task with the higher task-priority order. Given the same task priority order, the circuit 430a selects the task with the larger order value. The first comparison circuit 430a receives EID_S, PR_S, and ODR_S respectively indicating the task ID, task priority order, and order value of task 0 and task 1.

First determination: The determination circuit 434a asserts E1D_11A_EN if task 0 is already placed in the virtual queue (Qn). The determination circuit 434b asserts EID_11B_EN if task 1 is already placed in the virtual queue (Qn). The first comparison circuit 430a refers to the EID_11_EN signals output from the determination circuit 434a and the determination circuit 434b. If one of the signals is 1, it means that only one of the tasks is placed in the virtual queue (Qn). In this case, the first comparison circuit 430a outputs EID_21A, PR_11A, and ODR_21A indicating the task ID (EID_S), task priority order (PR_S), and order value (ODR_S) of the task placed in the virtual queue (Qn), and asserts EIA_21A_EN.

When both the determination circuit 434a and the determination circuit 434b output 0, neither of the tasks is placed in the virtual queue (Qn). In this case, E1D_21 A_EN is negated. Task 0 and task 1 will not be subject to comparison by the second Comparison circuit 432a.

When both the determination circuit 434a and the determination circuit 434b output 1, it means that both tasks are placed in the virtual queue (Qn). in this case, the second determination is made as described below.

Second determination: The circuit 430a compares PR_S_0 of task 0 and PR_S_1 of task 1 and selects the task with the higher task order, i.e., the task assigned a lower order PR_S. The first comparison circuit 430a outputs EID_21A, PR_21A, and ODR_21A respectively indicating the task ID (EID_S), task priority order (PR_S), and order value (ODR_S) of the task with the higher task order, and asserts E1D_21A_EN. If the task priority orders of the two tasks are identical, the third determination is performed as described below.

Third determination: The circuit 430a compares ODR_S_0 of task 0 and ODR_S_I of task 1 and selects the task with the larger order value. The first comparison circuit 430a outputs EID_21 A, PR_21A, and ODR_21A respectively indicating the task ID (EID_S), task priority order (PR_S), and order value (ODR_S) of the task with the larger order value, and asserts EID_21A_EN.

The other first comparison circuits 430 process data similarly. Thus, a pair of task 0 and task 1, a pair of task 2 and task 3, a pair of task 4 and task 5, and a pair of task 6 and task 7 are subject to comparison. Each of the second comparison circuits 432 narrows down the candidates for retrieved tasks by examining the output from the two 1st comparison circuits 430. Ultimately, a retrieved task is selected from the priority queue with the highest task priority order in the virtual queue (Qn). When one of the tasks is selected, EID_A1_EN is asserted. When no tasks are located in the virtual queue (Qn), EID_A1_EN is negated.

Figure 33:
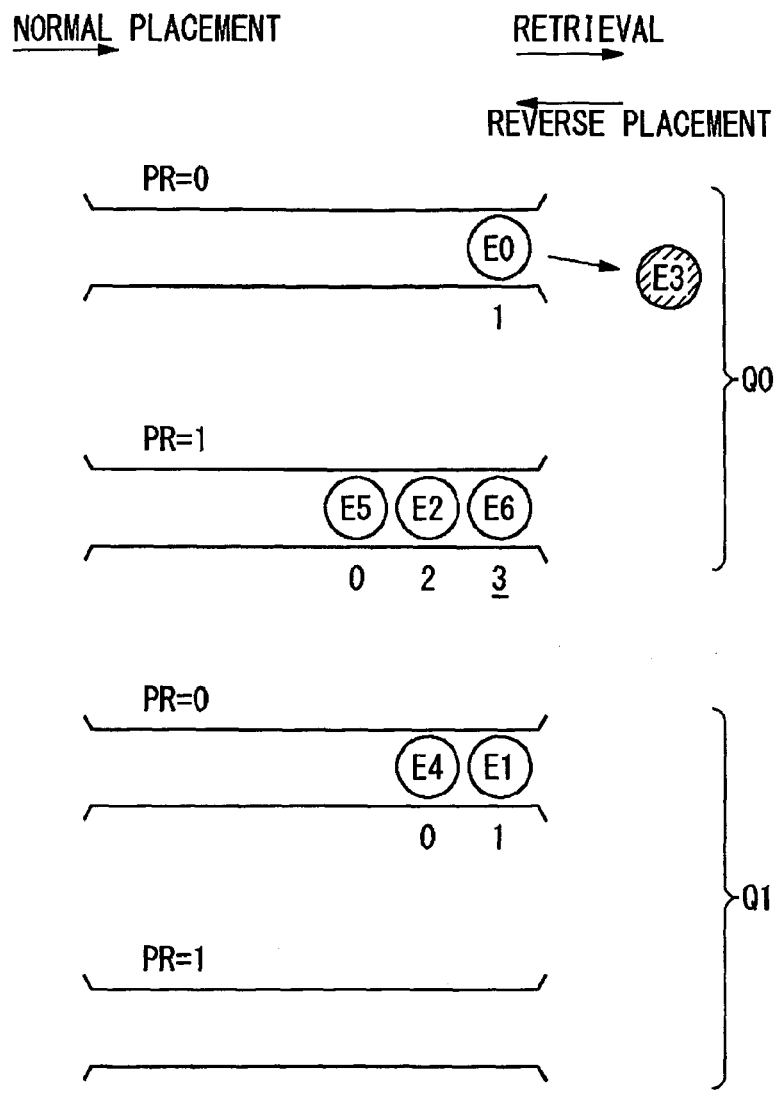
FIG. 33 is a conceptual diagram showing the retrieval of task (E3) from the virtual queues of FIG. 29.

FIG. 33 is a conceptual diagram showing the retrieval of task (E3) from the virtual queues of FIG. 29.

It will be assumed here that a task is retrieved from the virtual queue (Q0). The main circuit 400 feeds QID_C=Q0 to the task selecting circuit 230. Referring to FIG. 29, task (E0) with the order value 1 and task (E3) with the order value 3 are placed in the priority queue (Q0:0) associated with the highest task priority order in the virtual queue (Q0). The task selecting circuit 230 selects the task (E3) with the larger order value as a retrieved task. The task selecting circuit 230 indicates E1D_A1=E3, 1'R_A1=0, and ODR_A1=3 and asserts EID_A1_EN.

The main circuit 400 then configures CMD=DEQ (retrieval command) such that EID_C=EID_A1=E3 and QID_C=Q0. The register value generating circuit 420_E.3 outputs EID_N_E3=Non, ODR_N_E3=0 (reset), PR_N_E3=0 (reset). In this way, the relation between task (E3) and the virtual queue (Q0) is dissolved in the state registers 250.

Not only the register value generating circuit 420_1-3.3 but also the register value generating circuit 420_En that is fed QID_S_En=Q1D_C=Q0 determines whether ODR_S_En>ODR_A1 upon detection of QID_C=QID_S_En. ODR_A1 indicates the order value occurring before task (E3) is retrieved. If ODR_S_En>ODR_A1, i.e., if the register value generating circuit 420_En is for the task with the order value smaller than that of the retrieved task, the register 420_En outputs ODR_N_En=ODR_S_En−1. In the illustrate example, the register value generating circuit 420_E6 associated with task (E6) is such a register. The register value generating circuit 420_E6 outputs ODR_N_E6=ODR_S_E6−1=4−1=3. In this way, the state data of task (E6), which forms the virtual queue (Q0), is adjusted.

FIG. 34 shows the data structure in the state registers 250 mapping the state of FIG. 33.

Underlines indicate changes from the setting of the state registers 250 shown in FIG. 30. "Non" is indicated in the queue identification register 416_E3 in association with the retrieval of task (E3) from the virtual queue (Q0). Also, 0 is indicated in the queue order register 414 and the task priority order register 412. Of all the tasks formerly placed in the virtual queue (Q0), i.e., task (E0), task (E2), task (E6), ODR of task (E6) with the order value larger than that of the retrieved task (E3) is decremented as a result of the retrieval of task (E3).

Figure 35:
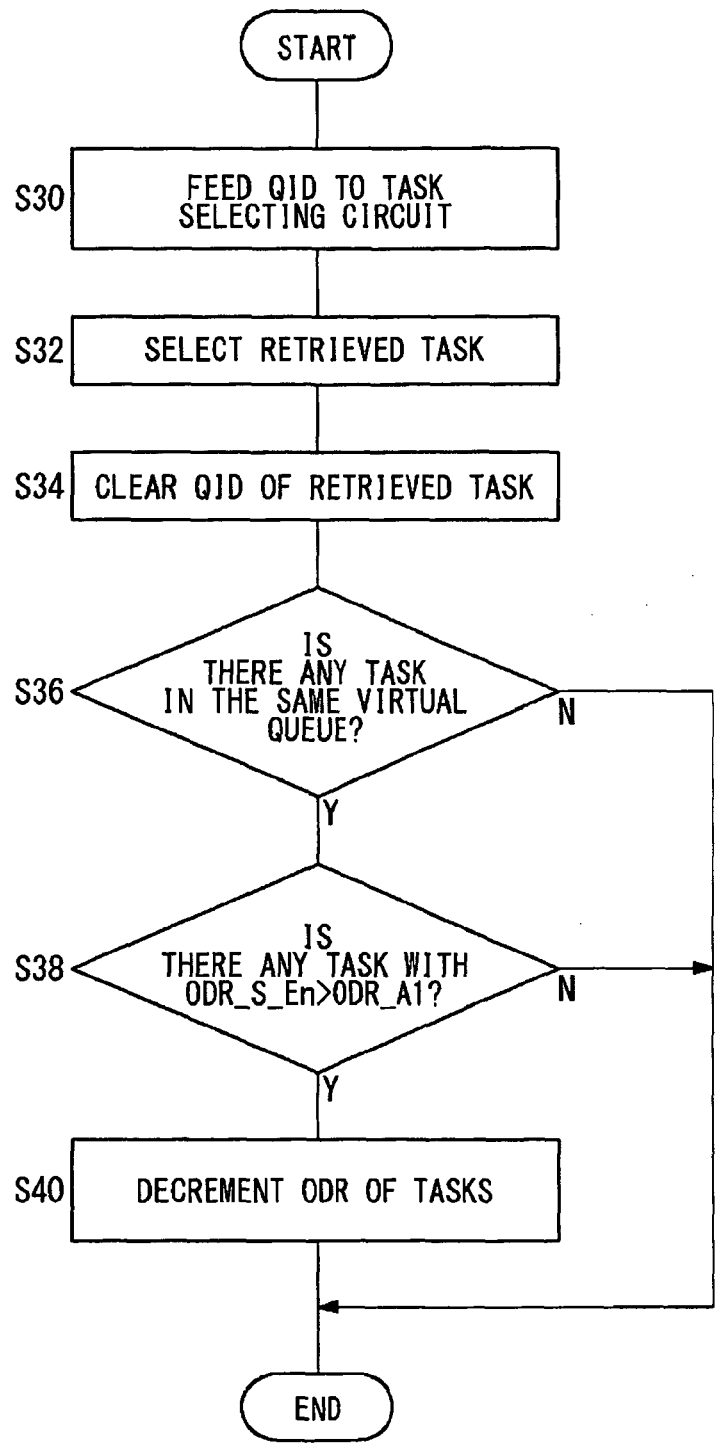
FIG. 35 is a flowchart showing the steps performed in retrieval.

FIG. 35 is a flowchart showing the steps performed in retrieval.

The main circuit 400 feeds to the task selecting circuit 230 (S30) QID=Qn of the virtual queue from which a task is retrieved. The task selecting circuit 230 selects a retrieved task from the virtual queue (Qn) (S32). When the main circuit 400 feeds the task ID=En of the retrieved task to the queue control circuit 404, the queue control circuit 404 clears QID=Qn in the state data for the retrieved task (En). PR and ODR are reset to 0. Alternatively, they may not be reset.

When other tasks are placed in the virtual queue (Qn) (Y in S36) and there are tasks for which ODR_S_En>ODR_A1 (Y in S38), the order value of the associated tasks is decremented (S40). The steps of S30 through S40 may not necessarily be executed serially but may be executed in parallel.

In an alternative implementation, tasks may be retrieved in the middle of a virtual queue. For example, referring to FIG. 33, it is assumed that task (E2) need be retrieved in the middle of the virtual queue (Q0). It is assumed that task (E2) is made executable on the condition that a flag A is turned on. When the flag A is turned off, it is necessary to take out task (E2) in the middle of the virtual queue (Q0). Task (E2) need also be taken out in the middle of the virtual queue (Q0) when a wait time established for task (E2) has expired. In this case, task (E2) can be taken out in the middle of the virtual queue (Q0) by clearing QID of task (E2) and decrementing ODR of tasks having larger order values than the order value 2 of task (E2). In the case of FIG. 33, ODR of task (E6) is changed to 2. Since a virtual queue is formed without being bounded by physical constraints imposed by hardware, tasks can be placed or retrieved even in the middle of a queue.

According to the virtual queue control described above, unique queues capable of operating in the FIFO mode basically but also capable of operating in the LIFO mode can be implemented in hardware logic. Implementation of a dual-entry queue algorithm in software will normally require provision for a linked list. However, software-based processing inevitably creates overhead associated with memory access and address management. In contrast, the virtual queue control described in the improved implementation is implemented in hardware logic. As such, far simpler and faster control is possible. Particularly, implementing the dual-entry queue algorithm in hardware will prove highly beneficial where a RTOS with severe time requirements is used. A description will now be given of the mode in which prioritized re-execution task scheduling is implemented by the virtual queue control method described above.

Figure 36:
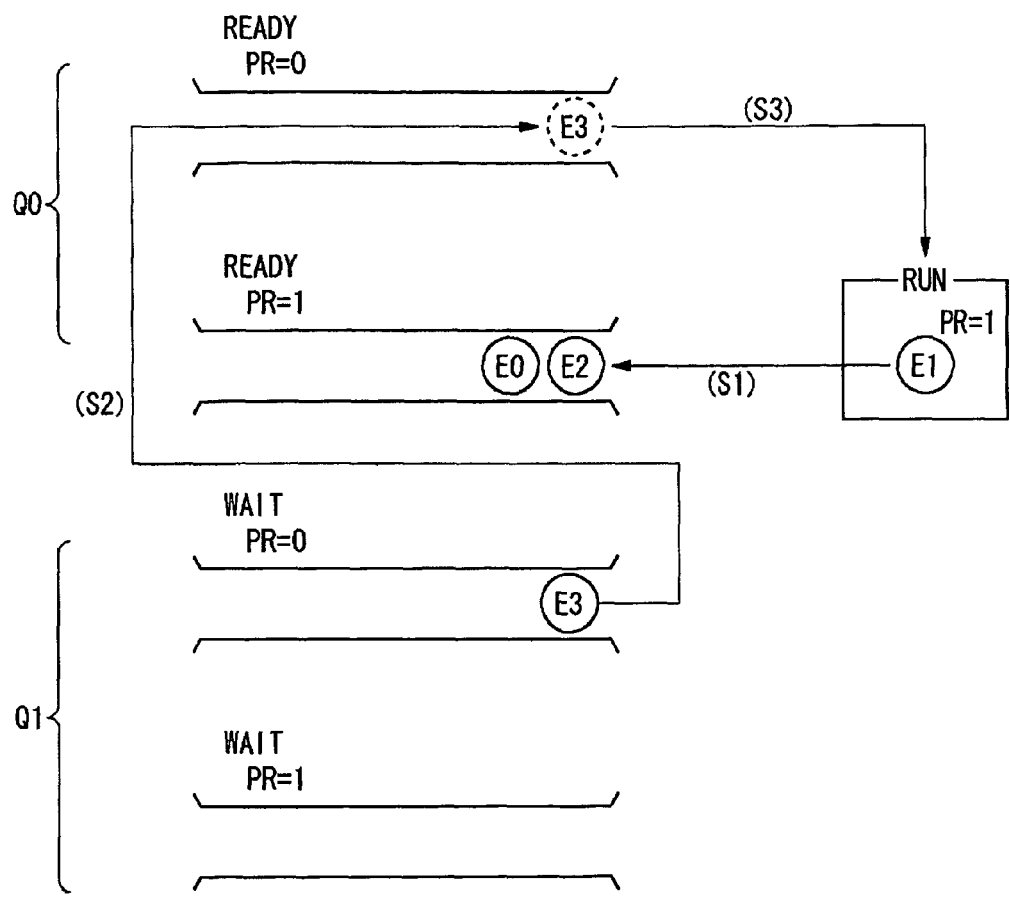
FIG. 36 is a first conceptual diagram showing the relation between virtual queues and tasks in prioritized re-execution task scheduling.

FIG. 36 is a first conceptual diagram showing the relation between virtual queues and tasks in prioritized re-execution task scheduling.

Two virtual queues including a virtual queue (Q0) associated with the READY state and a virtual queue (Q1) associated with the WAIT semaphore state are postulated. The virtual queue (Q0) is a set comprising a priority queue (hereinafter, denoted as a priority queue (Q0:0)) in which tasks with the task priority order PR=0 are placed, and a priority queue (Q0:1) in which tasks with the task priority order PR=1 are placed. The same is true of the virtual queue (Q1). A total of four priority queues are postulated.

Referring to FIG. 36, task (E1) with PR=1 is in the RUN state. Task (E0) and task (E2) also with PR=1 are in the READY state in the priority queue (Q0:1). Task (E3) with PR=0 is in the WAIT semaphore state in the priority queue (Q1:0). It is assumed that task (E1) is a task desired to be executed in a sitting or preferentially once given the right for execution.

It is assumed that task (E1) executes a release semaphore system call and returns to the READY state (S1). Since task (E1) is a task desired to be executed at an early stage, task (E1) is reversely placed in the priority queue (Q0:1). It is then assumed that the WAIT cancellation condition of task (E3) is fulfilled as a result of the execution of release A semaphore system call. Task (E3) is retrieved from the priority queue (Q1:0) and normally placed in the priority queue (Q0:0). The task selecting circuit 230 selects a new RUN-task. The task selecting circuit 230 selects as a retrieved task the task having the highest task priority order (E3) among the READY-tasks. Task (E3) having just made a transition from the WAIT state to the READY state is retrieved from the priority queue (Q0:0) and is turned into a new RUN-task. According to task scheduling as described, tasks having higher task priority order can acquire the right for execution at a relatively early stage once the WAIT cancellation condition is fulfilled.

Figure 37:
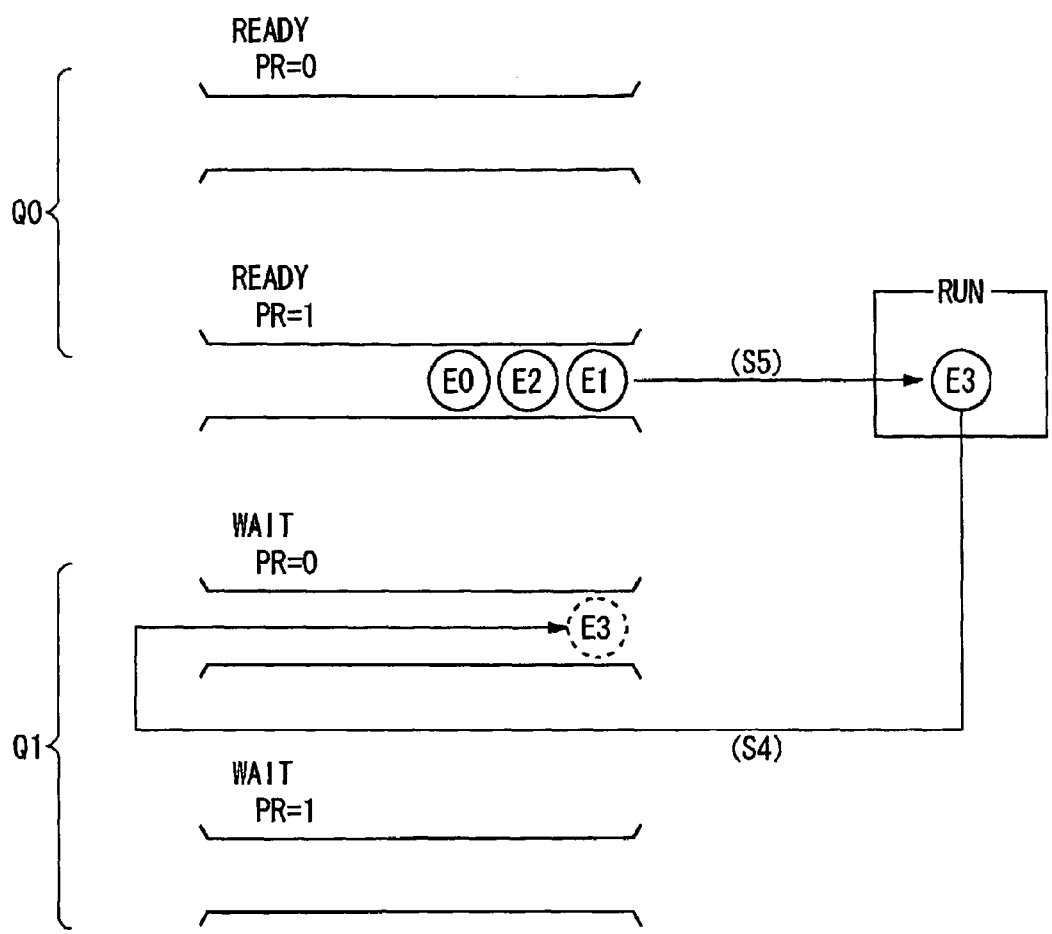
FIG. 37 is a second conceptual diagram showing the relation between virtual queues and tasks in prioritized re-execution task scheduling.

FIG. 37 is a second conceptual diagram showing the relation between virtual queues and tasks in prioritized re-execution task scheduling.

When task (E3) executes a wait semaphore system call, task (E3) is normally placed in the priority queue (Q1:0). The task selecting circuit 230 selects a new RUN-task. The task selecting circuit 230 selects the task having the highest task priority order among the READY-tasks. In this case, however, task (E0), task (E2), and task (E1) have the same task priority order. In this case, task (E1) is retrieved from the priority queue (Q0:1) (S5). Task (E1) is turned into a new RUN-task. According to the processing method, the specification of task (E1), which does not demand establishing the task priority order PR=0 but demands that the task be preferably executed in one sitting once the execution is started, can be properly addressed.

The prioritized re-execution task scheduling is capable of controlling the order of execution of tasks, by using normal placement and reverse placement as appropriate depending on the situation of execution or the type of task. Therefore, highly refined task scheduling can be achieved, while maintaining the high-speed performance of the task processor 100 described in the basic implementation.

Described above is an explanation of the present invention. The embodiment described is intended to be illustrative only and it will be obvious to those skilled in the art that various modifications to constituting elements and processes could be developed and that such modifications are also within the scope of the present invention. According to the present invention, the dual-entry algorithm compatible with both FIFO and LIFO can be implemented in hardware logic.

The invention claimed is:

1. A virtual queue processing circuit, comprising:
a queue control circuit operative to control placement and retrieval of a plurality of elements in a plurality of types of virtual queues and includes a plurality of register values generating circuits in association with any one of elements one by one in a fixed manner; and
a plurality of queue registers provided in association with the respective elements one by one in a fixed manner and operative to store the queue IDs of virtual queues in which the elements are placed and order values indicating the order of placement of the elements in association with each other, wherein:
each virtual queue is an imaginary queue represented by the queue IDs and order values stored in the queue registers,
each queue register is not formed as a software module residing in a memory device and does not store memory addresses, but is formed as a hardware module dedicated to one of the elements,
the queue control circuit manages virtual queues based upon configuration information in the queue registers such that when the queue control circuit is supplied with signals indicating a normal placement command, an element ID and a queue ID, the queue control circuit sets, in the queue register associated with the supplied element ID, the supplied queue ID and an end order value indicating that the element is placed at the end of the virtual queue associated with the supplied queue ID, and
when the queue control circuit is supplied with signals indicating a retrieval command and an element ID, the queue control circuit retrieves an associated element by clearing the queue ID in the queue register associated with the supplied element ID.

2. The virtual queue processing circuit according to claim 1, wherein upon receipt of a reverse placement command designating an element ID and a queue ID, the queue control circuit establishes, in the queue register associated with the designated element ID, the designated queue ID and a start order value indicating that the element is placed at the start of the virtual queue associated with the designated queue ID.

3. The virtual queue processing circuit according to claim 1, wherein upon receipt of a retrieval command designating an element ID, the queue control circuit retrieves an associated element ID by clearing the queue ID in the queue register associated with the designated element ID irrespective of whether the order value of the designated element ID is a start order value.

4. The virtual queue processing circuit according to claim 1, wherein when a normal placement command is received, the queue control circuit adjusts the order values in the queue registers storing the queue ID designated in the command other than the queue register for the element placed.

5. The virtual queue processing circuit according to claim 1, further comprising:
a retrieval candidate circuit operative, when a queue ID is designated, to refer to the queue IDs and order values output in parallel from the plurality of queue registers so as to output the element ID associated with the designated queue ID and the start order value, wherein the queue control circuit clears the queue ID in the queue register associated with the element ID output from the retrieval candidate circuit.

6. The virtual queue processing circuit according to claim 1, wherein a virtual queue is defined as a set comprising a plurality of priority queues respectively assigned a level of priority in respect of retrieval, the queue registers further stores the level of priority for identifying a priority queue, and upon receipt of a normal placement command designating a level of priority in addition to an element ID and a queue ID, the queue control circuit establishes the designated level of priority in the queue register associated with the designated element ID, upon receipt of a retrieval command designating a queue ID, the queue control circuit clears the queue ID in the queue register in which are established the designated queue ID and the highest level of priority.

7. The virtual queue processing circuit according to claim 6, wherein when the retrieval command designating the queue ID is received, the queue control circuit adjusts the order values in the queue registers storing the designated queue ID other than the queue register for the element retrieved.

8. The virtual queue processing circuit according to claim 7, further comprising:
a retrieval candidate circuit operative, when a queue ID is designated, to refer to the queue IDs, order values, and levels of priority output in parallel from the plurality of queue registers so as to output the element ID associated with the queue register storing the designated queue ID, the highest level of priority, and the order value equal to or closest to the start order value, wherein the queue control circuit clears the queue ID in the queue register associated with the element ID output from the retrieval candidate circuit.

9. The virtual queue processing circuit according to claim 1, wherein the register value generating circuit writes the order value and the queue ID of the corresponding element in the corresponding queue register.

10. The virtual queue processing circuit according to claim 9, wherein when the retrieval command with the element ID is supplied, the register value generating circuit in association with the designated element ID clears the queue ID in the corresponding queue register.

11. The virtual queue processing circuit according to claim 9, wherein when the normal placement command with the element ID and the queue ID is supplied, the register value generating circuit in association with the designated element ID writes the end order value and the queue ID in the corresponding queue register.

12. A virtual queue processing circuit, comprising:
a queue control circuit operative to control placement and retrieval of a plurality of elements in a plurality of types of virtual queues and includes a plurality of register value generating circuits in association with any one of elements one by one in a fixed manner; and
a plurality of queue registers provided in association with the respective elements one by one in a fixed manner and operative to store the queue IDs of virtual queues and order values indicating the order of placement of the elements in association with each other, wherein:
each virtual queue is an imaginary queue represented by the queue IDs and order values stored in the queue registers,
the queue registers do not store memory addresses, and
when the queue control circuit is supplied with a normal placement command or a retrieval command with an element ID, the register value generating circuit corresponding to the designated element ID writes the order value in the corresponding queue register.

13. The virtual queue processing circuit according to claim 12, wherein when the normal placement command with the queue ID is supplied, the register value generating circuit in association with a queue register storing the designated queue ID adjusts the order value in the corresponding queue register.

14. The virtual queue processing circuit according to claim 12, wherein when the retrieval placement command with the element ID is supplied, the register value generating circuit in association with a queue register storing the designated element ID adjusts the order value in the corresponding queue register.

15. A virtual queue processing circuit, comprising:
a queue control circuit operative to control placement and retrieval of a plurality of elements in a plurality of types of virtual queues;
a plurality of queue registers provided in association with the respective elements one by one in a fixed manner and operative to store the queue IDs of virtual queues and order values indicating the order of placement of the elements in association with each other, wherein each virtual queue is an imaginary queue represented by the queue IDs and order values stored in the queue registers and the queue registers do not store memory addresses; and
a retrieval candidate circuit operative, when a retrieval command with an element ID is supplied, output an element ID of the queue register storing the order value closest to a start order value among queue registers of the designated element ID, wherein the queue control circuit, when the retrieval command is supplied, clears the queue ID in the queue register of the element ID output from the retrieval candidate circuit.

16. The virtual queue processing circuit according to claim 15, wherein the retrieval candidate circuit compares order values stored in the queue registers with a plurality of comparison circuits to determine the element ID to be output.

* * * * *